US011738446B2

(12) United States Patent
Smith et al.

(10) Patent No.: US 11,738,446 B2
(45) Date of Patent: *Aug. 29, 2023

(54) TELEOPERATED ROBOTIC SYSTEM WITH IMPACT RESPONSIVE FORCE FEEDBACK

(71) Applicant: Sarcos, LC, Salt Lake City, UT (US)

(72) Inventors: Fraser M. Smith, Salt Lake City, UT (US); Marc X. Olivier, Salt Lake City, UT (US)

(73) Assignee: Sarcos, LC, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/900,727

(22) Filed: Aug. 31, 2022

(65) Prior Publication Data
US 2022/0410367 A1 Dec. 29, 2022

Related U.S. Application Data

(63) Continuation of application No. 16/932,666, filed on Jul. 17, 2020, which is a continuation of application
(Continued)

(51) Int. Cl.
*B25J 13/02* (2006.01)
*B25J 3/04* (2006.01)
(Continued)

(52) U.S. Cl.
CPC ............. *B25J 3/04* (2013.01); *B25J 5/005* (2013.01); *B25J 9/1633* (2013.01); *B25J 13/025* (2013.01)

(58) Field of Classification Search
CPC ... B25J 3/04; B25J 5/005; B25J 13/087; B25J 13/088; B25J 19/068; B25J 17/00;
(Continued)

(56) References Cited

U.S. PATENT DOCUMENTS 1,880,138 A 9/1932 Franz
2,850,189 A 9/1958 Leroy
(Continued)

FOREIGN PATENT DOCUMENTS

CN 103610524 A 3/2014
DE 102004029513 B3 9/2005
(Continued)

OTHER PUBLICATIONS

Gupta et al., Master-Slave Control of a Teleoperated Anthropomorphic Robotic Arm with Gripping Force Sensing, 2006, IEEE, p. 2136-2145 (Year: 2006).*

(Continued)

*Primary Examiner* — McDieunel Marc

(57) ABSTRACT

A teleoperated robotic system that includes master control arms, slave arms, and a mobile platform. In use, a user manipulates the master control arms to control movement of the slave arms. The teleoperated robotic system can include two master control arms and two slave arms. The master control arms and the slave arms are mounted on the platform. The platform can provide support for the master control arms and for a teleoperator, or user, of the robotic system. Thus, a mobile platform can allow the robotic system to be moved from place to place to locate the slave arms in a position for use. Additionally, the user can be positioned on the platform, such that the user can see and hear, directly, the slave arms and the workspace in which the slave arms operate.

37 Claims, 57 Drawing Sheets

Related U.S. Application Data

No. 15/786,472, filed on Oct. 17, 2017, now abandoned, which is a continuation of application No. 13/332,165, filed on Dec. 20, 2011, now Pat. No. 9,789,603.

(60) Provisional application No. 61/481,110, filed on Apr. 29, 2011, provisional application No. 61/481,103, filed on Apr. 29, 2011, provisional application No. 61/481,089, filed on Apr. 29, 2011, provisional application No. 61/481,099, filed on Apr. 29, 2011, provisional application No. 61/481,095, filed on Apr. 29, 2011, provisional application No. 61/481,091, filed on Apr. 29, 2011.

(51) Int. Cl.
  *B25J 5/00* (2006.01)
  *B25J 9/16* (2006.01)

(58) Field of Classification Search
  CPC ........ B25J 13/025; B25J 19/0004; B25J 9/14;
         B25J 9/106; B25J 9/1005; B25J 9/08
  See application file for complete search history.

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,606,048 A | 9/1971 | Long |
| 3,759,563 A | 9/1973 | Kitamura |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,297,073 A | 10/1981 | Schmid et al. |
| 4,398,110 A | 8/1983 | Flinchbaugh et al. |
| 4,483,407 A | 11/1984 | Iwamoto et al. |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,101,472 A | 3/1992 | Repperger |
| 5,105,367 A | 4/1992 | Tsuchihashi et al. |
| 5,117,814 A | 6/1992 | Luttrell et al. |
| 5,120,186 A | 6/1992 | Jorgenson |
| 5,144,943 A | 9/1992 | Luttrell et al. |
| 5,172,951 A | 12/1992 | Jacobsen et al. |
| 5,200,674 A | 4/1993 | Fujimoto et al. |
| 5,239,246 A | 8/1993 | Kim |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,588,688 A | 12/1996 | Jacobsen et al. |
| 5,664,636 A | 9/1997 | Ikuma et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,961,476 A | 10/1999 | Betto et al. |
| 5,967,580 A | 10/1999 | Rosheim |
| 5,984,618 A | 11/1999 | Deneve et al. |
| 5,994,864 A | 11/1999 | Inoue et al. |
| 6,016,385 A | 1/2000 | Yee et al. |
| 6,170,162 B1 | 1/2001 | Jacobsen et al. |
| 6,233,504 B1 | 5/2001 | Das et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 7,168,748 B2 | 1/2007 | Townsend et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,841,822 B2 | 11/2010 | Tygard |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,132,835 B2 | 3/2012 | Ban et al. |
| 8,151,401 B2 | 4/2012 | Cheyne |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,892,258 B2 | 11/2014 | Jacobsen et al. |
| 8,942,846 B2 | 1/2015 | Jacobsen et al. |
| 8,974,169 B2 | 3/2015 | Mizner |
| 8,977,388 B2 * | 3/2015 | Jacobsen ............... B66C 1/425 318/568.22 |
| 8,977,398 B2 | 3/2015 | Jacobsen et al. |
| 9,295,604 B2 | 3/2016 | Zoss et al. |
| 9,314,921 B2 | 4/2016 | Jacobsen et al. |

(56) References Cited

U.S. PATENT DOCUMENTS

| | | | |
|---|---|---|---|
| 9,329,587 B2 | 5/2016 | Fudaba et al. | |
| 9,333,097 B2 | 5/2016 | Herr et al. | |
| 9,533,411 B2 | 1/2017 | Jacobsen et al. | |
| 9,616,580 B2 | 4/2017 | Smith et al. | |
| 9,727,076 B2 | 8/2017 | Smith et al. | |
| 9,999,476 B2* | 6/2018 | Griffiths | A61B 34/37 |
| 10,406,676 B2 | 9/2019 | Smith et al. | |
| 10,478,917 B2 | 11/2019 | Legault | |
| 10,512,583 B2 | 12/2019 | Smith | |
| 10,533,542 B2 | 1/2020 | Smith et al. | |
| 10,980,605 B2 | 4/2021 | Hashimoto et al. | |
| 2001/0033146 A1 | 10/2001 | Kato et al. | |
| 2001/0043847 A1 | 11/2001 | Kramer | |
| 2002/0075233 A1 | 6/2002 | White et al. | |
| 2002/0094919 A1 | 7/2002 | Rennex et al. | |
| 2003/0005896 A1 | 1/2003 | Jacobsen et al. | |
| 2003/0049098 A1 | 3/2003 | Parker et al. | |
| 2003/0146720 A1 | 8/2003 | Riwan et al. | |
| 2003/0152452 A1 | 8/2003 | Hodgson | |
| 2003/0223844 A1 | 12/2003 | Schiele et al. | |
| 2004/0004362 A1 | 1/2004 | Love | |
| 2004/0037681 A1 | 2/2004 | Marcotte | |
| 2004/0102723 A1 | 5/2004 | Horst | |
| 2004/0106881 A1 | 6/2004 | McBean et al. | |
| 2004/0116836 A1 | 6/2004 | Kawai et al. | |
| 2004/0246769 A1 | 12/2004 | Ido | |
| 2004/0250644 A1 | 12/2004 | Gosselin et al. | |
| 2005/0059908 A1 | 3/2005 | Bogert | |
| 2005/0099386 A1 | 5/2005 | Kukita | |
| 2005/0159850 A1 | 7/2005 | Melman | |
| 2005/0166413 A1 | 8/2005 | Crampton | |
| 2005/0193451 A1 | 9/2005 | Quistgaard et al. | |
| 2005/0251110 A1 | 11/2005 | Nixon | |
| 2006/0052732 A1 | 3/2006 | Shimada et al. | |
| 2006/0064047 A1 | 3/2006 | Shimada et al. | |
| 2006/0069449 A1 | 3/2006 | Bisbee, III et al. | |
| 2006/0130594 A1 | 6/2006 | Ikeuchi | |
| 2006/0149419 A1 | 7/2006 | Ogawa et al. | |
| 2006/0184275 A1 | 8/2006 | Hosokawa et al. | |
| 2006/0197049 A1 | 9/2006 | Hamada et al. | |
| 2006/0245897 A1 | 11/2006 | Hariki et al. | |
| 2006/0249315 A1 | 11/2006 | Herr et al. | |
| 2007/0052496 A1 | 3/2007 | Niemeyer et al. | |
| 2007/0054777 A1 | 3/2007 | Kawai et al. | |
| 2007/0105070 A1 | 5/2007 | Trawick | |
| 2007/0123997 A1 | 5/2007 | Herr et al. | |
| 2007/0129653 A1 | 6/2007 | Sugar et al. | |
| 2008/0156363 A1 | 7/2008 | Ikeuchi et al. | |
| 2008/0269027 A1 | 10/2008 | Chen | |
| 2008/0271942 A1 | 11/2008 | Yamashita et al. | |
| 2008/0281468 A1 | 11/2008 | Jacobsen et al. | |
| 2009/0036815 A1 | 2/2009 | Ido | |
| 2009/0038258 A1 | 2/2009 | Pivac et al. | |
| 2009/0039579 A1 | 2/2009 | Clifford et al. | |
| 2009/0199883 A1 | 8/2009 | Hiki | |
| 2009/0210093 A1 | 8/2009 | Jacobsen et al. | |
| 2009/0294218 A1 | 12/2009 | Archer et al. | |
| 2009/0294238 A1 | 12/2009 | Gilmore | |
| 2010/0050947 A1 | 3/2010 | Kortekaas | |
| 2010/0089855 A1 | 4/2010 | Kjolseth | |
| 2010/0094185 A1 | 4/2010 | Amundson et al. | |
| 2010/0152630 A1 | 6/2010 | Matsuoka et al. | |
| 2010/0198402 A1 | 8/2010 | Greer et al. | |
| 2010/0241242 A1 | 9/2010 | Herr et al. | |
| 2010/0295497 A1 | 11/2010 | Takamatsu | |
| 2011/0010012 A1 | 1/2011 | Murayama et al. | |
| 2011/0040216 A1 | 2/2011 | Herr et al. | |
| 2011/0046781 A1 | 2/2011 | Summer | |
| 2011/0066088 A1 | 3/2011 | Little et al. | |
| 2011/0071677 A1 | 3/2011 | Stillman | |
| 2011/0219899 A1 | 9/2011 | Dize et al. | |
| 2011/0264230 A1 | 10/2011 | Herr et al. | |
| 2012/0000891 A1 | 1/2012 | Nakanishi et al. | |
| 2012/0060322 A1 | 3/2012 | Simonelli et al. | |
| 2012/0065902 A1 | 3/2012 | Nakajima | |
| 2012/0073930 A1 | 3/2012 | Lansberry et al. | |
| 2012/0137667 A1 | 6/2012 | Jacobsen et al. | |
| 2012/0179075 A1 | 7/2012 | Perry et al. | |
| 2012/0191245 A1 | 7/2012 | Fudaba et al. | |
| 2012/0216671 A1 | 8/2012 | Gammon | |
| 2012/0237319 A1 | 9/2012 | Jacobsen et al. | |
| 2012/0259429 A1 | 10/2012 | Han et al. | |
| 2012/0277901 A1 | 11/2012 | Jacobsen et al. | |
| 2012/0277911 A1 | 11/2012 | Jacobsen et al. | |
| 2012/0277915 A1 | 11/2012 | Jacobsen et al. | |
| 2012/0328395 A1 | 12/2012 | Jacobsen et al. | |
| 2013/0011220 A1 | 1/2013 | Jacobsen et al. | |
| 2013/0013108 A1 | 1/2013 | Jacobsen et al. | |
| 2013/0023803 A1 | 1/2013 | Hsu et al. | |
| 2013/0057001 A1 | 3/2013 | Tsai | |
| 2013/0090580 A1 | 4/2013 | Hong et al. | |
| 2013/0192406 A1 | 8/2013 | Godowski | |
| 2013/0226048 A1 | 8/2013 | Unluhisarcikili et al. | |
| 2013/0253385 A1 | 9/2013 | Goffer et al. | |
| 2013/0296746 A1 | 11/2013 | Herr et al. | |
| 2013/0331744 A1 | 12/2013 | Kamon | |
| 2013/0333368 A1 | 12/2013 | Durfee et al. | |
| 2014/0005831 A1 | 1/2014 | Naderer et al. | |
| 2014/0100492 A1 | 4/2014 | Nagasaka | |
| 2014/0190289 A1 | 7/2014 | Zhu | |
| 2014/0195052 A1 | 7/2014 | Tsusaka et al. | |
| 2015/0073595 A1 | 3/2015 | Fudaba et al. | |
| 2015/0073596 A1 | 3/2015 | Fudaba et al. | |
| 2015/0142172 A1* | 5/2015 | Jacobsen | B25J 13/025 |
| | | | 700/257 |
| 2015/0173929 A1 | 6/2015 | Kazerooni et al. | |
| 2015/0209214 A1 | 7/2015 | Herr et al. | |
| 2015/0278263 A1 | 10/2015 | Bowles et al. | |
| 2015/0321342 A1 | 11/2015 | Smith et al. | |
| 2016/0153508 A1 | 6/2016 | Battlogg | |
| 2016/0331572 A1 | 11/2016 | Popovic et al. | |
| 2016/0332302 A1 | 11/2016 | Bingham et al. | |
| 2016/0332305 A1 | 11/2016 | Gonzalez et al. | |
| 2018/0133905 A1 | 5/2018 | Smith et al. | |
| 2018/0193999 A1* | 7/2018 | Jacobsen | B25J 13/025 |
| 2018/0290309 A1 | 10/2018 | Becker et al. | |
| 2018/0298976 A1 | 10/2018 | Battlogg | |
| 2019/0176320 A1 | 6/2019 | Smith et al. | |
| 2019/0184576 A1 | 6/2019 | Smith et al. | |
| 2021/0069889 A1* | 3/2021 | Jacobsen | B25J 5/005 |

FOREIGN PATENT DOCUMENTS

| | | |
|---|---|---|
| DE | 102010029088 A1 | 11/2011 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 | 10/2016 |
| FR | 2615778 A2 | 12/1988 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S60-177883 U | 11/1985 |
| JP | S62-193784 A | 8/1987 |
| JP | S62-199375 A | 9/1987 |
| JP | S62-200600 A | 9/1987 |
| JP | H01-205985 A | 8/1989 |
| JP | H01-295772 A | 11/1989 |
| JP | H02-51083 U | 4/1990 |
| JP | H02-205494 A | 8/1990 |

(56) References Cited

FOREIGN PATENT DOCUMENTS

| | | |
|---|---|---|
| JP | H02-219377 A | 8/1990 |
| JP | H03-85398 U | 8/1991 |
| JP | H04-44296 U | 4/1992 |
| JP | H05-004177 A | 1/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H08-253950 A | 10/1996 |
| JP | H09-11176 A | 1/1997 |
| JP | H09-328783 A | 12/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-159683 A | 6/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2008-207262 A | 9/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-058616 A | 3/2010 |
| JP | 2010-098130 A | 4/2010 |
| JP | 2010-083434 A | 5/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-142445 A | 7/2013 |
| JP | 5267730 | 8/2013 |
| JP | 2013-248699 A | 12/2013 |
| JP | 2014-054273 A | 3/2014 |
| JP | 2014-073222 A | 4/2014 |
| JP | 2015-212010 A | 11/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2012/149402 A2 | 11/2012 |
| WO | WO 2012/149446 A2 | 11/2012 |
| WO | WO 2012/162229 A1 | 11/2012 |
| WO | WO 2017/148499 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Gupta et al., Wireless Master-Slave Embedded Controller for a Teleoperated Anthropomorphic Robotic Arm with Gripping Force Sensing, 2006, IEEE, p. 1-6 (Year: 2006).*

Gupta et al., Master-Slave Control of a Teleoperated Anthropomorphic Robotic Arm with Gripping Force Sensing, 2006, IEEE, p. 2203-2208 (Year: 2006).*

Tadakuma et al., Development of anthropomorphic multi-D.O.F master-slave arm for mutual telexistence, 2005, IEEE, p. 626-636 (Year: 2005).*

Aghili et al., Sensing the torque in a robot's joints, www.memagazine.org/backissues/september98/features/torque/torque.html, 1998, pp. 1-9, The American Society of Mechanical Engineers.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/ttl0090605/.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grabing_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-besriag-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

(56) References Cited

OTHER PUBLICATIONS

Industrial Magnetics, Inc., PowerLift® Magnets; www.magnenes.com/product.asp?ProductID=1; as accessed Nov. 6, 2012, 2 pages; Boyne City, Michigan.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al., A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, Retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://rypo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, 3¼-20 Thread, http://search.newport.com/?q=*&x2=sku&q2=200, as accessed Apr. 23, 2011, 1 page, Irvine, CA.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKneee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develog-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3, PLOS One, San Francisco, California.

Siddharth et al., Design and Analysis of a 1-DOF Walking Mechanism, http://siddharthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suleiman, Engineering an affordable exoskeleton, Phys.org, https://phys.org/news/2014-06-exoskeleton.html, Jun. 12, 2014, 5 pages, Science X Network.

Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on

(56) References Cited

OTHER PUBLICATIONS

Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the 10th International Workshop on Robot Motion and Control, Jul. 6-8, 2015, 6 pages, IEEE, Poland.

Office Action for Japan Application No. 2022-076626 dated May 8, 2023, 12 pages.

\* cited by examiner

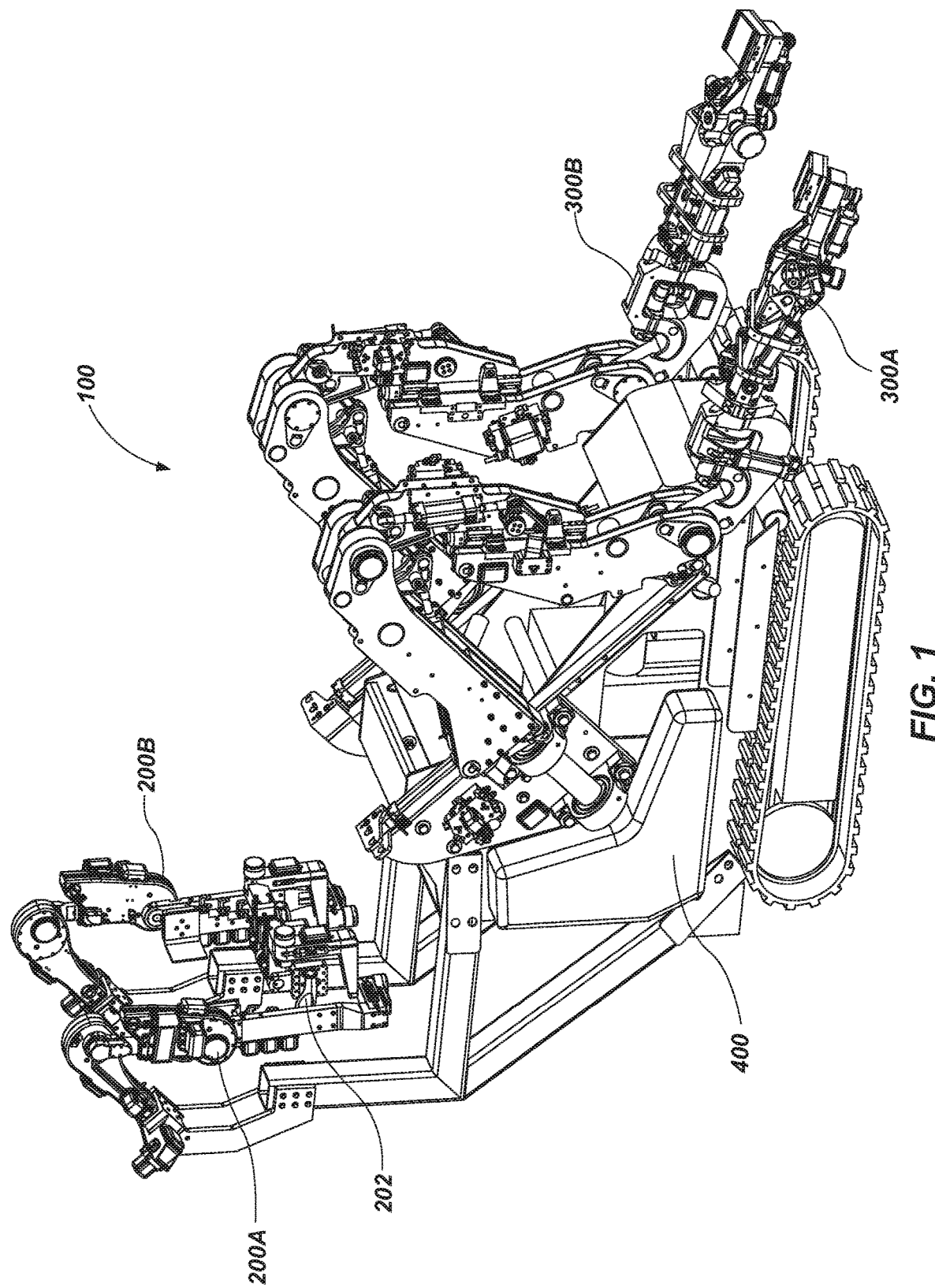

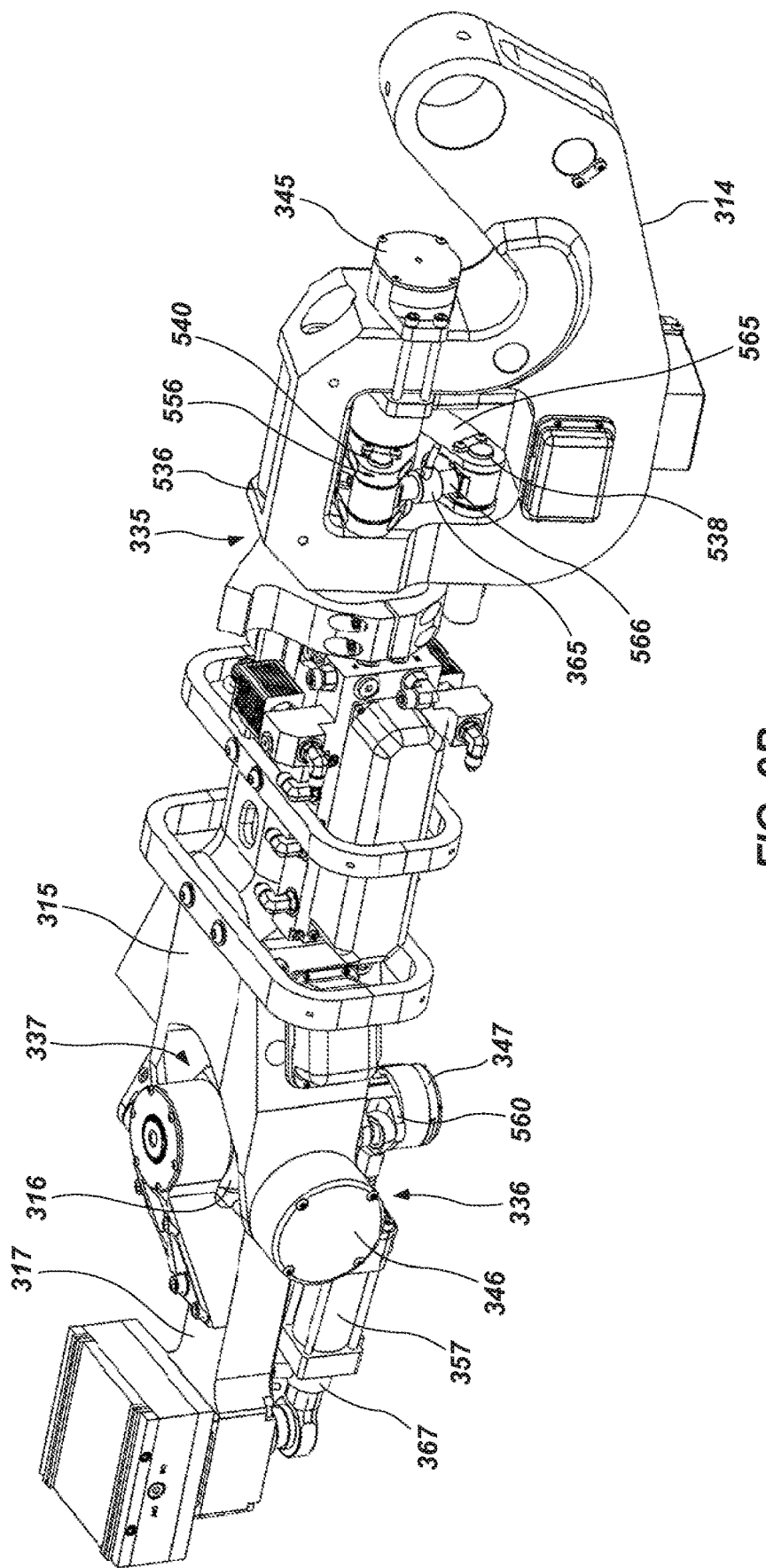

TELEOPERATED ROBOTIC SYSTEM WITH IMPACT RESPONSIVE FORCE FEEDBACK

PRIORITY DATA

This is a continuation application of U.S. application Ser. No. 16/932,666, filed Jul. 17, 2022, entitled "Teleoperated Robotic System" which is a continuation application of U.S. application Ser. No. 15/786,472, filed Oct. 17, 2017, entitled "Teleoperated Robotic System" which is a continuation of U.S. application Ser. No. 13/332,165, filed Dec. 20, 2011, entitled "Teleoperated Robotic System" which claims the benefit of U.S. Provisional Application Ser. No. 61/481,110, filed Apr. 29, 2011; 61/481,103, filed Apr. 29, 2011; 61/481,089, filed Apr. 29, 2011; 61/481,099, filed Apr. 29, 2011; 61/481,095, filed Apr. 29, 2011; and 61/481,091, filed Apr. 29, 2011, each of which are incorporated by reference herein in their entirety.

BACKGROUND

Lifting and transporting objects and items from one location to another often presents considerable problems in terms of not being safe, efficient and/or cost effective. These problems can be exacerbated in those industries and environments (e.g., shipyards, warehouses, military deployment locations, etc.) where all of the lifting and/or transporting of objects or items is required to be done manually due to the unavailability of lift or transport assistance systems, or where a part of the lifting and/or transporting of objects is done with at least some assistance, but the assistance is done with an available lift or transport assistance system limited in its functionality, thus making its use impractical or ineffective for certain tasks.

The difficulty of lifting and/or transporting objects from one location to another, or even the inability to do so, when such is needed is commonly referred to as a "lift gap," with the discipline being referred to as "gap logistics." Currently, there are several so called "lift gaps" associated with payloads of up to 400 lbs presenting considerable problems and challenges in public, private and military settings. In many cases, logistics personnel are often required to lift, transport or otherwise manipulate heavy or bulky payloads in any way possible, sometimes with the help of awkward and ineffective and/or inefficient assistance systems, and sometimes manually without assistance.

One illustrative example is in logistics (e.g., military or other types of logistics settings), which can comprise the discipline of carrying out the movement, maintenance and support of various objects. In short, logistics can include the aspects of acquisition, storage, distribution, transport, maintenance, evacuation, and preparation of material and equipment. Whatever the setting, logistics support personnel often faces the challenge of lifting and transporting equipment that can weigh up to several hundred pounds or more, thus posing significant logistics problems. Moving these about can require great effort on the part of logistics personnel, even with the help of the limited functionality assistance systems made available to them. Additional challenges or problems exist when there is a large number of objects required to be lifted and transported, particularly on a daily basis, even if these objects weigh less than the relatively heavier objects. Indeed, it is not uncommon for logistics personnel to each lift and transport several thousand pounds a day, sometimes over difficult terrain. Moreover, much of this is done manually, unfortunately leading to a variety of orthopedic and other injuries, as well as a high rate in personnel turnover.

Therefore, a need exists for a system that can be intuitively operated by a user and that performs most, if not all, of the work associated with lifting and maneuvering heavy and/or large number of objects from one location to another.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings.

FIG. 1 is a perspective view of a teleoperated robotic system in accordance with an example of the present disclosure.

FIG. 9B is another perspective view of the fourth support member, the fifth support member, the sixth support member, and the seventh support member of FIG. 9A.

DETAILED DESCRIPTION

Figure 2A:
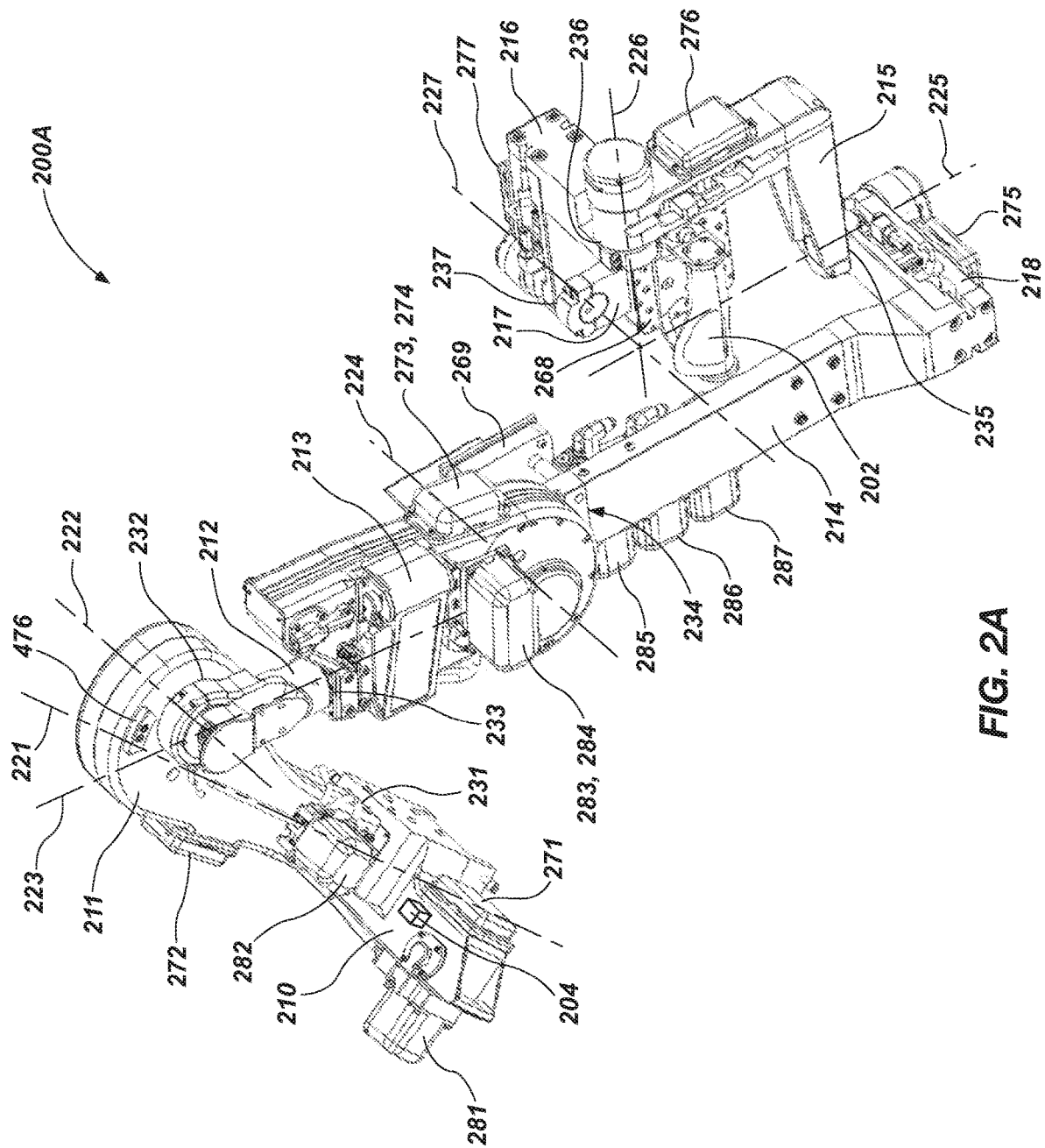
FIG. 2A is a perspective view of a master control arm in accordance with an example of the present disclosure.

The present invention is related to nonprovisional U.S. patent application Ser. No. 13/332,152, filed Dec. 20, 2011, and entitled, "System and Method for Controlling a Teleoperated Robotic Agile Lift System"; Ser. No. 13/332,138, filed Dec. 20, 2011, and entitled, "Platform Perturbation Compensation"; Ser. No. 13/332,146, filed Dec. 20, 2011, and entitled, "Robotic Agile Lift System with Extremity Control; Ser. No. 13/332,129, filed Dec. 20, 2011, and entitled, "Multi-degree of Freedom Torso Support for a Robotic Agile Lift System"; Ser. No. 13/332,160, filed Dec. 20, 2011, and entitled, "Variable Strength Magnetic End Effector for Lift Systems", each of which are incorporated by reference in their entirety herein.

As used herein, the singular forms "a," and, "the" include plural referents unless the context clearly dictates otherwise. Thus, for example, reference to "a robotic arm" includes one or more of such robotic arms and reference to a "degree of freedom" (DOF) includes reference to one or more of such DOFs (degrees of freedom).

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. Unless otherwise indicated, it is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

Reference will now be made to certain examples, and specific language will be used herein to describe the same. Examples discussed herein set forth a teleoperated robotic system that can be intuitively operated by a user and that is capable of performing most, if not all, of the work associated with lifting and maneuvering heavy objects, or large numbers of objects having differing weights. In particular examples, the teleoperated robotic system can include master control arms and slave arms controllable by the master control arms.

In one example, a teleoperated robotic system can comprise a master control arm having at least two support members coupled together about a joint to form a degree of freedom corresponding to a degree of freedom of one of a shoulder, an elbow, and a wrist of a human arm; a slave arm having at least two support members coupled together about a joint to form a degree of freedom corresponding to the degree of freedom of the master control arm; and a mobile platform maneuverable about a ground surface and within an operating environment, the mobile platform being adapted to provide onboard support of a user within an operating area that facilitates selective operation of at least one of the master control arm and the mobile platform, wherein the master control arm and the slave arm are commonly supported about the mobile platform to provide a mobile teleoperation function.

In another example, a platform operable within a teleoperated robotic system can comprise a base; a support system for facilitating support of at least one of a master control arm and a slave arm; a power system that facilitates powering of the at least one master control arm and slave arm; and a control system that facilitates operation of the at least one master control arm and slave arm.

In another example, a master control arm for controlling movement of a slave arm within a teleoperated robotic system can comprise at least two support members coupled together about a joint to provide a degree of freedom corresponding to a degree of freedom of one of a shoulder, an elbow, and a wrist of a human arm; a position sensor associated with the joint that measures a position value of the at least two support members at the degree of freedom; a first load sensor associated with the joint that measures a first load value in the degree of freedom, wherein a corresponding joint of the slave arm is manipulated based on at least one of the position value and the first load value; a second load sensor associated with the degree of freedom that measures a second load value from a load applied by a user; and an actuator coupled to the at least two support members to apply a load to the at least two support members based, at least in part, on the second load value.

In another example, a master control arm having multiple degrees of freedom, and operable within a teleoperated robotic system to control movement of a slave arm, can comprise a plurality of support members coupled together about a plurality of joints having at least one degree of freedom; a position sensor associated with each of the joints that detects a change in position of the master control arm at each degree of freedom; a load sensor associated with each of the joints that measures a load in the at least one degree of freedom, and provides load data for the at least one degree of freedom; a user interface device having at least one load sensor offset from the joints that measures a load applied to the user interface device by a user, and provides load data for the at least one degree of freedom that is in addition to the load data from the load sensor associated with the at least one degree of freedom; and a torque assistance function that utilizes the load data from the load sensor of the user interface device to facilitate actuated movement of the master control arm in response to a load applied to the master control arm by the user, and that reduces the forces necessary to move the master control arm.

In another example, a teleoperated robotic system can comprise a platform; a slave arm; and a master control system comprising a frame member, and at least one master control arm supported about the frame member, wherein the master control system is removably coupled to the platform to facilitate selective on-board off-board user control of the slave arm relative to the platform.

In another example, a teleoperated robotic system can comprise three slave arms; a first master control arm configured to control at least one of the three slave arms; a second master control arm configured to control at least one of the three slave arms; and a control module that facilitates user determination of which of the at least three slave arms are to be controlled by the first and second master control arms.

In another example, a teleoperated robotic system can comprise a mobile platform comprising a primary platform being moveable with respect to a supporting surface, and a secondary platform coupled to the primary platform and being moveable with respect to the primary platform, wherein the secondary platform operates to support a robotic slave arm controllable by a master control arm.

In another example, a lifting device can comprise a platform; a fixed arm with cogs on a first end, the fixed arm being coupled to the platform about a second end; a bracket having a first end and a second end, the first end being rotatably coupled to the first end of the fixed arm about a pivot point; an actuator coupled to the platform and the bracket for rotating the bracket around the pivot point; a lift gear coupled to the second end of the bracket; a center gear coupling the lift gear to the cogs on the first end of the fixed arm; and a keyed lift carriage coupled to the lift gear, wherein the keyed lift carriage maintains a level position when the lift gear is rotated.

In another example, a folding lifting device can comprise a platform; a mast rotatably connected to the platform, wherein the mast can rotate from a vertical position to a folding position onto the platform; a carriage slidably connected to the mast, wherein the carriage can slide along the mast; and an actuator coupled to the platform and the mast to rotate the mast between a vertical position and folded position.

In another example, a teleoperated robotic system can comprise a master control arm having at least two support members coupled together about a joint to form a degree of freedom corresponding to a degree of freedom of one of a shoulder, an elbow, and a wrist of a human arm, a position sensor associated with the joint that measures a position value of the at least two support members at the degree of freedom, a first load sensor associated with the joint that measures a first load value in the degree of freedom, wherein a corresponding joint of the slave arm is manipulated based on at least one of the position value and the first load value, a second load sensor associated with the degree of freedom that measures a second load value from a load applied by a user, and an actuator coupled to the at least two support members to apply a load to the at least two support members based, at least in part, on the second load value; and a slave arm controllable by the master control arm having at least two support members coupled together about a joint to form a degree of freedom corresponding to the degree of freedom of the master control arm.

In another example, a teleoperated robotic system can comprise a master control arm having a plurality of support members coupled together about a plurality of joints having at least one degree of freedom, a position sensor associated with each of the joints that detects a change in position of the master control arm at each degree of freedom, a load sensor associated with each of the joints that measures a load in the at least one degree of freedom, and provides load data for the at least one degree of freedom, a user interface device having at least one load sensor offset from the joints that measures a load applied to the user interface device by a user, and provides load data for the at least one degree of freedom that is in addition to the load data from the load sensor associated with the at least one degree of freedom, and a torque assistance function that utilizes the load data from the load sensor of the user interface device to facilitate actuated movement of the master control arm in response to a load applied to the master control arm by the user, and that reduces the forces necessary to move the master control arm; and a slave arm controllable by the master control arm having a plurality of support members coupled together about a plurality of joints to form at least one degree of freedom corresponding to the at least one degree of freedom of the master control arm.

In another example, a teleoperated robotic system can comprise a master control arm having at least two support members coupled together about a joint to form a degree of freedom corresponding to a degree of freedom of one of a shoulder, an elbow, and a wrist of a human arm; a slave arm having at least two support members coupled together about a joint to form a degree of freedom corresponding to the degree of freedom of the master control arm; and a mobile platform maneuverable about a ground surface and within an operating environment, the mobile platform being adapted to provide onboard support of a user, wherein the master control arm and the slave arm are commonly supported about the mobile platform to provide a mobile teleoperation function and wherein a master/slave relationship filtering function that filters frequencies resulting from induced movements of at least one of the master control arm and slave arm to reduce motion feedback that propagates through the mobile platform.

In another example, a teleoperated robotic system can comprise a plurality of master control arms, each having at least two support members coupled together about a joint to form a degree of freedom corresponding to a degree of freedom of one of a shoulder, an elbow, and a wrist of a human arm; and a slave arm having at least two support members coupled together about a joint to form a degree of freedom corresponding to the degree of freedom of the plurality of master control arms; and a control module that facilitates alternate and selective control and operation of the slave arm by any one of the plurality of master control arms.

In another example, a teleoperated robotic system can comprise a master control arm having at least two support members coupled together about a joint to form a degree of freedom corresponding to a degree of freedom of one of a shoulder, an elbow, and a wrist of a human arm; and a plurality of slave arms, each having at least two support members coupled together about a joint to form a degree of freedom corresponding to the degree of freedom of the plurality of master control arms; and a control module that facilitates alternate and selective individual control and operation of any one of the plurality of slave arms by the master control arm.

In another example, a master control arm operable within a teleoperated robotic system to control movement of a slave arm can comprise a first support member and a second support member coupled together about a joint having a degree of freedom corresponding to a degree of freedom of a wrist of a human arm, wherein at least one of the first support member and the second support member is configured to position the degree of freedom of the joint in substantial alignment with a corresponding degree of freedom of a wrist of a user; a position sensor associated with the joint that detects a change in position of the master control arm at the degree of freedom of the joint; a load sensor associated with the joint that measures a load at the degree of freedom of the joint; and an actuator coupled to the first support member and the second support member to facilitate an actuated load at the degree of freedom of the joint in response to an external load.

In another example, a slave arm operable within a teleoperated robotic system to respond to movement of a master control arm can comprise a first support member and a second support member coupled together about a joint having a degree of freedom corresponding to a degree of freedom of the master control arm, wherein a lateral edge of the first support member overlaps a lateral edge of the second support member to facilitate relative rotation of the first support member and the second support member such that the first support member and the second support member swing relative to one another about an axis associated with the slave arm degree of freedom; a first linkage rotatably coupled to the first support member and configured for motion in a plane; and a second linkage rotatably coupled to the first linkage and the second support member, wherein motion by the first linkage in the plane causes an out of plane relative rotational movement of the first support member and the second support member about the axis associated with the slave arm degree of freedom.

In another example, a slave arm operable within a teleoperated robotic system to respond to movement of a master control arm can comprise a first support member and a second support member coupled together about a joint having a degree of freedom corresponding to a degree of freedom of the master control arm; an actuator coupled to the first support member and the second support member to apply a load about the degree of freedom of the slave arm, the actuator being configured to receive fluid pressure to operate the actuator; a servo valve fluidly coupled to the actuator to control the fluid pressure to the actuator; and a clamp valve that fluidly isolates the actuator from the servo valve to lock the actuator and prevent movement of the associated degree of freedom.

In another example, a slave arm operable within a teleoperated robotic system to respond to movement of a master control arm can comprise a first support member and a second support member coupled together about a joint having a degree of freedom corresponding to a degree of freedom of the master control arm; an actuator coupled to the first support member and the second support member to apply a load about the degree of freedom of the slave arm, the actuator having a first side and a second side to receive fluid pressure to operate the actuator; a servo valve fluidly coupled to the first side of the actuator and the second side of the actuator to control the fluid pressure to the actuator; and a clamp valve to fluidly isolate the actuator from the servo valve to lock the actuator and prevent movement of the associated degree of freedom, the clamp valve comprising a first check valve and a second check valve, each fluidly coupled between the first side of the actuator and the servo valve, wherein, when closed, the first check valve restricts flow from the actuator to the servo valve and the second check valve restricts flow from the servo valve to the actuator, a third check valve and a fourth check valve, each fluidly coupled between the second side of the actuator and the servo valve, wherein, when closed, the third check valve restricts flow from the actuator to the servo valve and the fourth check valve restricts flow from the servo valve to the actuator, and a pilot valve fluidly coupled to the first check valve, the second check valve, the third check valve, and the fourth check valve to open the check valves with a pilot pressure and allow the servo valve to control the fluid pressure to the actuator, wherein removal of the pilot pressure allows the check valves to close such that fluid is prevented from flowing from the servo valve to the actuator and from the actuator to the servo valve.

In another example, a slave arm system operable within a teleoperated robotic system to respond to movement of a master control arm and to stabilize a payload can comprise a slave arm having a plurality of support members coupled together about a plurality of joints, and a load sensor associated with one of the plurality of support members that measures a load applied by a payload in at least one degree of freedom and provides load data for the payload; and a payload stabilization function that utilizes the load data for the payload to facilitate actuated movement of the slave arm in response to the load applied to the load sensor by the payload, and that causes the slave arm to respond to the load applied to the payload to stabilize the payload.

In another example, a robotic arm inventory system can comprise a platform; a robotic arm coupled to the platform; an end effector coupled to an end of the robotic arm; and a scanning device coupled to the robotic arm to scan an object tag affixed to a object manipulated by the robotic arm.

In another example, a lifting device can comprise a platform; a fixed arm with cogs on a first end and coupled to the platform on a second end of the fixed arm; a pivot point on a first end of a bracket rotatably coupled to the first end of the fixed arm; an actuator coupled to the platform and the bracket for rotating the bracket around the pivot point; a lift gear coupled to a second end of the bracket; a center gear coupling the lift gear to the cogs on the first end of the fixed arm; and a keyed lift carriage coupled to the lift gear, wherein the keyed lift carriage maintains a level position when the lift gear is rotated.

In another example, a lifting device can comprise a platform; a right fixed arm with cogs on a first end and coupled to the platform on a second end of the right fixed arm; a left fixed arm with cogs on a first end and coupled to the platform on a second end of the left fixed arm; a right pivot point on a first end of a right bracket rotatably coupled to the first end of the right fixed arm; a left pivot point on a first end of a left bracket rotatably coupled to the first end of the left fixed arm; an actuator coupled to the platform and at least the right or left bracket for rotating the at least the right or left bracket around the pivot point; a right lift gear coupled to a second end of the right bracket; a left lift gear coupled to a second end of the left bracket; a right center gear coupling the right lift gear to the cogs on the first end of the right fixed arm; a left center gear coupling the left lift gear to the cogs on the first end of the left fixed arm; and a keyed lift carriage between the right and left bracket coupled to the right and left lift gear, wherein the keyed lift carriage maintains a constant angular position relative to the fixed arm when the lift gear is rotated.

In another example, a folding lifting device can comprise a platform; a mast rotatably connected to the platform, wherein the mast can rotate from a vertical position to a folding position onto the platform; a carriage slidably connected to the mast, wherein the carriage can slide along the mast; and an actuator coupled to the platform and the mast to rotate the mast between a vertical position and folded position.

With these general examples set forth above, it is noted in the present disclosure that when describing various exemplary embodiments of the teleoperated robotic system, or the related devices or methods, each of these descriptions may be considered applicable to the other, where appropriate, whether or not they are explicitly discussed in the context of that example. For example, in discussing the teleoperated robotic system per se, the device and/or method examples are also included in such discussions, and vice versa.

Furthermore, various modifications and combinations can be derived from the present disclosure and illustrations, and as such, the following disclosure and the discussed figures should not be considered limiting.

Illustrated in FIG. 1 is a teleoperated robotic system 100 (e.g., a lift system) in accordance with one exemplary embodiment of the present invention. The system 100 can include master control arms 200A, 200B, slave arms 300A, 300B, and a platform 400. In operation, a user manipulates the master control arms to control movement of the slave arms. As illustrated, the teleoperated robotic system can include two master control arms and two slave arms. It should be recognized that a teleoperated robotic system of the present invention is not limited in the number or combination of master control arms and slave arms and may only be limited by intended use or other practical considerations. In a particular aspect, a teleoperated robotic system after the manner disclosed herein can include a single master control arm and a single slave arm. Likewise, in another aspect, a teleoperated robotic system after the manner disclosed herein can include a plurality of master control arms and a plurality of slave arms, which can be the same or different in number (e.g., two master control arms and three slave arms controlled by the two master control arms).

Master control arms 200A and 200B can be similar in construction and operation or can share other attributes such as the number of DOF. As shown in the figure, one difference may be that master control arm 200A is configured for a right side of the user and master control arm 200B is configured for a left side of the user. The same can be said for slave arms 300A and 300B. However, it should be recognized that two or more master control arms (or slave arms) need not be similarly configured and may differ as to the number of DOF or other attributes.

In some exemplary embodiments, the master control arms and the slave arms can be mounted or otherwise supported on or about a platform 400. The platform 400 can comprise, for example, a mobile platform, as shown in the figure, or one that is fixed at a permanent location. In one aspect, a mobile platform can provide support for the slave arms. In another aspect, a platform can provide simultaneous or common support for the slave arms, as well as the master control arms and a teleoperator, or user, of the robotic system, thus permitting these to be part of an overall mobile robotic system providing a mobile teleoperation function, wherein the mobile robotic system also supports the user to facilitate an on-board control capability within a mobile teleoperated robotic architecture. The mobile platform can be adapted to provide on-board support of a user within an operating area (area about the mobile platform that receives a user and allows the user to perform operational functions), the operating area facilitating selective operation of both the master control arms and the mobile platform. A mobile teleoperation function further facilitates a dynamic and moveable zone of operation in which the slave arms are operating, as well as a mobile zone of operation in which the master control arms operate.

Whether the slave arms are supported about the mobile platform in combination with the master control arms or whether the master control arms are remotely located, if configured as a mobile platform, the platform can allow at least part of the teleoperated robotic system to be moved from place to place to locate the slave arms in different positions for use. In the embodiment where the master control arms and the slave arms are supported about the same mobile platform, advantageously the user can be positioned on the platform (i.e., the mobile platform comprising an operating area, wherein the user is supported about the mobile platform and is able to operate the teleoperated robotic device from the operating area), such that the user is near the zone of operation, wherein the user can see and hear, directly, the slave arms and the workspace in which the slave arms operate. Visual and/or audio information can enable the user to better manipulate the master control arms to control movement of the slave arms.

As discussed below, in another aspect, the user and master control arms can be remotely located relative to the slave arms. In this case, the robotic system supporting the slave arms can include various sensors (e.g., a camera, microphone, or other sensing instruments) to convey information (e.g., visual and/or audio information) from the workspace to the remote user. With the received information reproduced from the slave arm workspace, the user can manipulate the master control arms to control movement of the slave arms in the workspace.

The master control arm can be configured to be manipulated by the user to control the movement of a slave arm, wherein movement by the user results in a corresponding movement by the slave arm. For example, the user can grasp a handle 202 located at a distal end of the master control arm 200A to manipulate the master control arm. In general, the master control arm can include joints and linkages that correspond to the user's arm, such that movement of the user's arm causes the master control arm to move in a manner similar to the user's movement. The slave arm can include joints and linkages that correspond to the master control arm, and thus, the user's arm as well. The movement of the master control arm can then cause the slave arm to move in a manner similar to the movement of the master control arm, thus allowing the user to control movement of the slave arm.

Figure 2B:
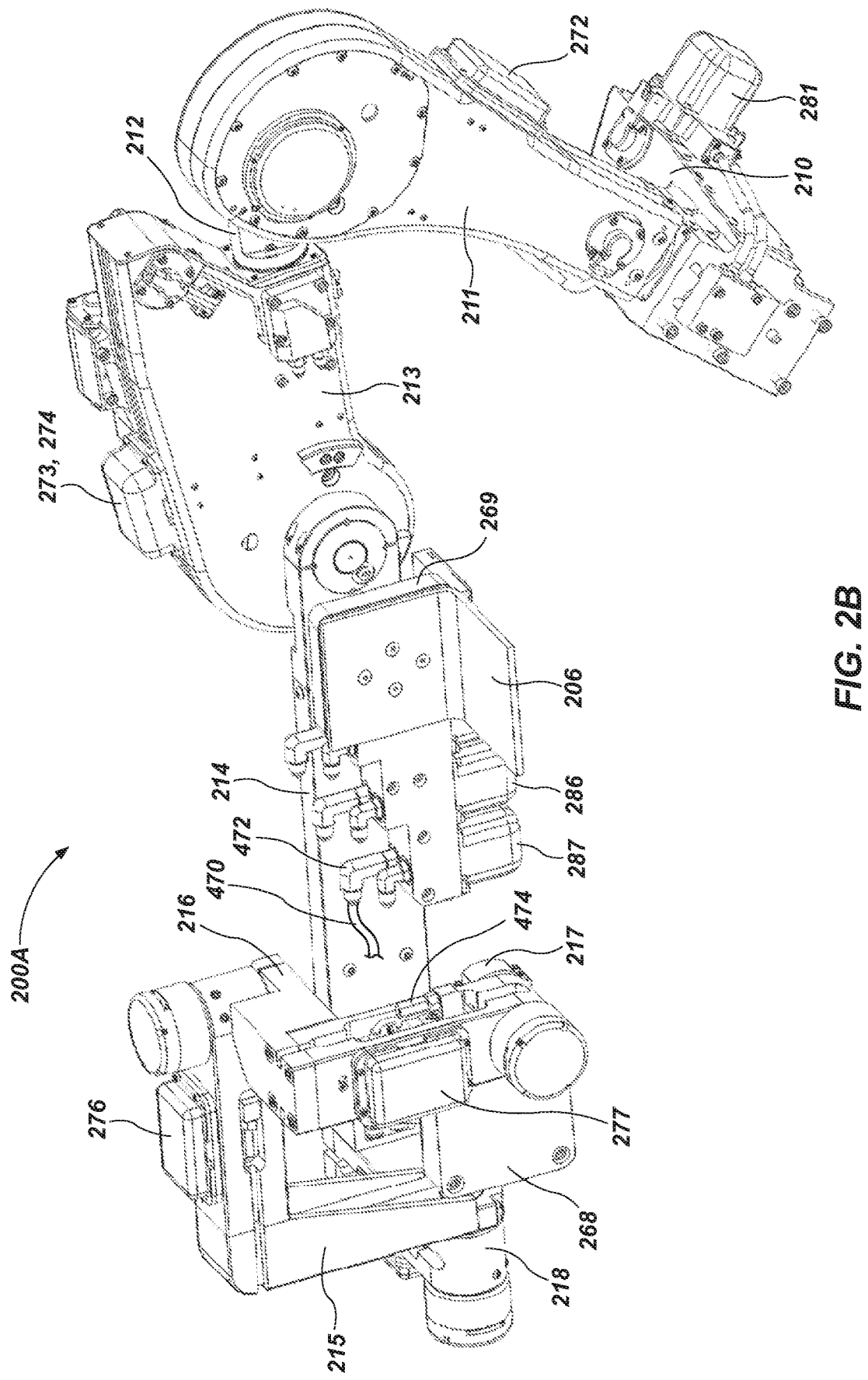
FIG. 2B is another perspective view of the master control arm of FIG. 2A.

Referring to FIGS. 2A and 2B, illustrated is master control arm 200A. For simplicity, the master control arm 200A is shown independent of other components of the robotic system, such as master control arm 200B, slave arms 300A, 300B, and platform 400. In one embodiment, master control arm 200A can be mounted, installed, or otherwise associated with any platform such as those taught by the present disclosure, such that the platform supports the master control arm. In another embodiment, the master control arm can be separate from the platform such that a slave arm associated with the platform can be controlled by the master control arm from a distance.

As used herein, the terms "kinematically equivalent" or "kinematic equivalence" refer to a relationship between two or more separate systems of rigid bodies, wherein the rigid bodies of each system are linked by rotational joints to provide rotational degrees of freedom (DOF). Kinematically equivalent systems have similar corresponding rotational DOF, which are joined by similar corresponding linkages that are proportional in length between the systems. It is noted that "equivalent" or "equivalence" does not refer to a kinematic identity between the systems. Indeed, "kinematically equivalent" or "kinematic equivalence" can include some degree of variation from true kinematic identity, as is illustrated further below and throughout the present disclosure.

In one aspect, the master control arm 200A can be kinematically equivalent to a user's arm from the shoulder to the wrist. A human arm includes seven degrees of freedom from the shoulder to the wrist. Specifically, a human shoulder includes three DOF: abduction/adduction, flexion/extension, and humeral rotation. A human elbow includes one DOF. A human wrist can be generalized to include three DOF: wrist rotation, abduction/adduction, and flexion/extension. The upper arm extends from the shoulder and is connected to the lower arm by the elbow. The wrist is at the opposite end of the lower arm. The human arm from the shoulder to the wrist can thus be generalized as a kinematic system that includes a first joint having three rotational DOF connected to a second joint having one DOF by a first linkage, which is connected to a third joint having three DOF by a second linkage.

The master control arm 200A can be configured as a kinematic system to include DOF and linkages that correspond to the DOF and linkages of the human arm from the shoulder to the wrist. For example, a first support member 211 is coupled to base 210 at joint 231, which enables rotation about axis 221. The DOF about axis 221 represents a rotational DOF corresponding to abduction/adduction of the human shoulder. As shown in FIG. 2, axis 221 is at about a 45 degree angle relative to a horizontal plane. Axis 221 can be positioned from about 0 degrees to about 90 degrees relative to a horizontal plane. A 45 degree angle for axis 221 can allow the base 210 to be positioned behind the user, which can be advantageous for locating support apparatus for the master control arm to allow unrestricted movement of the user during use of the master control arm. Axis 221 can be offset (e.g., up to several feet) from the user's shoulder and still form part of a system that is kinematically equivalent to the user's arm. In one aspect, the DOF about axis 221 is the least sensitive DOF in establishing kinematic equivalence with the user's arm. In other words, more variation can be tolerated here than between other corresponding DOF between the master control arm and the user's arm.

First support member 211 can extend from the base 210 to position joint 232 in the vicinity of the user's shoulder. Joint 232 is coupled to or connects a second support member 212 and forms axis 222. The DOF about axis 222 represents a rotational DOF corresponding to flexion/extension of the human shoulder. In some aspects, joint 232 can be positioned to a side of the user's shoulder. In other aspects, joint 232 can be above or below the user's shoulder. In still other aspects, joint 232 can be in front of or behind the user's shoulder. Joint 232 can be offset (e.g., up to several feet) from the user's shoulder and still form part of a system that is kinematically equivalent to the user's arm. In one aspect, the DOF about axis 222 is the second least sensitive DOF in establishing kinematic equivalence with the user's arm.

The second support member 212 extends from the joint 232 and is coupled to or connects a third support member 231 by joint 233, which forms axis 223. The DOF about axis 223 represents a rotational DOF corresponding to humeral rotation of the human shoulder. Joint 233 can be offset (e.g., up to several feet) from the user's shoulder and still form part of a system that is kinematically equivalent to the user's arm. In one aspect, the DOF about axis 223 is the third least sensitive DOF in establishing kinematic equivalence with the user's arm.

Thus, in a kinematically equivalent system, three separate joints of the master control arm 200A can correspond to the single joint of the human shoulder. In general, the DOF of the master control arm corresponding to the human shoulder are the least sensitive DOF in establishing kinematic equivalence between the master control arm and the user's arm. In other words, the location and orientation of the DOF of the master control arm corresponding to the human shoulder can tolerate the most variation or offset distance from the corresponding user's arm and still be considered to provide kinematic equivalence with the user's arm. In such cases, the various support members will comprise various lengths to provide such offset distances of the respective joints. In a particular aspect, the DOF of the master control arm corresponding to the human shoulder can be ordered as abduction/adduction, flexion/extension, and humeral rotation in increasing sensitivity for establishing kinematic equivalence between the master control arm and the human shoulder.

The second support member 212 and the third support member 213 combine to form a linkage between axis 222 and axis 224 that corresponds to the human upper arm. The third support member 213 is coupled to a fourth support member 214 by joint 234, which forms axis 224. The DOF about axis 224 represents a rotational DOF corresponding to a human elbow. In general, the linkage formed by the second support member 212 and the third support member 213 can position the joint 234 in the vicinity of the user's elbow, such as to a side of the user's elbow. Joint 234 can be up to several feet from the user's elbow and still form part of a system that is kinematically equivalent to the user's arm. In one aspect, the DOF about axis 224 is less tolerant of variation than the DOF corresponding to the user's shoulder and thus is a more sensitive DOF in establishing kinematic equivalence with the user's arm.

The fourth support member 214 is coupled to a fifth support member 215 at joint 235, which forms axis 225. The DOF about axis 225 represents a rotational DOF corresponding to human wrist rotation. The fifth support member 215 is coupled to a sixth support member 216 at joint 236, which forms axis 226. The DOF about axis 226 represents a rotational DOF corresponding to human wrist abduction/adduction. The sixth support member 216 is coupled to a seventh support member 217 at joint 237, which forms axis 227. The DOF about axis 227 represents a rotational DOF corresponding to human wrist flexion/extension. Thus, three separate joints of the master control arm can correspond to the human wrist. It will be recognized that the DOF of the master control arm corresponding to the DOF of the user's wrist may be the most sensitive and least tolerant of variation in establishing kinematic equivalence with the user's arm from the shoulder to the wrist. Therefore, in one aspect, the degree of permissible variation between kinematically equivalent system can differ along the length of one of the systems, thus providing different kinematic configurations. For example, in another exemplary embodiment, the master control arm may be configured to comprise any one or more support members (e.g., those that provide the DOF corresponding to those in human shoulder) that are longer or shorter than the ones illustrated in FIGS. 1 and 2A-2B, thus facilitating the location of the respective joints in a variety of different locations or positions such as may be needed or desired.

In one aspect, the DOF about axis 227 is the most sensitive to variation for kinematic equivalency, the DOF about axis 226 is the second most sensitive, and the DOF about axis 225 is the third most sensitive. Accordingly, axes 225, 226, 227 closely correspond with the location of the user's wrist DOF. In one aspect, the axes 225, 226, 227 may be located within about six inches of the user's wrist. In a more particular aspect, the axes 225, 226, 227 may be located within about two inches of the user's wrist. In an even more particular aspect, the axes 225, 226, 227 may be located within about one inch of the user's wrist.

In certain aspects, a master control arm can include fewer than seven DOF and still be considered kinematically equivalent to a human arm to the extent of the corresponding DOF of the human arm. In certain other aspects, a master control arm can include greater than seven DOF and still be considered kinematically equivalent to a human arm to the extent of the corresponding DOF of the human arm. In this case, excess DOF that do not correspond to a human arm may not be kinematically equivalent to the human arm.

The master control arm and the slave arm can have several operating modes. One operating mode is position control. With position control, the positions of the various DOF of the master control arm are used to control the position of the various DOF of the slave arm. The positional relation between the master control arm and the slave arm can be a proportional relationship. In one aspect, the proportional position relationship between the master control arm and the slave arm can be a one-to-one relationship where a certain amount of movement in the master control arm results in the same amount of movement in the slave arm. This could be a useful general-purpose control setting. In another aspect, the proportional position relationship between the master control arm and the slave arm can comprise something different than one-to-one. For example, a relationship may exist where a large master control arm movement results in a relatively small slave arm movement. This could be useful when the user desires a precise movement or finer control over the slave arm. In still another aspect, the proportional position relationship between the master control arm and the slave arm can comprise a relationship where a small master control arm movement results in a relatively large slave arm movement. This could be useful when the user desires a gross movement to rapidly move the slave arm without excess or unnecessary movement by the user.

In one aspect, the proportional relationships can be consistent or they can vary among the corresponding DOF of the master control arm and the slave arm. In another aspect, the proportional relationships can be modified. For example, the system can be configured to allow the user the freedom to alter the proportional positional relationships between the master control arm and the slave arm DOF during operation of the robotic system. In one aspect, the user can vary the proportional relationships using a manual control accessible while the user is operating the master control arm. In a specific aspect, the manual control can comprise a dial or button (e.g., one that is mounted on the master control arm on or near the handle 202) that allows the user to dial in or select a desired proportional relationship. In other examples, the manual control can be via a touch screen mounted near the user or elsewhere on the system, or can be via an application on the user's smart phone or other PDA device that wirelessly communicates with the system. The manual control can be configured to communicate with the various control systems in order to manipulate the input/output relationship between the master and slave.

In another aspect, the user can control the positional boundaries of the workspace, for example to limit the workspace to something smaller than the actual full reach of the slave arms, such as by a range of motion limitation that will prohibit the slave arm from extending beyond the imposed limit. Such limitations can be initiated by the user using a user interface operable with the various control systems. The user interface may be located on the master control arm or at another user accessible location, such as a control console.

Another operating mode includes force reflection from the slave arm to the master control arm. With force reflection, the user is provided with an additional sensory input for operating the slave arms. Unlike positional control, where the slave arm will operate to carry out the positional command from the master control arm regardless of obstacles that may be in the path of the slave arm, force reflection provides a proportional force feedback to the user via the master control arm to indicate loads that the slave arm is experiencing. For example, if the slave arm encounters an obstacle while executing a positional command from the master control arm, a load sensor on the slave arm can provide load information that is communicated to the master control arm, and actuators operable with the master control arm can apply a proportional load to the user based on the load information, which proportional load may be varied or different depending upon the particular operating environment and what may be desired to be applied to the user. With this force feedback, the user can more intuitively control the slave arm in the operating environment because it more closely resembles the user's experience operating the user's own body in everyday life.

In one aspect, the system can be configured to apply a force or load to the user that is proportional to the weight of an object being picked up by the slave arm. For example, if an object weighs 500 pounds, the proportional force reflected load experienced by the user could be 10 pounds. In another aspect, force reflection functions can be implemented that apply a force or load to the user when the slave arm encounters an object, wherein the user feels the resistance of the object via the master control arm and can take action to avoid or minimize harmful effects. Thus, force reflection can be a safety feature of the robotic system.

In certain aspects, force reflection implementation can include an increased load produced by the master control arm on the user when the slave arm experiences an impact event. In other words, an impact sensed by the load sensors can be reflected to the user via the master control arm as a transient spike in load disproportionate to the normal proportional setting for force reflection. For example, when the slave arm collides with a wall, the load sensors of the slave arm sense the impact. To alert the user that an impact has occurred, the master control arm can produce a load on the user that is disproportionately large relative to the current proportional force reflective setting for a brief period of time that can effectively represent the impact to the user. For example, the force on the user produced on an impact could be so disproportionately large that the user would not be able to further move the master arm, effectively generating a hard stop of the master control arm regardless of the strength of the user or any existing momentum.

In certain aspects, the teleoperated robotic system can include features to enhance the control that the master control arm has over the slave arm. For example, the master control arm can include a torque assistance function or feature to lessen the forces and moments necessary to move the master control arm. With torque assist, the system is tolerant of lower torque gains and inaccurate mass properties. Torque assistance control at the master control arm can help the operator overcome frictional forces in the system such as joint friction, bearing friction, actuator friction, and stiction, as well as viscous damping and dynamic inertial effects of the master control arm and, to some extent, the slave arm as well. The torque assistance can also assist the user in overcoming loads in the master control arm that are due to force reflection from the slave arm that can hinder the ability of the user to control the slave arm. The user can overcome such loads without this feature, but doing so repeatedly can fatigue the user. Thus, although there are many positive aspects of force reflection (e.g., enhanced sensory feedback), a teleoperated robotic system can include a torque assistance feature to minimize the undesirable effects of force reflection in the master control arm (e.g., increased resistance on the user, particularly noticeable when initiating movement of the master control arm) to enhance the user's ability to operate the master control arm to control the slave arm.

In one aspect, a load sensor can be coupled to the master control arm at a strategic interface location to facilitate interaction or interfacing with the user. As used herein, a "load" can include a force and/or a moment. Thus, a load sensor can sense a force and/or a moment. The load sensor can be configured to sense loads in multiple DOF, and to facilitate output of a load value. The load sensor is capable of detecting linear and/or rotational loads acting on the master control arm. For example, a multi-axis load sensor, such as a six DOF load sensor, can measure three force components along x, y, and z axes of the sensor as well as three moment components acting about the axes. Thus, the load sensor can detect whether the user is in forceful contact with the master control arm. If so, the system can be configured to urge the master control arm in a desired direction to manipulate the master control arm, and to at least reduce the load from the forceful contact. Using load sensor data, such as a force value or moment value, the master control arm can move in response to a load applied to the master control arm by the user, such as in the same direction as the applied load.

For example, when the master control arm is stationary, a forearm of the user may not be in forceful contact with the master control arm. In a particular aspect, an applied load from the user to the master control arm can be detected by a load sensor located on a user interface device coupled to the master control arm proximate to the user's forearm. In another particular aspect, this can be detected by a load sensor associated with one or more DOF of the master control arm, as discussed herein. To move the master control arm proximate to the user's forearm in a desired direction, the user can apply a load to the user interface device and the master control arm, such as by lowering the forearm or pushing the forearm to the side. This load on the user interface device and the master control arm caused by movement of the user causes the master control arm to apply a torque to an actuator, which can be configured to cause the master control arm to move (e.g., in the direction of the applied load by the user). Such response by the master control arm may be sequentially repeated many times until the movement of the user's forearm is completed and the user ceases to apply a load to the master control arm (i.e., there is no longer forceful contact with the master control arm at the location of the load sensor on the user interface device). This feature, as indicated above, may be coupled or implemented with a force reflection function, or can be implemented as a stand-alone system. In any event, the master control arm can sense an applied load from the user and can initiate a torque assistance to assist the user in overcoming torque or forces in the master control arm that would hinder movement in the user's desired direction of movement. In one aspect, the degree of torque assistance can be adjustable, such as with an adjustable gain.

Torque assistance, or a torque assistance function, therefore, can be incorporated into the master control arm to enhance operation of the master control arm by the user. In other words, with force reflection, the slave arm can exert some amount of control on the master control arm. This enhanced mode of operation can limit the negative effects on the user due to resistance in the master control arm and/or the force reflection from the slave arm on the master control arm, therefore maintaining a proper functional relationship between the master control arm and the slave arm. For example, due to force reflection in the master control arm from the slave arm, the master control arm can be configured to be resistant to movement by the user. Utilizing a load sensor on the master control arm that is associated with one or more DOF in the master control arm to detect loads applied by the user and applying torque to the master control arm to cause the master control arm to move can assist the user in overcoming the resistance felt by the user in the master control arm. The torque assistance function, while not being required to do so, is typically configured so as to cause movement of the master control arm in the direction of the applied load by the user. In one aspect, the amount of torque assistance provided can be tuned to enhance the "feel" of the master control arm during operation. In some cases, the amount of torque assistance can be relatively small, and may be insufficient to overcome a reflective force in the master control arm.

Within the torque assistance function, a load sensor that senses a load applied by the user and that is supported about the master control arm and that is associated with one or more DOF in the master control arm means that the load sensor can sense load data and provide a load value that can be used at the various one or more DOF to cause the master control arm to move in response to the user applied load. In one exemplary embodiment, the load sensor that receives the applied load from the user may be associated with a user interface device and be located at a position offset from the location of other load sensors at the joints. In another exemplary embodiment, the torque assistance function may be configured to utilize the already existing load cells at the joints rather than requiring a separate load sensor within a user interface device.

With the torque assist function, the master control arm (e.g., at least two support members coupled at a joint) is caused to move based, at least in part, on this load value. The torque assist function can reduce user fatigue and improve ease of operation of the master control arm by the user. In one aspect, the torque assistance can be sufficient to at least assist the user in overcoming the force reflective resistance load in the master control arm. In another aspect, the gain can be set such that the torque assistance can exceed the force reflective resistance load in the master control arm.

In one aspect, the master control arm and/or the slave arm (as well as any payload) can be gravity compensated. Compensating for gravity can enhance the ability of the user to feel loads that occur at the slave arm, such as the weight of payload being lifted by the slave arm, which enables the user to react to such loads in a natural way. The ability to provide force reflection from the slave arm to the master control arm can be significantly enhanced through the use of gravity compensation of the slave arm. A relatively long slave arm, such as 4 to 10 feet in length, can weigh hundreds of pounds. A complex, kinematically equivalent master control arm may also add significant weight due to gravity. Gravity compensation can provide a compensating torque on each DOF axis to compensate for the effects of gravity for a slave arm and/or a master control arm.

Gravity compensation involves measuring the effects of gravity on each support member and adjusting the torque at each DOF to compensate for the effects of gravity. In one example, one or more support members of the master control arm(s) and/or the slave arm(s) can include a separate measurement device that is used to determine the direction of the gravitational pull (i.e. the gravity vector) relative to a center of gravity of the support member. Alternatively, a single measurement in a multi-axis system may be taken with respect to a fixed frame of reference for the arm, such as the base on which the arm is located. A transformation of the frame of reference can then be calculated for each support member and a determination can be made as to the level of torque needed at each DOF to compensate for the gravitational pull based on the position, center of gravity, and mass of the support member.

For example, a determination of the torque caused by the gravitational force at each joint of a support member can be determined using the Iterative Newton-Euler Dynamic Formulation. The velocity and acceleration of each support member can be iteratively computed and applied to each link from the first segment (such as a first support member corresponding to a shoulder axis) to the last segment (such as a seventh support member corresponding to a wrist axis). While the Iterative Newton-Euler Dynamic Formulation has been provided as one example of implementing a gravity compensation function, a number of different ways to incorporate gravity compensation in a robotic system can be used. Once the amount of torque caused by the measured gravitational vector is calculated at each joint, the torque can be compensated for by applying an opposite torque to effectively compensate for the force of gravity. The opposite torque may be applied using an electric motor connected to each joint, or through the use of hydraulic or pneumatic valves connected to actuators, as previously discussed.

Lifting the weight of the master control arm to control the slave arm can quickly fatigue the user. Gravity compensating the master control arm can allow a user to utilize the master control arm for extended periods without fatigue. In one aspect, to enable the user to control the slave arm for extended periods, the master control arm can be configured to support the weight of the user's arm. This can allow the user to manipulate the slave arm while minimizing the use of muscles needed to extend and move the user's arm. Thus, the user's arm can be gravity compensated in addition to the master control arm.

Gravitationally compensating the master control arm can increase the sensitivity of the force feedback at the master control arm that is sent from the slave arm. For example, the slave arm may be set to have a load gain of 40 to 1. When a user instructs the slave arm to pick up a 100 pound object, the force feedback will increase the downward pressure at each joint in the master control arm to simulate picking up approximately 2.5 pounds (i.e., the weight felt by the user). However, the master control arm itself may weigh a significant amount (e.g., 25 pounds). As such, the relatively small change in weight in the master control arm may be difficult to detect by the user. However, with gravity compensation, the 2.5 pound change will be easily detectable to the user as all or part of the inherent weight of the master control arm may be gravity compensated. Thus, gravity compensation of the master control arm enables the user to more accurately detect force feedback from the slave arm. The same or same type of electric motors and/or actuators can be used to provide both the gravity compensation as well as the force feedback in the master control arm.

In certain aspects, the payload being lifted by the slave arm can be gravity compensated in addition to the slave arm. For example, if desired, the user can "zero out" (or some degree up to this) the weight of the payload, which will effectively cause the slave arm and the payload to feel weightless to the user. In other words, the user will not feel a proportional load of the payload reflected to the user via the master control arm. As such, the system may further comprise a user interface device or system on or about the master control arm that facilitates user manipulation of the level of gravity compensation of the slave arm.

With further reference to FIGS. 2A and 2B, the master control arm 200A can include position sensors, which are associated with the DOF of the master control arm. In one aspect, there is one position sensor for each DOF. The position sensors can be located, for example, at each of the joints 231, 232, 233, 234, 235, 236, and 237. Because the DOF of the master control arm at these joints are rotational, the position sensors can be configured to measure angular position. In one aspect, the position sensors can detect a change in position of the master control arm at each DOF, and facilitate output of a position value. This change in position can be used to cause a proportional change in position of the corresponding DOF of the slave arm.

The position sensor can be an absolute position sensor that enables the absolute position of each joint to be determined at any time. Alternatively, the position sensor may be a relative position sensor. The position sensors can include any type of suitable position sensor for measuring a rotation of each joint, including but not limited to an encoder, a rotary potentiometer, and other types of rotary position sensors. One example of a position sensor that can be used is an encoder disk produced by Gurley Precision Instrument, Manufacturer Model No. P/N AX09178. The encoder disk can be coupled to each joint 231-237 in the master control arm. An encoder reader produced by Gurley Precision Instrument, Model No. P/N 7700A01024R12U0130N, can be used to read the encoder disk to provide an absolute position reading at each joint.

Additionally, the master control arm can include actuators, which are associated with the DOF of the master control arm. The actuators can be used to enable force reflection from the slave to the master control arm. The actuators can also be used to enhance operation of the master control arm by overcoming at least a portion of the load reflected to the master by the slave when the user moves the master control arm, such as with torque assistance. Additionally, the actuators can be used to enable gravity compensation of the master control arm.

In one aspect, there is one actuator for each DOF of the master control arm. The actuators can be linear actuators, rotary actuators, etc. The actuators can be operated by electricity, hydraulics, pneumatics, etc. The actuators in the master control arm 200A depicted in FIGS. 2A and 2B, for example, are hydraulic linear actuators. The actuators may be operated through the use of a hydraulic pump, such as that manufactured by Parker, P/N PVP1630B2RMP.

Each actuator may be controlled using an electric motor. Alternatively, hydraulic or pneumatic servo valves can be opened or closed to enable a selected amount of hydraulic or pneumatic fluid to apply a desired level of force to the actuator to apply a torque to the corresponding joint. In one example, a servo valve can be associated with each actuator, enabling a port to open to cause a desired force to be applied by the actuator in a selected direction. Another port can be opened to apply force in the opposite direction. One type of servo valve that can be used is manufactured by Vickers under part number SM4-10(5)19-200/20-10539. Another type of servo valve that can be used is manufactured by Moog, model 30-400A. Additional types of servo valves may be used based on design considerations including the type of valve, the pressure at the valve, and so forth.

The master control arm 200A can include servo valves that are hydraulically or pneumatically coupled to an actuator. For example, a connecting line 470 can be coupled to a control valve port 472 and an actuator port 474 to fluidly couple a control valve and an actuator. Such a coupling is illustrative of other such connections that can be implemented for fluidly coupling servo valves and actuators throughout the master control arm and the slave arm.

The master control arm can also include load sensors, which are associated with the DOF of the master control arm. The load sensors can be used to measure load in the master control arm, which can be used to enable force reflection from the slave to the master control arm. The load sensors can also be used to measure a load applied by a user to the master control arm to enable enhanced operation of the control arm, such as by torque assistance. In addition, the load sensors can be used to enable gravity compensation of the master control arm. The load sensors can include any type of suitable load sensor including, but not limited to, a strain gauge, a thin film sensor, a piezoelectric sensor, a resistive load sensor, and the like. For example, load sensors that may be used include load cells produced by Sensotec, P/N AL311CR or P/N AL31DR-1A-2U-6E-15C, Futek, P/N LCM375-FSSH00675, or P/N LCM325-FSH00672.

In one embodiment, there is one load sensor for each DOF of the master control arm. Each DOF on the master control arm may comprise at least one unique input describing how the DOF should track the user's movements. Several DOF of the master control arm can be accounted for with a multi-DOF load sensor. For example, a multi DOF load sensor capable of measuring loads in six DOF could be associated with axes 225, 226, 227, which correspond to the wrist DOF of the user and axes 221, 222, 223, which corresponds to the shoulder DOF of the user. A single DOF load sensor can be associated with axis 224, which corresponds to the elbow DOF of the user. Thus, load cells totaling seven DOF are sufficient to track motion of a master control arm having seven DOF. Data from the multi DOF load sensors can be used to calculate the load at a DOF between the load sensor location and the base 210. The load sensors can be located, for example, at each support member of the master control arm.

In one aspect, the load sensors can be associated with the actuators, as discussed in more detail below.

Additionally, load sensors can be located at other locations on the master control arm. For example, the master control arm 200A can include a user interface device in the form of a handle 202 to provide an interface with the user and to allow the user to operate the master control arm. The handle can be coupled to a support member, such as the seventh support member 217. In this embodiment, the user is not physically secured or strapped to the system, but rather is able to get into an operating position by simply grasping the handle, wherein movement and manipulation of the master control arm is achieved by applying various directional forces to the handle (as associated with one or more load sensors). Such an operating condition allows the user to experience and carry out more natural and unrestrained motions, as well as to be able to achieve more dexterous motions.

The handle 202 can also be coupled to a load sensor 268. Load sensor 268 can be configured to measure a load in at least one DOF, and in one aspect, is a multi DOF load sensor. Thus, the load sensor 268 can be configured to measure a load applied by the user to the handle 202. Load data acquired at the handle 202 can be used to assist the user in manipulating and operating the master control arm 200A, such as by torque assistance. Load sensor 268 at the handle 202 can provide load data for a DOF of the master control arm that is in addition to load data acquired by another load sensor at the DOF of the master control arm. The load data from load sensor 268 can be used to enhance the ability of the user to manipulate and maneuver the master control arm, as discussed herein.

In the present disclosure, it should be recognized that references to specific sensors in the figures, such as load sensors and position sensors, may refer to locations of the sensors in the figures, and/or the sensors themselves. For example, load sensor 268 may be disposed within a housing at the location identified in FIGS. 2A and 2B. Similarly, position sensors may be disposed within housings or otherwise associated with various DOF at the locations identified in the figures.

Figure 2C:
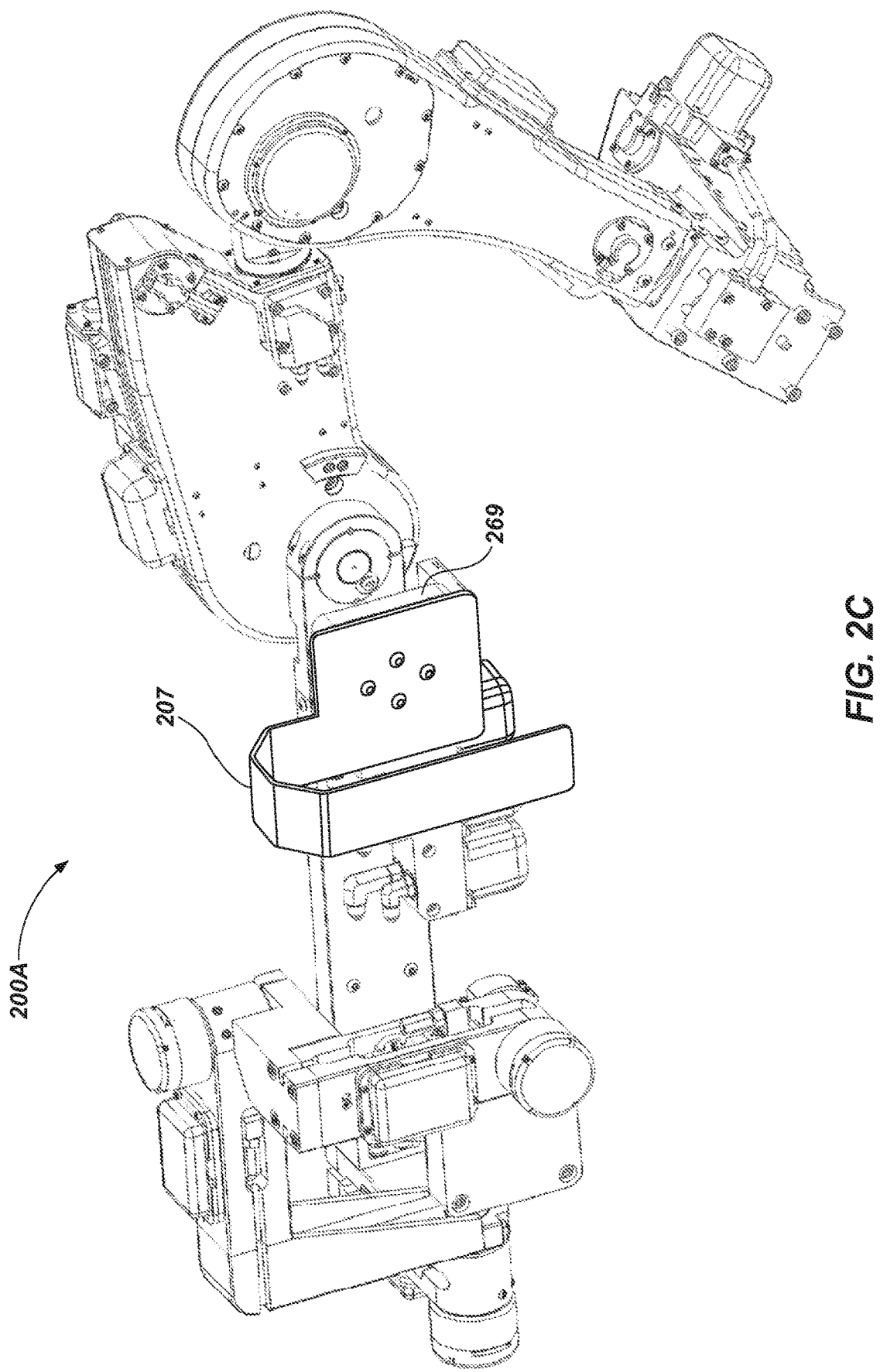
FIG. 2C is a perspective view of a master control arm in accordance with another example of the present disclosure.

As illustrated in FIGS. 2B and 2C, a master control arm can include or support a user interface device to provide the user with another location from which to interface with and control the master control arm. For example, a user interface device can be in the form of an arm support, such as a bracket. FIG. 2B illustrates one exemplary embodiment of an arm support in the form of a bracket, namely support 206. FIG. 2C illustrates another exemplary embodiment of an arm support in the form of a bracket, namely arm support 207. As shown, the arm support 206 of FIG. 2B can be configured to allow the user's arm to rest on a surface or portion of the bracket. The arm support 207 of FIG. 2C can be configured to include a hook or bend defining a channel for receiving part of the user's arm. In this embodiment, vertical movements of the user's arm can be relatively unrestrained, while lateral movements by the user can facilitate application of a load to the master control arm through contact made with the arm support 207. Such an arm support configuration can enhance the ability of the user to control a master control arm utilizing torque assist when the bracket is coupled to a load sensor, as discussed below. In yet another embodiment, although not shown, but which will be recognized by one skilled in the art, the arm support can be configured to support the user's arm in a suspended fashion, such as with a strap or sling. In general, the arm support can be coupled to any suitable portion of the master control arm, such as to support member 214. In the embodiments shown in FIGS. 2B and 2C, the arm supports 206 and 207, respectively, are supported about the master control arm 200A at a location configured to support a forearm of the user.

The arm support can also be coupled to a load sensor. In the embodiments shown in FIGS. 2B and 2C, the arm supports 206 and 207, respectively, are coupled to and operable with load sensor 269. In effect, load sensor 269 can be configured to measure a load in at least one DOF, and in one aspect, is a multi DOF load sensor. Thus, the load sensor 269 can be configured to measure a load applied by the user to the arm support. Load data acquired at the arm support can be used to assist the user in manipulating and operating the master control arm, such as by torque assistance. The user interface device may comprise at least one load sensor that is offset from the joints that measures a load applied to the user interface device, and the master control arm, by the user. The load sensor provides load data for at least one degree of freedom that is in addition to the load data from the load sensors associated with the degree of freedom. The torque assistance function utilizes such load data from the load sensor of the user interface device to facilitate actuated movement of the master control arm in response to a load applied to the master control arm by the user, and that reduces the forces necessary to move the master control arm. Load sensor 269 at the arm support can provide load data for a DOF of the master control arm that is in addition to load data acquired by another load sensor at the DOF of the master control arm. The load data from load sensor 269 can be used separately or combined with load data from load sensor 268 at the handle 202 to enhance the ability of the user to manipulate and maneuver the master control arm. In one aspect, the arm support and/or load sensor 269 can be disposed at any suitable location on the master control arm, such as at a location configured to be proximate to a user's upper arm.

A bracket-type arm support configuration, such as bracket 207 of FIG. 2C, which essentially limits forces applied to the master control arm to those applied normal to the master control arm, can minimize the potential for an excessive amount of control input from the user to the master control arm. In other words, user input to the master control arm at wrist and elbow locations where the master control arm is coupled to the user in all degrees of freedom can result in conflicting commands from the wrist load sensor 268 and the elbow load sensor 269, causing the master control arm to be over-constrained. Thus, receiving loads normal to the master control arm can enhance operation of the master control arm while minimizing the potential for conflicting commands. It should be recognized that a suitable user interface device at or near the user's elbow need not be in the form of a bracket-type arm support. Indeed, other user interface device configurations are considered within the scope of the present invention, and are contemplated herein. In most cases, however, it will be desirable to limit the forces applied to the master control arm to those applied normal to the master control arm, but this should not be considered limiting in any way.

Utilizing load sensors 268, 269 to assist the user in moving the master control arm facilitates or provides more fluid and efficient control of the master control arm. For example, torque assistance can be provided based on data gathered from the load sensors 268, 269, which can be used to assist the user in moving the master control arm when force feedback is received at the master control arm. The torque assistance can also help the user to overcome inertial forces when accelerating and decelerating the master control arm. As it is conceivable that inertial forces may contribute to user fatigue over time, implementing a torque assistance function made possible through the use of load sensors 268, 269 will enable the user to provide small amounts of force in a desired direction that will assist the user in moving and manipulating the master control arm in spite of inertial forces, feedback forces, frictional forces, and other loads that can cause movement of the arm to be resisted. As indicated herein, the amount of torque assistance can be limited such that force feedback from the slave arm can still be felt by the user.

The master control arm 200A can also include a general DOF controller (GDC) 271 associated with each DOF. In one example, a separate GDC 271, 272, 273, 274, 275, 276 and 277 can be operable with each of the axes in the master control arm 200A. The GDC can be in communication with sensors, such as the load sensor and position sensor, located at each joint. The GDC can also be in communication with an actuator and/or servo valve at each joint. Each GDC is used to monitor and adjust the position and torque at a selected joint on the master control arm 200A. Information can also be received at the GDC regarding the position and torque of the associated or corresponding joint on the slave arm 300A. The information regarding a torque measurement at each joint in the slave arm can be communicated to the GDC for the associated or corresponding joint in the master control arm. Additional inputs from other types of sensors may be received as well. The GDC can then output a command to the actuator or servo valve to adjust the torque at the associated joint on the master control arm to provide force feedback regarding the interaction of the slave arm with its environment and/or with a load that is lifted by the slave arm. The GDC at each axis can interact with the actuator 251 or servo valve for the associated joint to adjust the torque at the joint and/or move the DOF by a predetermined amount.

In one example, the GDC for each DOF on the master arm can be a computer card containing one or more microprocessors configured to communicate with the desired sensors and valves and to perform calculations used to control the movements of the slave arm about associated or corresponding axes on the slave arm. For instance, the GDC can include a general purpose central processing unit (CPU) such as an ARM processor, an Intel processor, or the like. Alternatively, a field programmable gate array (FPGA), application specific integrated circuit (ASIC) or other type of processor may be used. The GDC can communicate with the sensors using wired or wireless technologies or means. Various examples of wired and wireless means of communication are discussed herein.

In the present disclosure, it should be recognized that references to specific GDC and servo valves in the figures, may be referring primarily to locations of the GDC and servo valves in the figures, not necessarily to the GDC and servo valves themselves. For example, GDC 276 may be disposed within a housing at the location identified in FIGS. 2A and 2B. Similarly, servo valve 281 may be disposed within a housing at the location identified in FIGS. 2A and 2B.

The master control arm 200A can also include a gravity sensor 204 to determine the gravity vector, which can be used to enable gravity compensation of the master control arm, discussed further below. The gravity sensor can be associated with the master control arm, such that the gravity sensor and the base of the master control arm are fixed relative to one another. For example, the gravity sensor can be located on the base 210 of the master control arm or on a support for the base of the master control arm. In certain aspects, a gravity sensor can be located on each linkage or support member of the master control arm, such as at a center of gravity of the linkage or support member. The gravity sensor can include any type of suitable gravity sensor including, but not limited to, at least one of a tilt sensor, an accelerometer, a gyroscope, an inertial measurement unit, or a combination of these. For example, a gravity sensor produced by Microstrain, Inc., P/N 3DM-GX1-SK may be used.

Figure 3A:
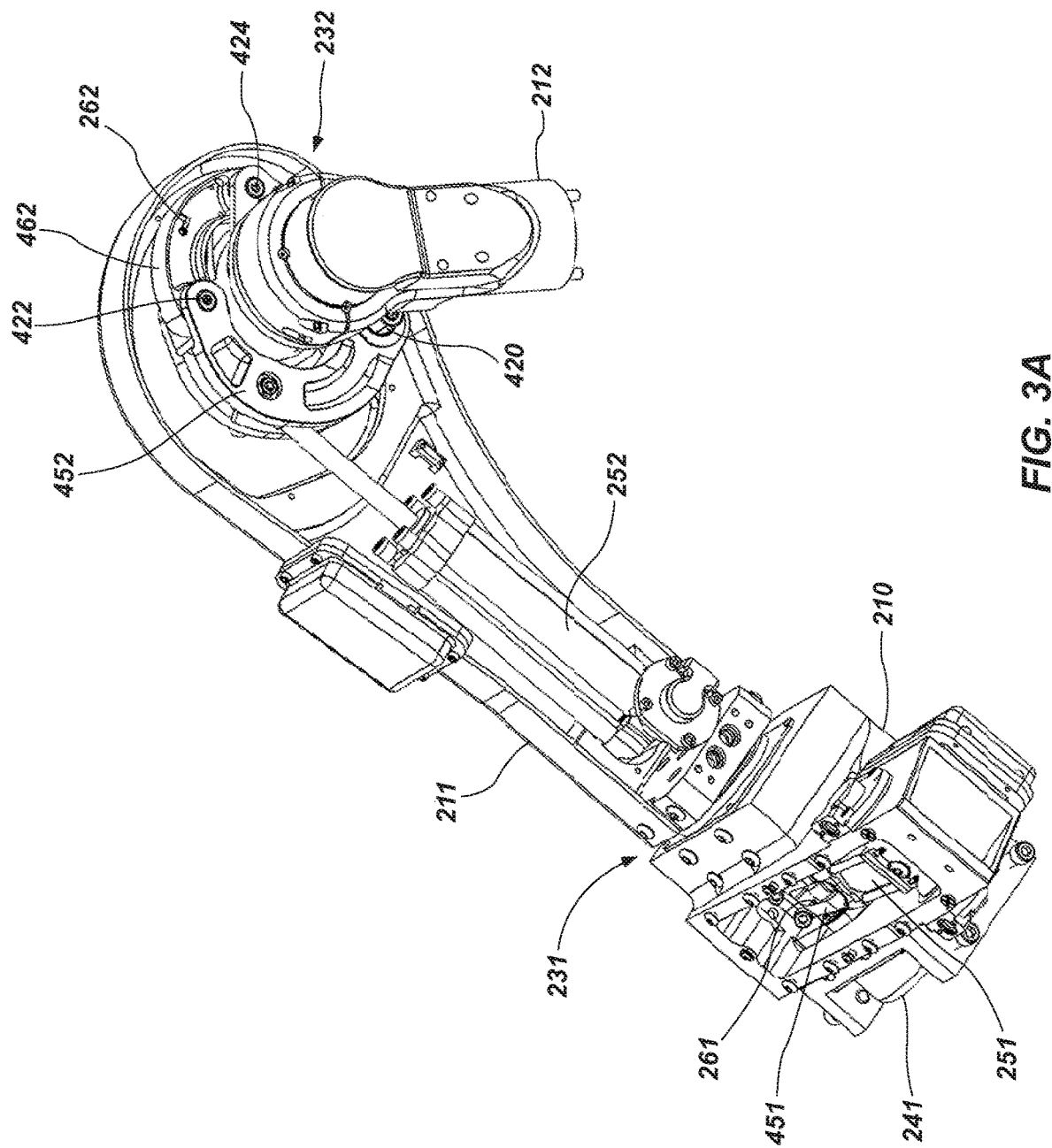
FIG. 3A is a perspective view of a base, a first support member, and a second support member of the master control arm of FIGS. 2A and 2B.
Figure 3B:
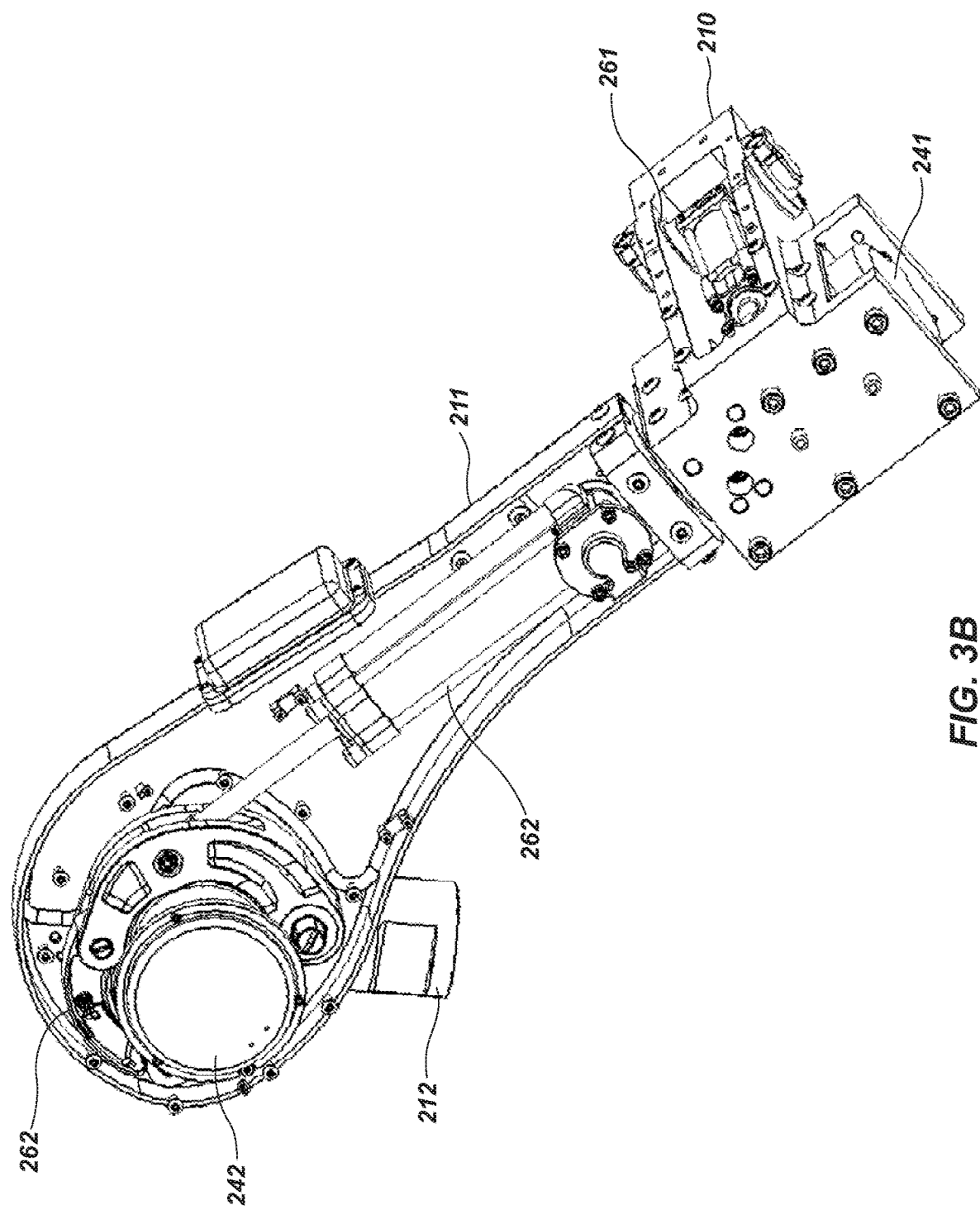
FIG. 3B is another perspective view of the base, the first support member, and the second support member of FIG. 3A.

With reference to FIGS. 3A and 3B and further reference to FIGS. 2A and 2B, illustrated are detailed views of the base 210 of the master control arm 200A, the first support member 211 coupled to the base 210 at joint 231, and a portion of the second support member 212 coupled to the first support member 211 at joint 232. Some features of the master control arm 200A have been omitted in FIGS. 3A and 3B to show certain aspects of the master control arm that are otherwise obscured from view. Position sensor 241 is associated with joint 231 to sense a relative change in position between the base 210 and the first support member 211. Actuator 251 can provide a torque acting about the DOF associated with axis 221 formed by joint 231. Load sensor 261, which is associated with actuator 251, can measure a load acting about the DOF associated with axis 221 formed by joint 231.

Actuator 251 is coupled to the base 210 at one end and coupled to torque member 451 at an opposite end. Torque member 451 is coupled to the first support member 211 such that rotation of the torque member 451 causes rotation of the first support member 211. Torque member 451 rotates about axis 221 and extends away from the axis 221 to provide a lever arm and a coupling interface with the actuator 251. Thus, movement of the actuator 251 causes movement of the torque member 451, which causes movement of the first support member 211 relative to the base 210 about axis 221.

Actuator 251 is fluidly coupled to servo valve 281, which controls hydraulic fluid pressure acting on both sides of a piston of the linear actuator. Thus, the servo valve control can cause the piston to move back and forth to cause bi-directional rotation of the first support member about axis 221. Servo valve 281 is electrically coupled to GDC 271, which controls actuation of the actuator 251 via control signals to the servo valve. As mentioned above, the GDC 271 can receive position and/or load data from sensors, such as position sensor 241 and load sensor 261, to operate the actuator 251. The position sensor 241 is located at one end of joint 231 to measure relative rotation between the base 210 and the first support member 211. The load sensor 261 is coupled to the torque member 451 to measure a load acting on the torque member.

FIGS. 3A and 3B further illustrate that position sensor 242 is associated with joint 232 to sense a relative change in position between the first support member 211 and the second support member 212. Actuator 252 can provide a torque acting about the DOF associated with axis 222 formed by joint 232. Load sensor 262, which is associated with actuator 252, can measure a load acting about the DOF associated with axis 222 formed by joint 232.

Actuator 252 is coupled to the first support member 211 at one end and to first linkage 452 at an opposite end. First linkage 452 is coupled to the first support member 211 at pivot 420 and to a second linkage 462 at pivot 422. Second linkage 462 is coupled to the second support member 212 at pivot 424. Rotation of the first linkage 452 and the second linkage 462 relative to the first support member 211 causes rotation of the second support member 212 about axis 222. Thus, movement of the actuator 252 causes movement of the first linkage 452 and the second linkage 462, which causes movement of the second support member 212 about axis 222. In the position shown in FIGS. 3A and 3B, pivot 424 is located at an opposite side of joint 232 from the actuator 252. As the actuator 252 retracts, first linkage 452 rotates about pivot 420 and pulls pivot 422 away from axis 222, as second linkage 462 pulls pivot 424 to cause clockwise motion of the second support member 212. This configuration therefore can generate a sufficient range of rotation of the second support member 212 relative to the first support member 211 to replicate a human flexion/extension shoulder movement.

Actuator 252 is fluidly coupled to servo valve 282, which is electrically coupled to GDC 272 and can receive position and/or load data from sensors, such as position sensor 242 and load sensor 262, to operate the actuator 252. The position sensor 242 is located at one end of joint 232 to measure relative rotation between the first support member 211 and the second support member 212. The load sensor 262 is coupled to the second linkage 462 to measure a load acting on the second linkage 462.

In one aspect, a range of motion limiter can be incorporated to physically interfere with the movement of the base or a support member relative to an adjacent coupled support member. For example, limiter 476 is an illustration of a physical limiter or stop and is coupled to the first support member 211. The limiter 476 can be located and configured to contact a portion of the second support member 212 as the second support member rotates relative to the first support member 211. Physical limiters or stops can prevent excess motion that may damage the master control arm or endanger the user. In another aspect, the teleoperated robotic system can implement additional range of motion controls, such as programmed limits and can decelerate the master control arm as it nears a physical limit to prevent an impact with the physical limiter. Such limiters can be employed throughout the master control arm and/or the slave arm.

Figure 4A:
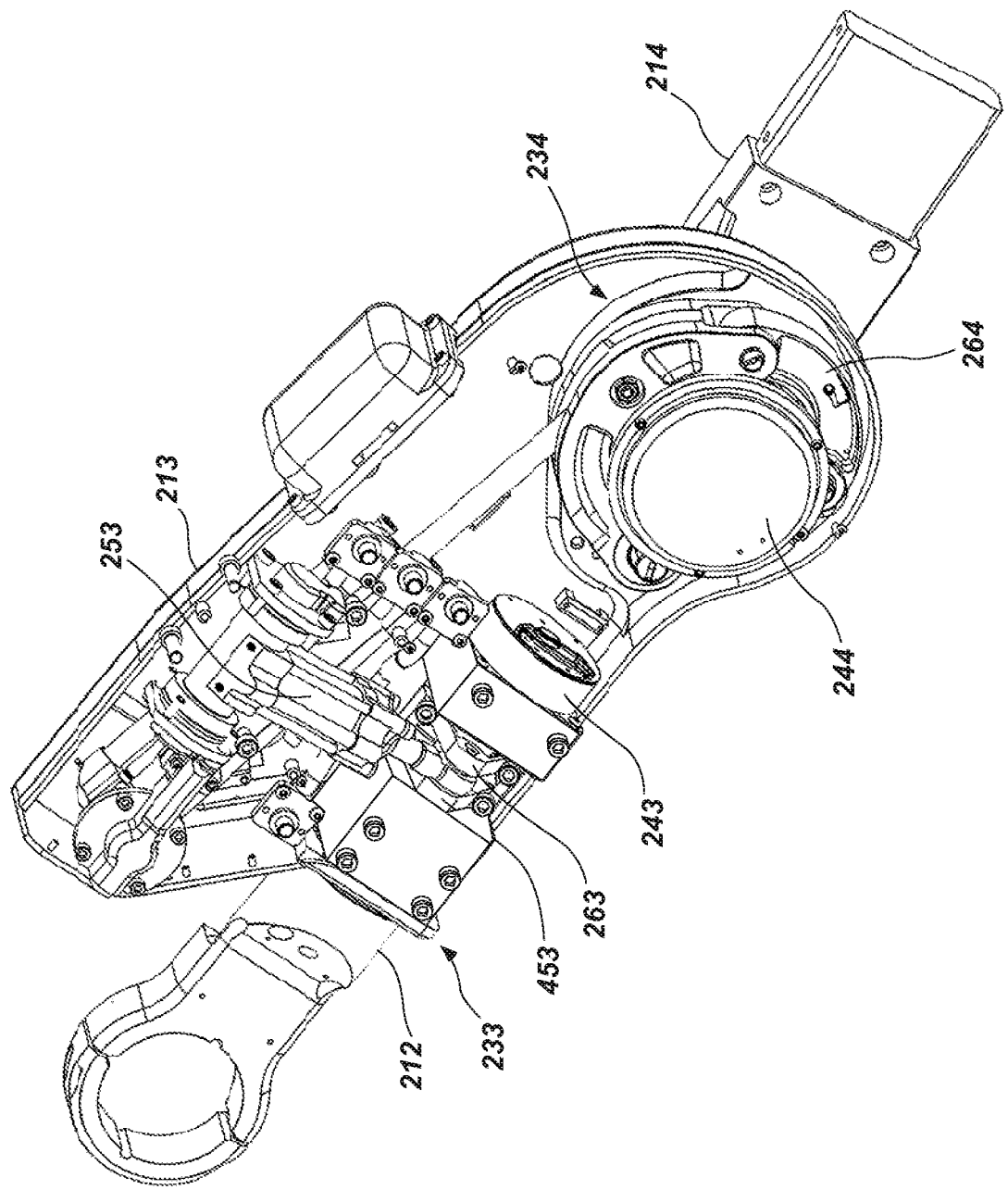
FIG. 4A is a perspective view of a second support member, a third support member, and a fourth support member of the master control arm of FIGS. 2A and 2B.
Figure 4B:
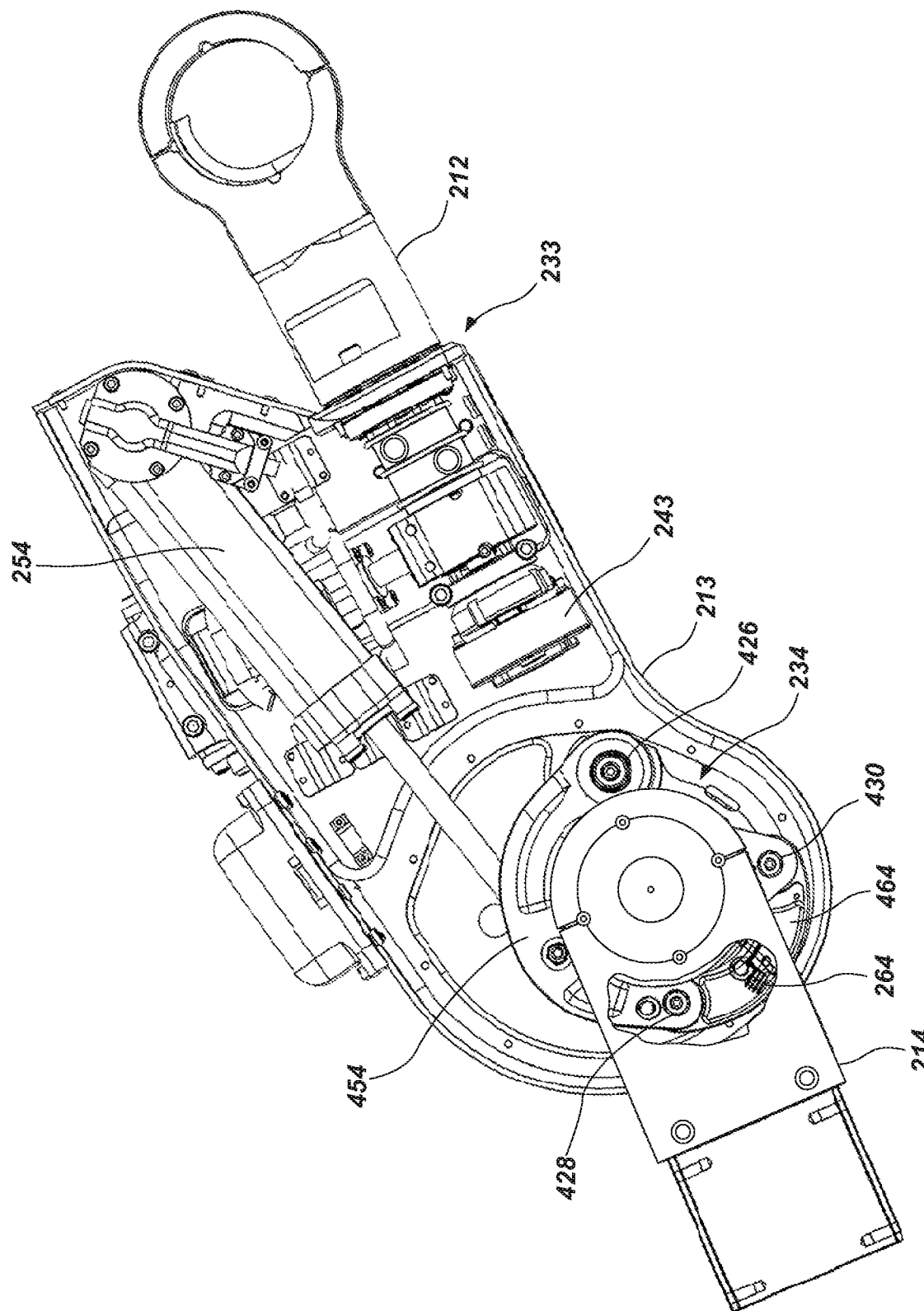
FIG. 4B is another perspective view of the second support member, the third support member, and the fourth support member of FIG. 4A.

With reference to FIGS. 4A and 4B and further reference to FIGS. 2A and 2B, illustrated are detailed views of parts of the master control arm 200A, namely the second support member 212, the third support member 213 coupled to the second support member 212 at joint 233, and a portion of the fourth support member 214 coupled to third support member 213 at joint 234. Some features of the master control arm have been omitted in FIGS. 4A and 4B to show certain aspects of the master control arm that are otherwise obscured from view. Position sensor 243 is associated with joint 233 to sense a relative change in position between the second support member 212 and the third support member 213. Actuator 253 can provide a torque acting about the DOF associated with axis 223 formed by joint 233. Load sensor 263, which is associated with actuator 253, can measure a load acting about the DOF associated with axis 223 formed by joint 233.

Actuator 253 is coupled to the third support member 213 at one end and coupled to torque member 453 at an opposite end. Torque member 453 is coupled to the second support member 212 such that rotation of the torque member causes rotation of the second support member. Torque member 453 rotates about axis 223 and extends away from the axis to provide a lever arm and a coupling interface with the actuator 253. Thus, movement of the actuator causes movement of the torque member 453, which causes movement of the third support member 213 relative to the second support member 212 about axis 223. Actuator 253 is fluidly coupled to servo valve 283, which is electrically coupled to GDC 273 and can receive position and/or load data from sensors, such as position sensor 243 and load sensor 263, to operate the actuator 253. The position sensor 243 is located at one end of joint 233 to measure relative rotation between the second support member 212 and the third support member 213. The load sensor 263 is coupled to the torque member 453 to measure a load acting on the torque member.

FIGS. 4A and 4B further illustrate that position sensor 244 is associated with joint 234 to sense a relative change in position between the third support member 213 and the fourth support member 214. Actuator 254 can provide a torque acting about the DOF associated with axis 224 formed by joint 234. Load sensor 264, which is associated with actuator 254, can measure a load acting about the DOF associated with axis 224 formed by joint 234.

Actuator 254 is coupled to the third support member 213 at one end and to first linkage 454 at an opposite end. First linkage 454 is coupled to the third support member 213 at pivot 426 and to a second linkage 464 at pivot 428. Second linkage 464 is coupled to the second support member 212 at pivot 430. Rotation of the first linkage 454 and the second linkage 464 relative to the third support member 213 causes rotation of the fourth support member 214 about axis 224. Thus, movement of the actuator 254 causes movement of the first linkage 454 and the second linkage 464, which causes movement of the fourth support member 214 about axis 224. The configuration of first linkage 454 and second linkage 464 is similar to that of first linkage 452 and second linkage 462 shown in FIGS. 3A and 3B. This configuration therefore can generate a sufficient range of rotation of the fourth support member 214 relative to the third support member 213 to replicate a human elbow movement.

Actuator 254 is fluidly coupled to servo valve 284, which is electrically coupled to GDC 274 and can receive position and/or load data from sensors, such as position sensor 244 and load sensor 264, to operate the actuator 254. In the figures, GDC 273 and GDC 274 are at the same location on the third support member 213. Additionally, servo valve 283 and servo valve 284 are at the same location on the third support member 213.

The position sensor 244 is located at one end of joint 234 to measure relative rotation between the third support member 213 and the fourth support member 214. The load sensor 264 is coupled to the second linkage 464 to measure a load acting on the second linkage.

Figure 5A:
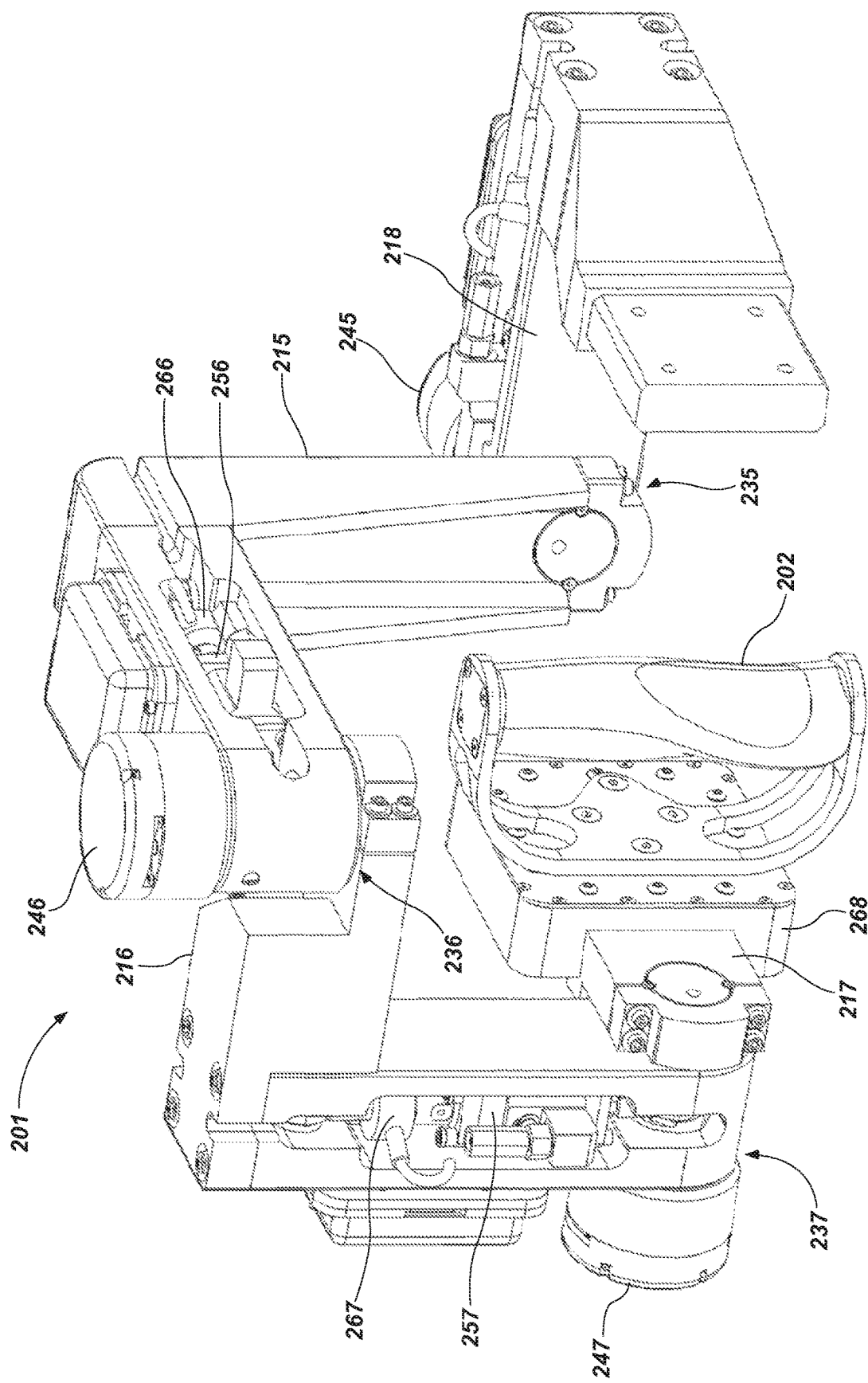
FIG. 5A is a perspective view of a wrist unit of the master control arm of FIGS. 2A and 2B.
Figure 5B:
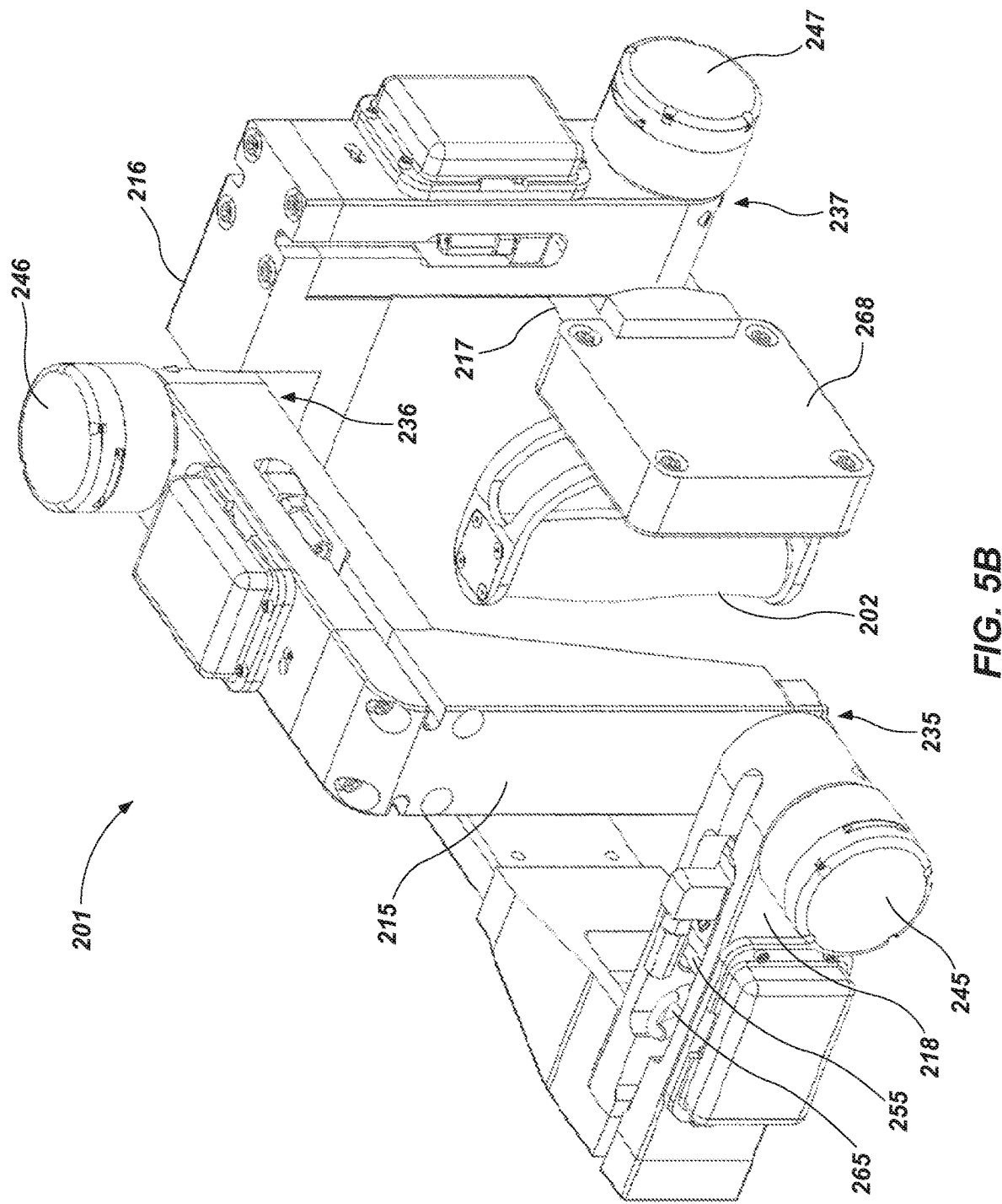
FIG. 5B is another perspective view of the wrist unit of FIG. 5A.

With reference to FIGS. 5A and 5B, and continued reference to FIGS. 2A and 2B, the master control arm 200A can include structure that positions the wrist DOF of the user in sufficient alignment with the corresponding DOF of the master control arm about axes 225, 226, and 227, such that kinematic equivalency can result. The wrist positioning structure, or wrist unit 201, is configured to support the handle 202 such that when the user is grasping the handle to manipulate the master control arm, the user's wrist is appropriately positioned relative to the DOF of the master control arm corresponding to the DOF of the user's wrist.

The wrist positioning structure can include an extension member 218. The extension member 218 can be integral with or attached to the fourth support member 214. In one aspect, the extension member 218 can be configured to extend beyond the handle 202 to position the joint 235 in front of the user's hand. The extension member 218 can also provide an offset for the axis 225 relative to the fourth support member 214. The extension member 218 can be configured to position the axis 225 to sufficiently align with the corresponding DOF of the user's wrist. The fifth support member 215 can offset the joint 236 to be on a side of the user's wrist and can be configured to position the joint 236 behind the handle 202, such that the user's wrist will be sufficiently aligned with the axis 226. The sixth support member 216 can offset the joint 237 to be on another side of the wrist. The handle 202 is offset forward of the joint 237, such that when the user grasps the handle, the user's wrist will be sufficiently aligned with the axis 227. The seventh support member 217 can be configured to position the handle 202 beyond, or in front of, the axes 226, 227. In one aspect, the axes 225, 226, 227 can be orthogonal to one another and can be configured to sufficiently align with the DOF of the user's wrist.

In certain aspects, the extension member 218 can provide an offset for the axis 225 relative to the fourth support member 214, the second support member 212, and/or the third support member 213. This offset can provide a space for the user's arm and can position the fourth support member 214, the second support member 212, and/or the third support member 213 to a side of the user's arm. For example, the extension member 218 can position the axis 225 such that it is sufficiently aligned with the corresponding wrist DOF of the user when the user is grasping the handle 202 and provide enough room for the user's arm next to the master control arm.

In other aspects, the fourth support member 214, the extension member 218, the fifth support member 215, the sixth support member 216, and the seventh support member 217 can be configured to provide sufficient space around the handle to accommodate buttons, switches, levers, or other control structures or user interface devices to allow the user to control the robotic system 100.

The structure of the wrist unit 201 can provide a master control having three orthogonal axes corresponding to the three human wrist DOF that substantially align with the actual wrist DOF of the system operator. Additionally, the wrist unit 201 structure can accommodate a position sensor, a load sensor, and/or an actuator for each DOF of the wrist unit. Thus, the wrist unit 201 can be suitable for position control of a slave arm, load control of a slave arm, force reflection feedback from a slave arm, gravity compensation of the wrist unit, torque assistance of the wrist unit, and combinations thereof.

Figure 5C:
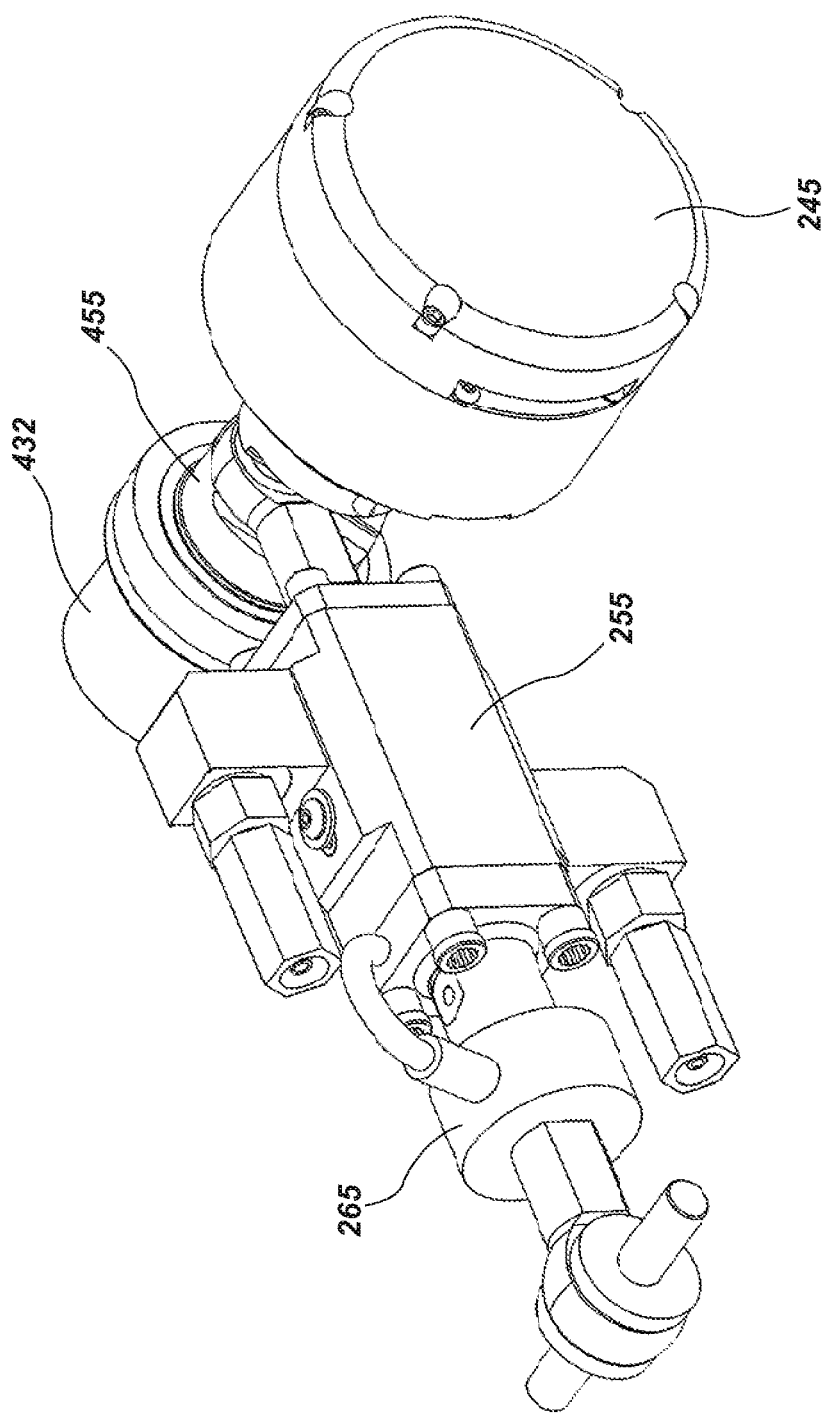
FIG. 5C is a perspective view of an actuator, position sensor, and load sensor arrangement of the wrist unit of FIGS. 5A and 5B.
Figure 5D:
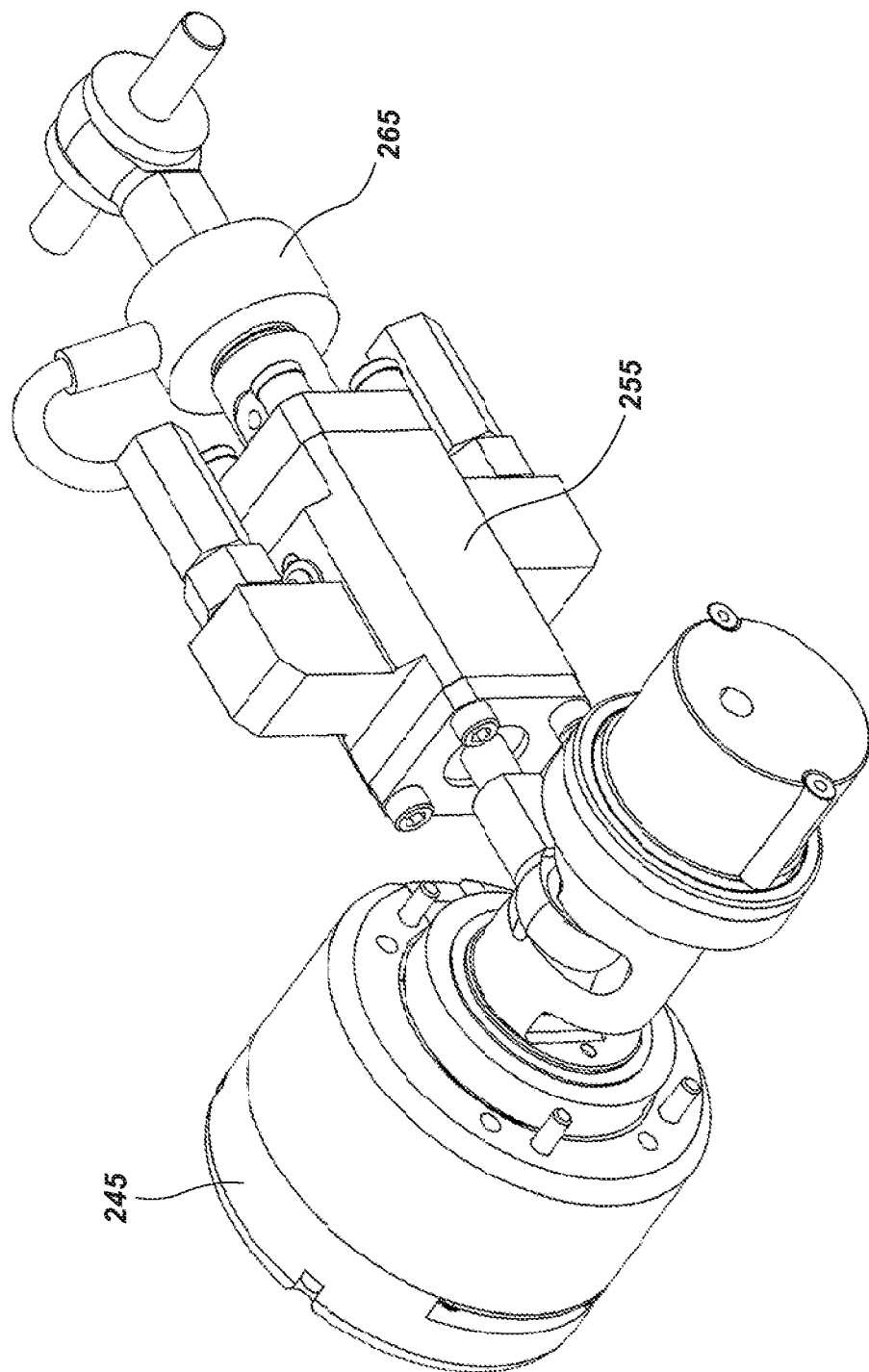
FIG. 5D is another perspective view of the actuator, position sensor, and load sensor arrangement of FIG. 5C.

With reference to FIGS. 5C and 5D, the arrangement of position sensor 245, actuator 255, and load sensor 265 of the wrist unit is shown. This arrangement can be used in connection with the position sensor, actuator, and load sensor associated with any of joints 235, 236, 237. For example, actuator 255 is coupled to torque member 455 at one end of the actuator and is coupleable to a linkage or support member, such as extension member 218, at an opposite end of the actuator. Torque member 455 is coupleable via interface 432 to a linkage or support member of the master control arm, such as the fifth support member 215, such that rotation of the torque member causes rotation of the linkage or support member. Torque member 455 is rotatable about an axis, such as axis 225, and extends away from the axis to provide a lever arm and a coupling interface with the actuator 255. Thus, movement of the actuator 255 causes movement of the torque member 455, which causes movement of the support member coupled to the torque member about an axis. This movement can be measured by the position sensor 245. Load sensor 265 is associated with the actuator 255 to measure a load in the actuator.

With continued reference to FIGS. 5A and 5B, position sensor 245 is associated with joint 235 to sense a relative change in position between the fifth support member 215 and the extension member 218. Actuator 255 can provide a torque acting about the DOF associated with axis 225 formed by joint 235. Load sensor 265 can measure a load acting about the DOF associated with axis 225 formed by joint 235. Actuator 255 is fluidly coupled to servo valve 285, which is electrically coupled to GDC 275 and can receive position and/or load data from sensors, such as position sensor 245 and load sensor 265, to operate the actuator 255.

Furthermore, position sensor 246 is associated with joint 236 to sense a relative change in position between the sixth support member 216 and the fifth support member 215. Actuator 256 can provide a torque acting about the DOF associated with axis 226 formed by joint 236. Load sensor 266 can measure a load acting about the DOF associated with axis 226 formed by joint 236. Actuator 256 is fluidly coupled to servo valve 286, which is electrically coupled to GDC 276 and can receive position and/or load data from sensors, such as position sensor 246 and load sensor 266, to operate the actuator 256.

Additionally, position sensor 247 is associated with joint 237 to sense a relative change in position between the seventh support member 217 and the sixth support member 216. Actuator 257 can provide a torque acting about the DOF associated with axis 227 formed by joint 237. Load sensor 267 can measure a load acting about the DOF associated with axis 227 formed by joint 237. Actuator 257 is fluidly coupled to servo valve 287, which is electrically coupled to GDC 277 and can receive position and/or load data from sensors, such as position sensor 247 and load sensor 267, to operate the actuator 257.

Figure 6A:
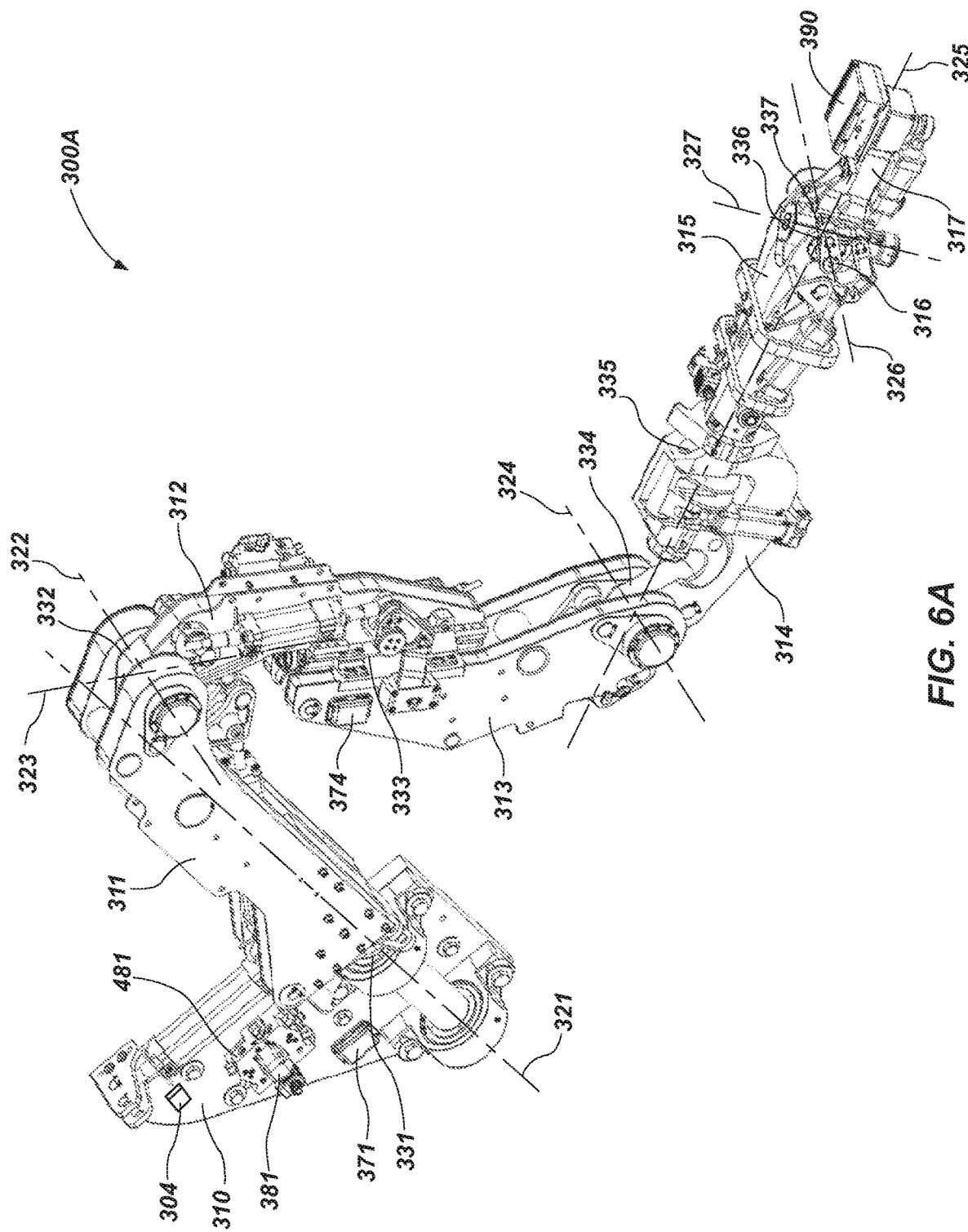
FIG. 6A is a perspective view of a slave arm in accordance with an example of the present disclosure.
Figure 6B:
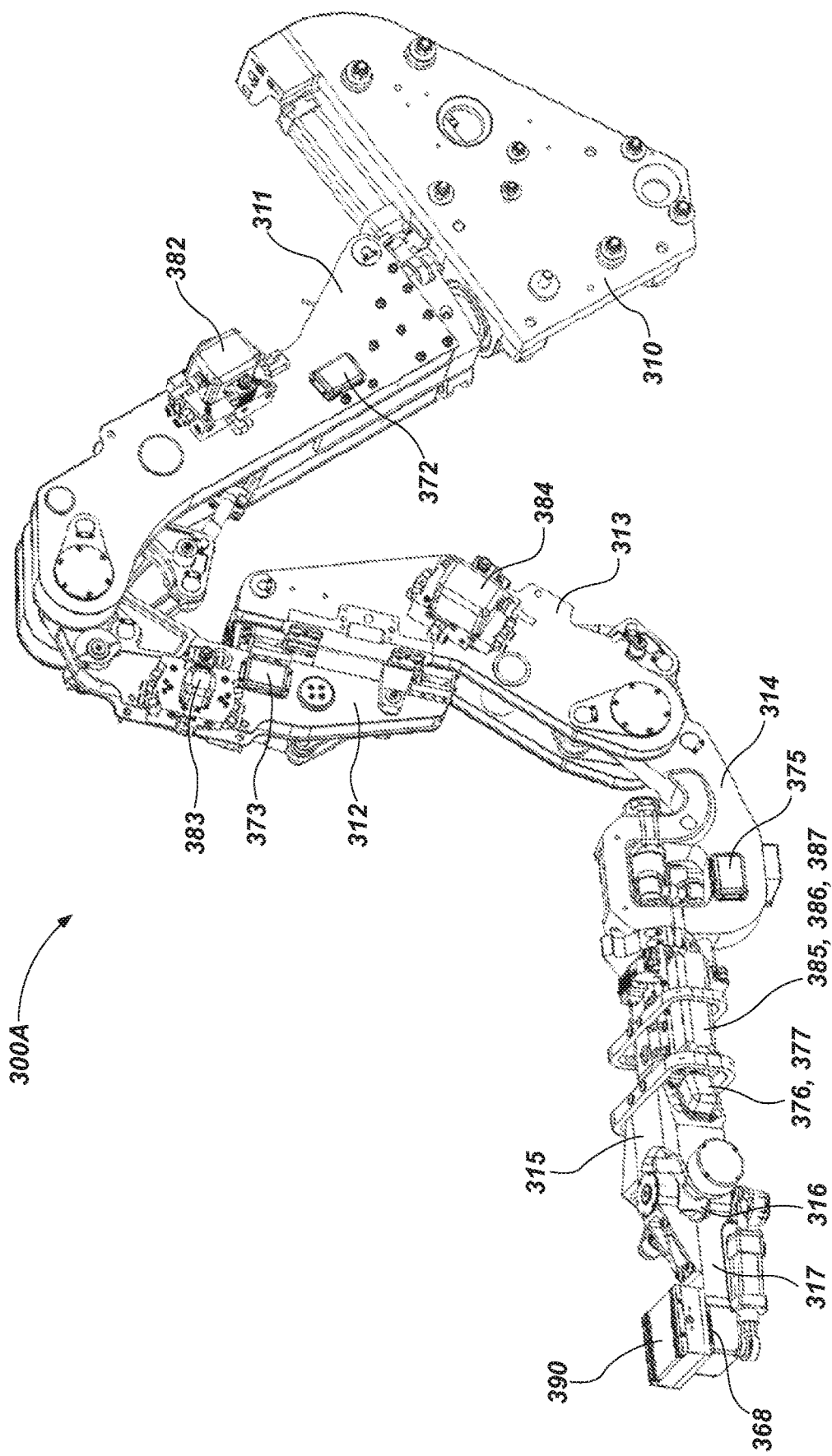
FIG. 6B is another perspective view of the slave arm of FIG. 6A.

Referring to FIGS. 6A and 6B, illustrated is robotic slave arm 300A. For simplicity, slave arm 200A is shown independent of other components of the robotic system, such as master control arms 200A, 200B, slave arm 300B, and platform 400. The slave arm 300A can be mounted, installed, or otherwise associated with any fixed or mobile platform or other structure such that the platform or other structure supports the slave arm via a support structure or system. Typically, the slave arm is supported by the platform in a manner that allows the slave arm to interact with objects in a workspace or operating environment of the teleoperated robot. The slave arm at least partially defines a "zone of operation" in which the slave arm operates.

As mentioned above, a master control arm can be kinematically equivalent to a user's arm from the shoulder to the wrist. In a similar manner, a slave arm can be kinematically equivalent to a master control arm. Thus, the master control arm and the slave arm can be kinematically equivalent to a user's arm from the shoulder to the wrist.

The slave arm 300A can be configured as a kinematic system to include DOF and linkages that correspond to the DOF and linkages of the master control arm 200A and a human arm from the shoulder to the wrist. In one embodiment, although not to be considered limiting, the lengths of the linkages of the slave can be proportional to corresponding linkage lengths of the master control arm.

In general, the master control arm is configured to interface with a human user, thus certain of the structural features and characteristics may be the result of this objective. In some cases, remnants of these structural features and characteristics may be carried over and incorporated into the slave arm, in order to maintain or enhance kinematic equivalency. For example, as shown in FIG. 6A, with the first support member 311 coupled to a base 310 axis 321 may be caused to be at about a 45 degree angle relative to a horizontal plane. This configuration may not be necessary for a functional slave arm, but it is similar to that of the master control arm and contributes to kinematic equivalency between the master control arm and the slave arm. In other cases, some structural features and characteristics of the master control arm that facilitate the human interface may not be incorporated into the slave arm. For example, the slave arm can operate effectively, both as a functional slave arm and as a kinematic equivalent to the master control arm, without incorporating the structure of the master control arm corresponding to the user's wrist DOF. Thus, in some instances, the structure and apparatus of the slave arm may be more simplified or caused to more closely replicate a human arm than corresponding structure of the master control arm.

In certain aspects, a slave arm can include fewer than seven DOF and still be considered to be kinematically equivalent to a human arm or a master control arm to the extent of the corresponding DOF of the human arm or master control arm. In certain other aspects, a slave arm can include greater than seven DOF and still be considered to be kinematically equivalent to a human arm or a master control arm to the extent of the corresponding DOF of the human arm or master control arm. In this case, excess DOF that do not correspond to a human arm or a master control arm may not be kinematically equivalent to the human arm or master control arm.

As illustrated in FIGS. 6A and 6B, a first support member 311 is coupled to base 310 at joint 331, which enables rotation about axis 321. The DOF about axis 321 represents a rotational DOF corresponding to the DOF about axis 221 of the master control arm and abduction/adduction of the human shoulder. As mentioned above, a first support member 311 can extend from the base 310 to position joint 332 proportional to the corresponding features of the master control arm. Joint 332 is coupled to a second support member 312 and forms axis 322. The DOF about axis 322 represents a rotational DOF corresponding to the DOF about axis 222 of the master control arm and flexion/extension of the human shoulder.

The second support member 312 extends from the joint 332 and is coupled to a third support member 313 to form joint 333, which forms axis 323. The DOF about axis 323 represents a rotational DOF corresponding to the DOF about axis 223 of the master control arm and humeral rotation of the human shoulder. Thus, the slave can include three separate joints that correspond to the three separate joints of the master control arm, which correspond to the single joint of the human shoulder in kinematically equivalent systems.

The second support member 312 and the third support member 313 combine to form a linkage disposed between joint 332 and joint 334 that corresponds to the linkage formed by second support member 212 and third support member 213 of the master control arm and to the human upper arm between the shoulder and the elbow. The third support member 313 is coupled to a fourth support member 314 by joint 334, which forms axis 324. The DOF about axis 324 represents a rotational DOF corresponding to the DOF about axis 224 of the master control arm and a human elbow.

The fourth support member 314 is coupled to a fifth support member 315 at joint 335, which forms axis 325. The DOF about axis 325 represents a rotational DOF corresponding to the DOF about axis 225 of the master control arm and human wrist rotation. The fifth support member 315 is coupled to a sixth support member 316 at joint 336, which forms axis 326. The DOF about axis 326 represents a rotational DOF corresponding to the DOF about axis 226 of the master control arm and human wrist abduction/adduction. The sixth support member 316 is coupled to a seventh support member 317 at joint 337, which forms axis 327. The DOF about axis 327 represents a rotational DOF corresponding to the DOF about axis 227 of the master control arm and human wrist flexion/extension.

In one aspect, the DOF structure of the slave arm more closely resembles the DOF of the human wrist. For example, the DOF about axis 325 is similar to a human wrist in that the DOF structure is located in the "forearm" of the slave arm. Likewise, the DOF about axes 326, 327 of the slave arm is similar to a human wrist in that the DOF structure is located in the "wrist" of the slave arm. Thus, structure forming axes 325, 326, 327 of the slave arm more closely resemble a human wrist than the corresponding structure of the master control arm. In spite of the various similarities and differences, kinematic equivalency can exist across the three systems.

The slave arm can also include actuators, which are associated with the DOF of the slave arm. The actuators can be used to cause rotation about a given DOF axis of the slave arm based on a change of position of the master control arm, discussed further below. The actuators can also be used to enable gravity compensation of the slave arm. In one aspect, there is one actuator for each DOF of the slave arm. The actuators can be linear actuators, rotary actuators, etc. The actuators can be operated by electricity, hydraulics, pneumatics, etc. The actuators in the slave arm depicted in FIGS. 6A and 6B, for example, are hydraulic linear actuators.

The slave arm can also include position sensors, which are associated with the DOF of the slave arm. In one aspect, there is one position sensor for each DOF. The position sensors can be located, for example, at each of the joints 331, 332, 333, 334, 335, 336, and 337. Because the DOF of the slave arm at these joints are rotational, the position sensors can be configured to measure angular position.

In one aspect, the position sensors can detect a change in position of the slave arm at each DOF, such as when the actuators cause rotation about the DOF axes. When the position of the slave about the slave arm DOF axes reaches a position proportional to a position of the master control arm at the corresponding DOF axes, the actuators cease causing movement of the slave arm. In this way, the position of the master control arm can be proportionally matched by the slave arm. As with the master control arm, the position sensors of the slave arm can include any type of suitable position sensor.

The slave arm can also include load sensors, which are associated with the DOF of the slave arm. The load sensors can be used to measure a load in the slave arm, which load can be proportionally reproduced by the actuators of the master control arm. In other words, a load in the slave arm can cause a corresponding load to be exerted within the master control arm. In this way, a load "felt" at the slave arm can be transmitted to the master control arm and, thus felt by the user to the same degree or some proportional amount. This force reflection aspect thus includes the slave arm at least somewhat controlling the master control arm via the torque commands. The load sensors can also be used to enable gravity compensation of the slave arm. In addition, the load sensors can be used to measure a load applied by a user to the slave arm.

In one aspect, there is one load sensor for each DOF of the slave arm. In another aspect, several DOF of the slave arm can be accounted for with a multi DOF load sensor. For example, a multi DOF load sensor capable of measuring loads in six DOF could be associated with axes 325, 326, 327, which correspond to the wrist DOF of the user and axes 321, 322, 323, which corresponds to the shoulder DOF of the user. A single DOF load sensor can be associated with axis 324, which corresponds to the elbow DOF of the user. Data from the multi DOF load sensors can be used to calculate the load at a DOF between the load sensor location and the base 310.

The load sensors can be located, for example, at each support member of the slave arm. In one aspect, the load sensors can be associated with the actuators, as discussed in more detail below. As with the master control arm, the load sensors of the slave arm can include any type of suitable load sensor.

Additionally, load sensors can be located at other locations on the slave arm. For example, a load sensor 368 can be located on seventh support member 317. Load sensor 368 can be configured to measure loads acting on the seventh support member 317 through end effector 390. Load sensor 368 can be configured to measure load in at least one DOF, and in one aspect, is a multi DOF load sensor.

End effector 390 can be located at an extremity of the slave arm and can be configured to serve a variety of uses, as discussed below. For example, the end effector can be configured to lift and secure a payload for manipulation by the slave arm. Thus, load sensor 368 can measure loads imparted by the payload and the end effector on the seventh support member 317. Load data acquired at the end effector can be used to enhance the ability of the slave arm to support and maneuver the end effector and payload.

The slave arm 300A can also include a GDC 371 associated with each DOF. In one example, a separate GDC 371, 372, 373, 374, 375, 376 and 377 can be operable about each of the axes in the slave arm 300A. The GDCs of the slave arm can be similar to, and serve the same purpose as, the GDCs of the master control arm.

The slave arm 300A can also include servo valves 381, 382, 383, 384, 385, 386, 387. Servo valves can be fluidly coupled to actuators of the slave arm, such as hydraulic actuators, and can receive commands from the GDCs to operate the actuators. The servo valves of the slave arm can be similar to the servo valves of the master control arm.

The slave arm 300A can also include a gravity sensor 304 to determine the gravity vector, which can be used to enable gravity compensation of the slave arm, discussed further below. The gravity sensor can be associated with the slave arm, such that the gravity sensor and the base of the slave arm are fixed relative to one another. For example, the gravity sensor can be located on the base 310 of the slave arm or on a support for the base of the slave arm. The gravity sensor of the slave arm can be similar to, and perform the same function as a gravity sensor for the master control arm. In certain aspects, only a single gravity sensor may be used when the master control arm and the slave arm are fixed to a common platform, as in FIG. 1. In certain other aspects, the master control arm and the slave arm can each have a gravity sensor when the master control arm and the slave arm are on separate platforms, as in FIG. 18. In still other aspects, a gravity sensor can be located on each linkage or support member of the slave arm, such as at a center of gravity of the linkage or support member.

Figure 7A:
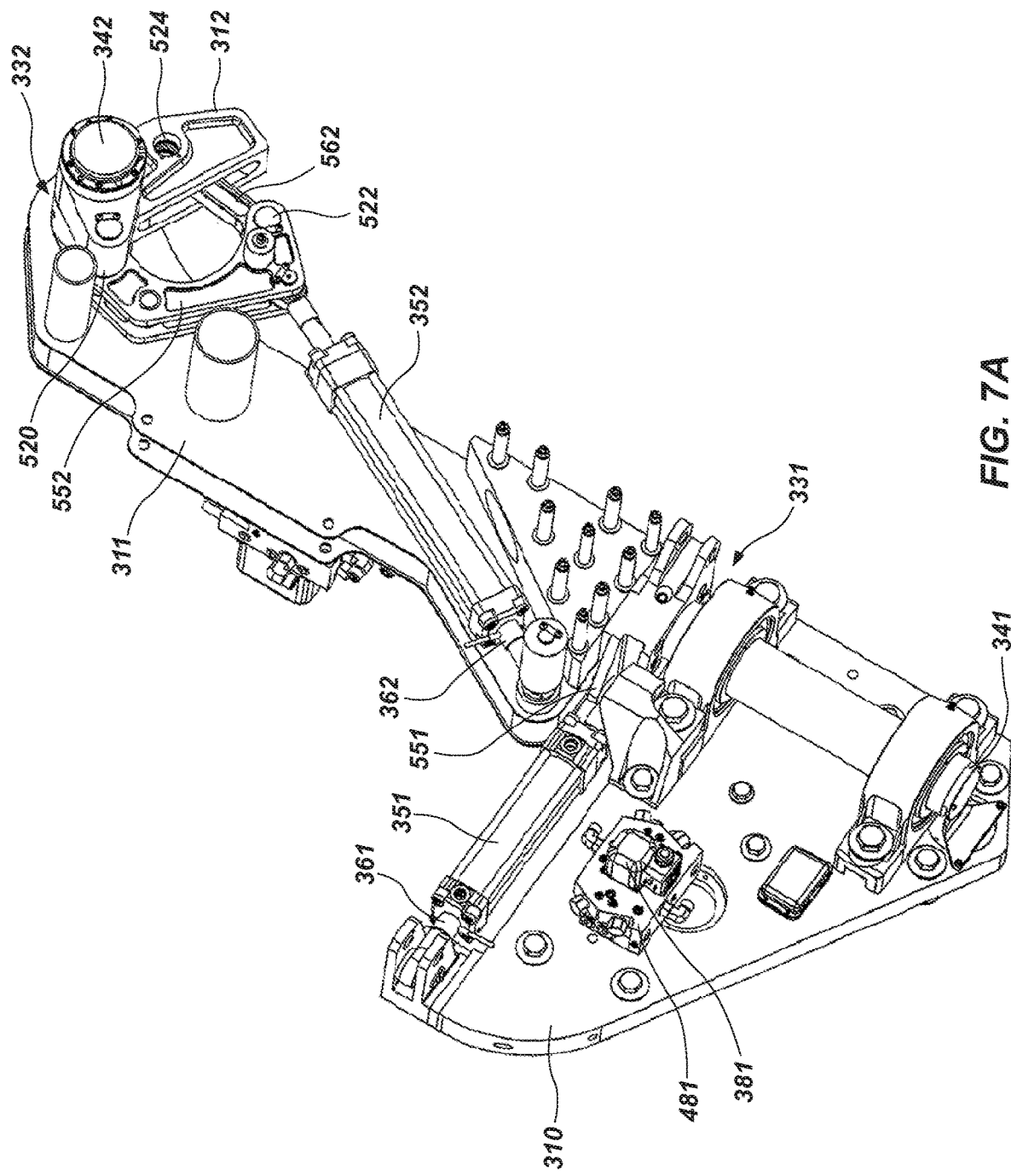
FIG. 7A is a perspective view of a base, a first support member, and a second support member of the slave arm of FIGS. 6A and 6B.
Figure 7B:
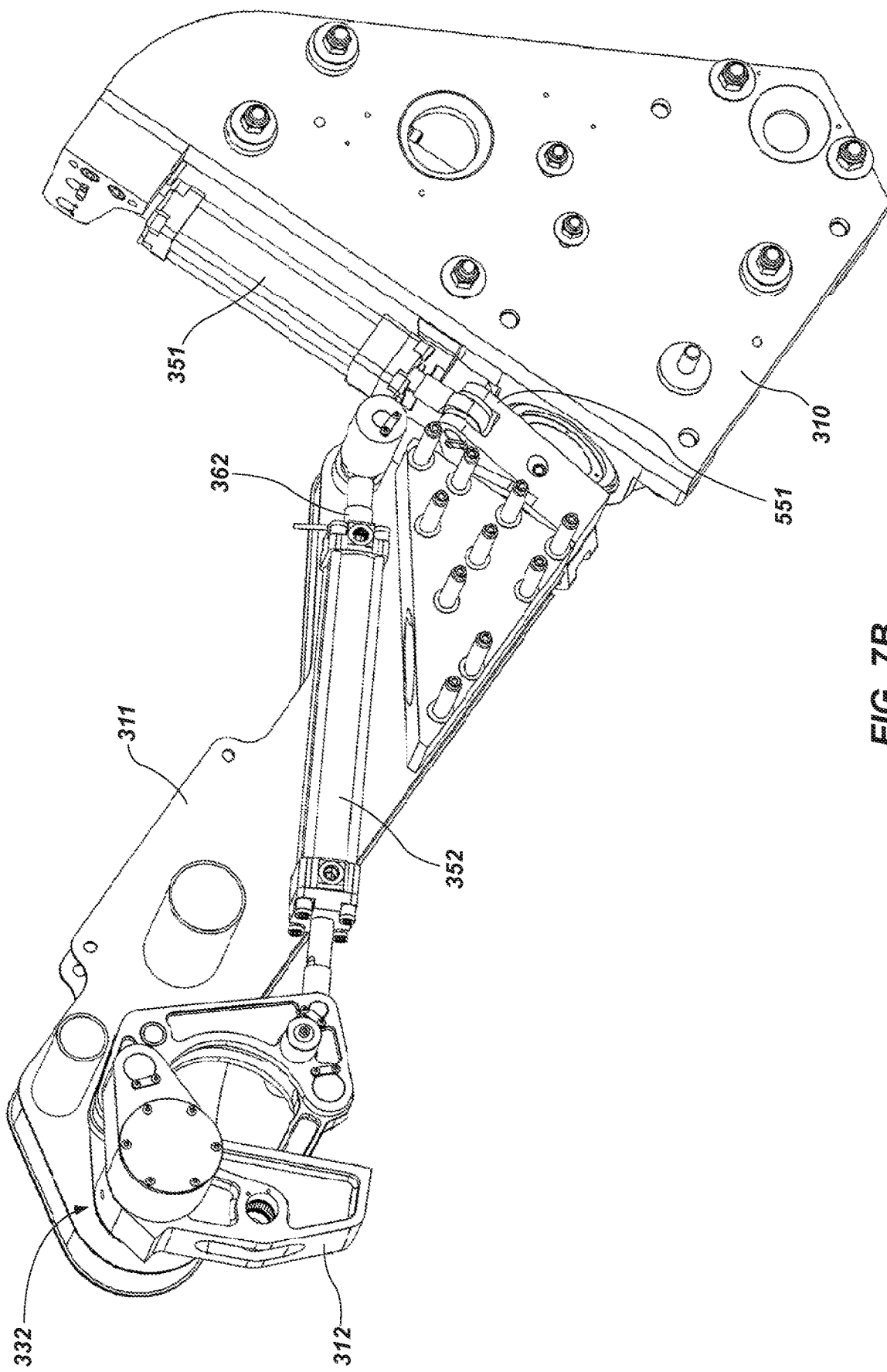
FIG. 7B is another perspective view of the base, the first support member, and the second support member of FIG. 7A.

With reference to FIGS. 7A and 7B and further reference to FIGS. 6A and 6B, illustrated are detailed views of the base 310 that couples to the platform via a support member or system, the first support member 311 coupled to the base 310 at joint 331, and a portion of the second support member 312 coupled to the first support member 311 at joint 332. Some features of the slave arm have been omitted in FIGS. 7A and 7B to show certain aspects of the slave arm that are otherwise obscured from view. Position sensor 341 is associated with joint 331 to sense a relative change in position between the base 310 and the first support member 311.

Actuator 351 can provide a torque acting about the DOF associated with axis 321 formed by joint 331. Load sensor 361, which is associated with actuator 351, can measure a load acting about the DOF associated with axis 321 formed by joint 331.

Actuator 351 is coupled to the base 310 at one end and coupled to torque member 551 at an opposite end. Torque member 551 is coupled to the first support member 311 such that rotation of the torque member causes rotation of the first support member. Torque member 551 rotates about axis 321 and extends away from the axis to provide a lever arm and a coupling interface with the actuator 351. Thus, movement of the actuator causes movement of the torque member 351, which causes movement of the first support member 311 relative to the base 310 about axis 321.

Actuator 351 is fluidly coupled to servo valve 381, which controls hydraulic fluid pressure acting on both sides of a piston of the linear actuator. Thus, the servo valve control can cause the piston to move back and forth to cause bi-directional rotation of the first support member about axis 321. Servo valve 381 is electrically coupled to GDC 371, which controls actuation of the actuator 351 via control signals to the servo valve. As mentioned above, the GDC can receive position and/or load data from sensors, such as position sensor 341 and load sensor 361, to operate the actuator. The position sensor 341 is located at one end of joint 331 to measure relative rotation between the base 310 and the first support member 311. The load sensor 361 is coupled to the actuator 351 to measure load in the actuator.

FIGS. 7A and 7B further illustrate that position sensor 342 is associated with joint 332 to sense a relative change in position between the first support member 311 and the second support member 312. Actuator 352 can provide a torque acting about the DOF associated with axis 322 formed by joint 332. Load sensor 362, which is associated with actuator 352, can measure a load acting about the DOF associated with axis 322 formed by joint 332.

A clamp valve 481 can be used to fluidly isolate actuator 351 from servo valve 381 associated with actuator 351. In other words, the clamp valve 481 can function to lock the actuator 351 to prevent movement of the associated DOF for safety and other reasons. Thus, in one aspect, clamp valves can be used as a safety measure in case of a hydraulic or electrical system failure. In another aspect, clamp valves can be used to lock the slave arm in position while supporting a payload. For example, the slave arm can lift and manipulate an object into a desired position. Once the object has been properly positioned by the slave arm, clamp valves can lock the slave arm in that position indefinitely to perform the intended task. Once the desired task has been completed, the clamp valves can be caused to allow the slave arm to again move as actuated under servo valve control. The clamp valve can be automatically controlled, such as in a safety feature that locks the slave arm when a preset condition has been satisfied, or user controlled, such as by a switch or other means when the user desires to lock the slave arm to weld or perform some other task. Clamp valves can be utilized at any slave arm DOF and in any slave arm DOF combination. Of course, clamp valves can also be employed on the master control arm as will be appreciated by those skilled in the art.

Figure 7C:
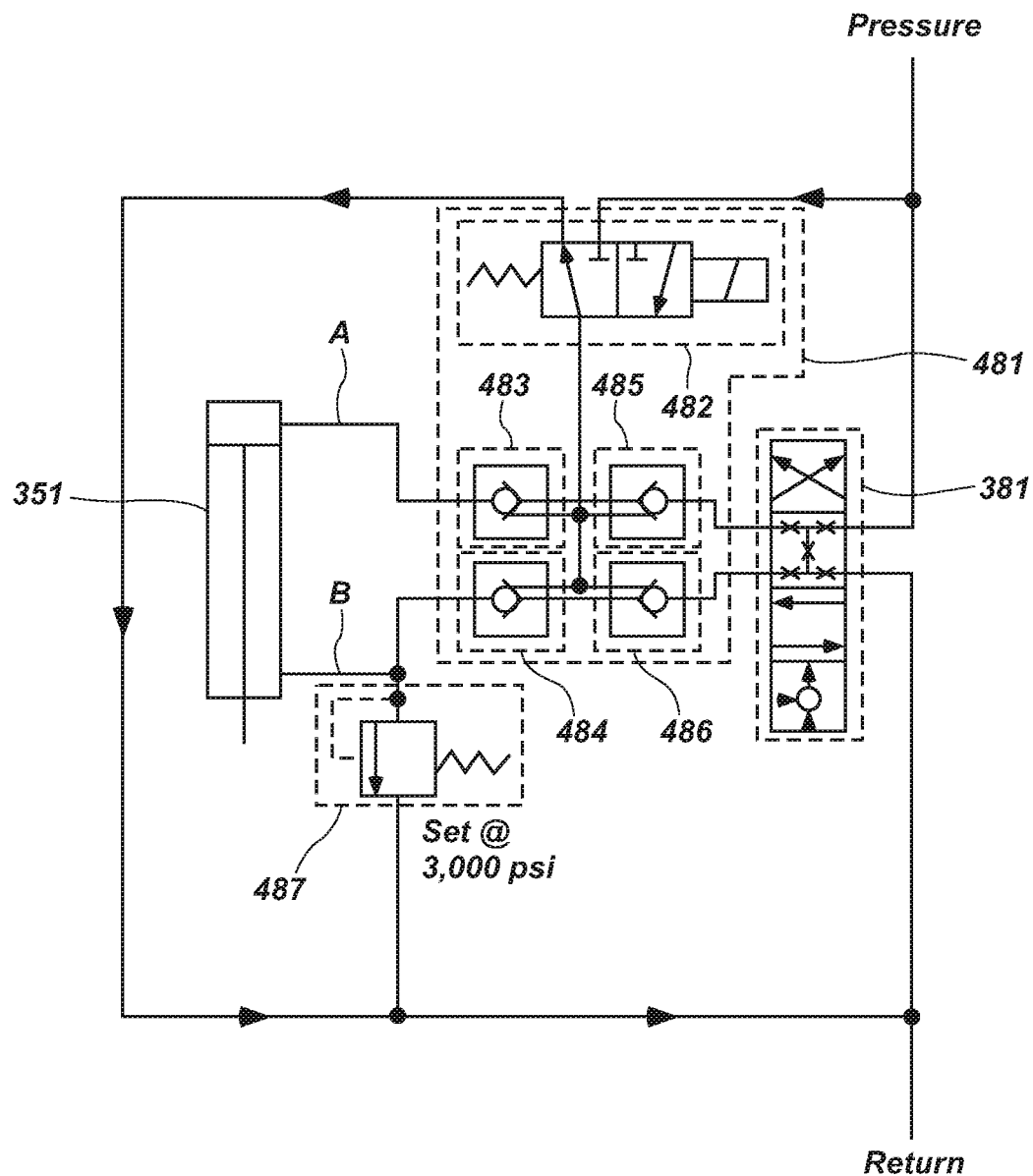
FIG. 7C is a hydraulic schematic of a clamp valve to isolate an actuator from a servo valve, in accordance with an example of the present disclosure.

As schematically illustrated in FIG. 7C, the servo valve 381 can be fluidly connected to "A" and "B" sides of the actuator 351. The clamp valve 481 can operate to open or close the "A" and "B" connections. The clamp valve 481 can include a directional valve 482 having three ports and two discrete positions. As shown, the directional valve is in a normally closed position and is solenoid controlled with a spring return to closed position. The directional valve 482 acts as a pilot valve for check valves 483, 484, 485, 486. The check valves require pilot pressure to open. Check valves 483, 485 are coupled to the "A" connection and check valves 484, 486 are coupled to the "B" connection. A pressure relief valve 487 in a normally closed position can also be included.

In operation, pressure from the servo valve 381 through the "A" connection is blocked by check valve 485 unless the solenoid of the directional valve 482 has been actuated to provide a pilot pressure to open the check valve 485. Once check valve 485 has been opened, pressure can be delivered to the "A" side of the actuator 351 to cause the actuator to move. Similarly, check valve 486 blocks the servo valve 381 "B" connection unless the directional valve 482 has been actuated to provide a pilot pressure to open the check valve 486. The directional valve 482 must be actuated to provide a pilot pressure for check valves 485, 486 in order for the servo valve 381 to control the actuator 351. Likewise, check valves 483, 484 block flow from the actuator 351 to the servo valve 381 through the "A" and "B" connections, respectively, unless the solenoid of the directional valve 482 has been actuated to provide a pilot pressure to open the check valves 483, 484. When the check valves 483, 484 are closed, the actuator 351 is locked in position. The directional valve 482 is connected to the check valves 483, 484, 485, 486 such that all the check valves are open or closed at the same time. Therefore, when the solenoid of the directional valve is actuated to provide a pilot pressure to open the check valves, the "A" and "B" connections are open and the servo valve 381 can control the movement of the actuator 351. On the other hand, when the solenoid is not actuated and the check valves are closed, the "A" and "B" connections are blocked and the servo valve 381 cannot control movement of the actuator 351 and the actuator is locked in position. Thus, the clamp valve 481 can fluidly isolate the actuator 351 from the servo valve 381. It should be recognized that the clamp valve in this example can be coupled with any servo valve and actuator of the slave arm or master control arm discussed herein. Additionally, the pressure relief valve 487 can be set to open at a predetermined pressure to prevent damage to the actuator, clamp valve components, and/or connecting lines therebetween.

Actuator 352 is coupled to the first support member 311 at one end and to first linkage 552 at an opposite end of the actuator. First linkage 552 is coupled to the first support member 311 at pivot 520 and to a second linkage 562 at pivot 522. Second linkage 562 is coupled to the second support member 312 at pivot 524. Rotation of the first linkage 552 and the second linkage 562 relative to the first support member 311 causes rotation of the second support member 312 about axis 322. Thus, movement of the actuator 352 causes movement of the first linkage 552 and the second linkage 562, which causes movement of the second support member 312 about axis 322. The linkage configuration formed by the first support member 311, first linkage 552, second linkage 562, and the second support member 312 forms a four-bar linkage. This configuration can be utilized to increase a range of rotation of the second support member 312 about axis 222 relative to the first support member 311.

Actuator 352 is fluidly coupled to servo valve 382, which is electrically coupled to GDC 372 and can receive position and/or load data from sensors, such as position sensor 342 and load sensor 362, to operate the actuator 352. The position sensor 342 is located at joint 332 to measure relative rotation between the first support member 311 and the second support member 312. The load sensor 362 is coupled to the actuator 352 to measure load in the actuator.

Figure 8A:
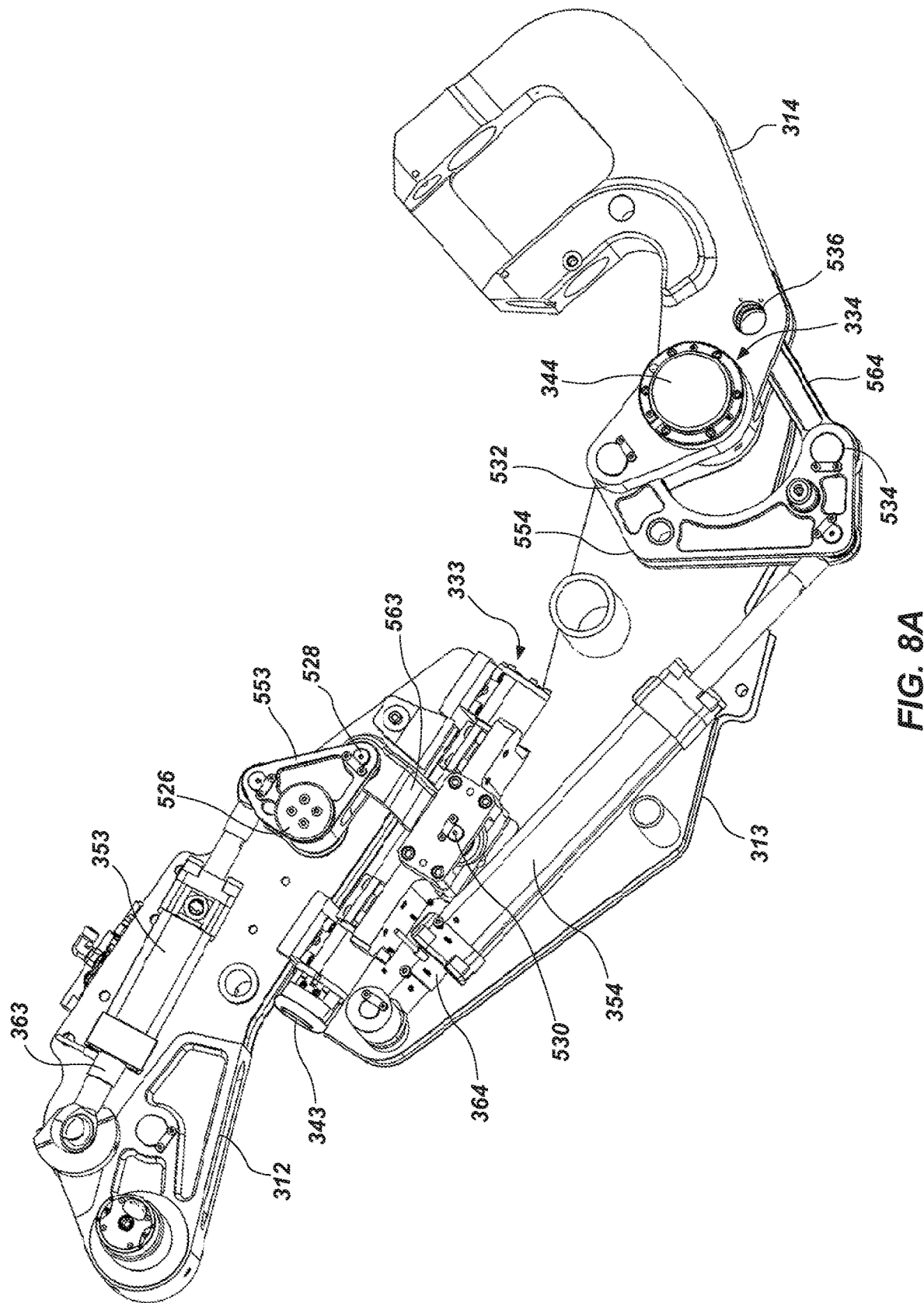
FIG. 8A is a perspective view of a second support member, a third support member, and a fourth support member of the slave arm of FIGS. 6A and 6B.
Figure 8B:
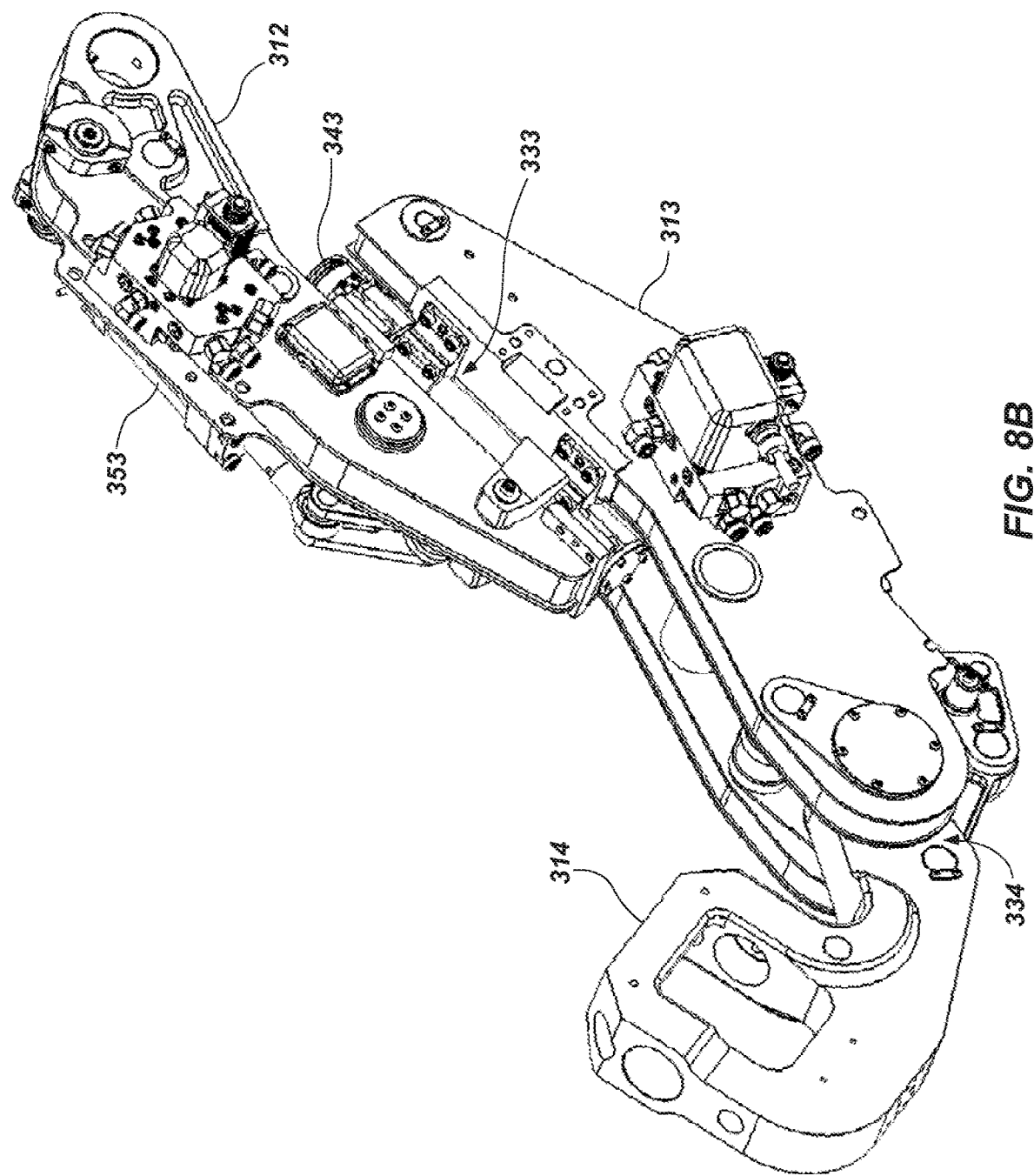
FIG. 8B is another perspective view of the second support member, the third support member, and the fourth support member of FIG. 8A.

With reference to FIGS. 8A and 8B and further reference to FIGS. 6A and 6B, illustrated are detailed views of the second support member 312, the third support member 313 coupled to the second support member 312 at joint 333, and a portion of the fourth support member 314 coupled to third support member 313 at joint 334. Some features of the slave arm have been omitted in FIGS. 8A and 8B to show certain aspects of the slave arm that are otherwise obscured from view. Position sensor 343 is associated with joint 333 to sense a relative change in position between the second support member 312 and the third support member 313. Actuator 353 can provide a torque acting about the DOF associated with axis 323 formed by joint 333. Load sensor 363, which is associated with actuator 353, can measure a load acting about the DOF associated with axis 323 formed by joint 333.

In the embodiment shown, the second support member 312 and the third support member 313 comprise lateral edges 392 and 393, respectively, which overlap one another. The lateral edges 392, 393 are located proximate to joint 333. Coupling of the support members 312 and 313 about the lateral edges 392 and 393, respectively, facilitates relative rotation of these support members such that the support members "swing" relative to one another about axis 323. Actuator 353 is coupled to the second support member 312 at one end and coupled to first linkage 553 at an opposite end of the actuator. First linkage 553 is rotatably coupled to the second support member 312 at pivot 526. In one aspect, the first linkage can be configured for motion in a plane, such as by rotating about a single degree of freedom pivot coupling. The single degree of freedom pivot coupling can be substantially perpendicular to axis 323. The first linkage 553 is also rotatably coupled to a second linkage 563 at pivot 528. Second linkage 563 is coupled to the third support member 313 at pivot 530. Motion by the first linkage 553 in the plane can cause an out of plane relative rotational movement of the second support member 312 and the third support member 313 about axis 323. In one aspect, pivots or couplings between linkages, actuators, and/or support members can include pin-type connections or spherical-type connections. Pin-type connections allow rotation in a single degree of freedom. Spherical-type connections can allow rotational movement in multiple degrees of freedom. For example, the actuator 353 is coupled to the second support member 312 and to first linkage 553 via a spherical-type connection. Further, second linkage 563 is coupled to the first linkage 553 and the support member 313 at pivot 530 via a spherical-type connection. The spherical-type connections of the second linkage 563 allows the second linkage to simultaneously rotate in three degrees of freedom as the second support member 312 and the third support member 313 rotate relative to one another about axis 323. The freedom to twist at the joints as the support members rotate relative to one another can minimize stress at the joints and in the second support member, which can enhance operation of the movement at joint 333.

Rotation of the first linkage 553 relative to the second support member 312 causes the second linkage 563 to act on the third support member 313 via the pivot 530, which causes relative rotation of the second support member 312 and the third support member 313 about joint 333. Thus, movement of the actuator 353 causes movement of the first linkage 553 and the second linkage 563, which causes movement of the third support member 313 about axis 323. By overlapping lateral edges 392, 393 proximate to joint 333, the linkage configuration formed by the second support member 312, the first linkage 553, the second linkage 563, and the third support member 313, can convert linear motion in one plane to an out of plane rotational movement. This configuration allows the support structures to be constructed from a series of plates, thus reducing costs and weight of the system over systems having structural elements that rotate relative to one another in an end-to-end configuration.

Actuator 353 is fluidly coupled to servo valve 383, which is electrically coupled to GDC 373 and can receive position and/or load data from sensors, such as position sensor 343 and load sensor 363, to operate the actuator 353. The position sensor 343 is located at one end of joint 333 to measure relative rotation between the second support member 312 and the third support member 313. The load sensor 363 is coupled to the actuator 353 to measure load in the actuator.

FIGS. 8A and 8B further illustrate that position sensor 344 is associated with joint 334 to sense a relative change in position between the third support member 313 and the fourth support member 314. Actuator 354 can provide a torque acting about the DOF associated with axis 324 formed by joint 334. Load sensor 364, which is associated with actuator 354, can measure a load acting about the DOF associated with axis 324 formed by joint 334.

Actuator 354 is coupled to the third support member 313 at one end and to first linkage 554 at an opposite end. First linkage 554 is coupled to the third support member 313 at pivot 532 and to a second linkage 564 at pivot 534. Second linkage 564 is coupled to the fourth support member 314 at pivot 536. Rotation of the first linkage 554 relative to the third support member 313 and the movement of the second linkage 564 cause rotation of the fourth support member 314 about the joint 334. Thus, movement of the actuator 354 causes movement of the first linkage 554 and the second linkage 564, which causes movement of the fourth support member 314 about axis 324.

The linkage configuration formed by the third support member 313, first linkage 554, second linkage 564, and the fourth support member 314 forms a four-bar linkage. This configuration can be utilized to increase a range of rotation of the fourth support member 314 about axis 224 relative to the third support member 313.

Actuator 354 is fluidly coupled to servo valve 384, which is electrically coupled to GDC 374 and can receive position and/or load data from sensors, such as position sensor 344 and load sensor 364, to operate the actuator 354. The position sensor 344 is located at joint 334 to measure relative rotation between the third support member 313 and the fourth support member 314. The load sensor 364 is coupled to the second linkage 564 to measure a load acting on the second linkage.

Figure 9A:
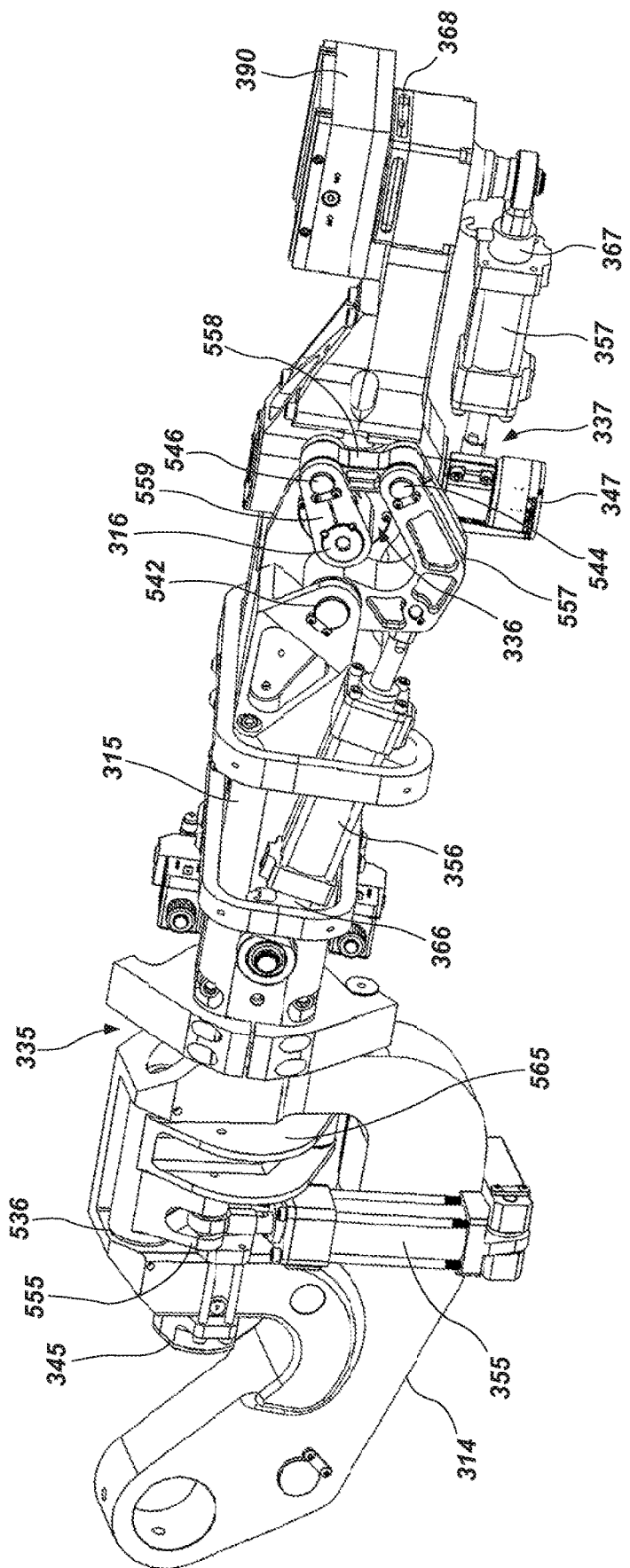
FIG. 9A is a perspective view of a fourth support member, a fifth support member, a sixth support member, and a seventh support member of the slave arm of FIGS. 6A and 6B.
Figure 9C:
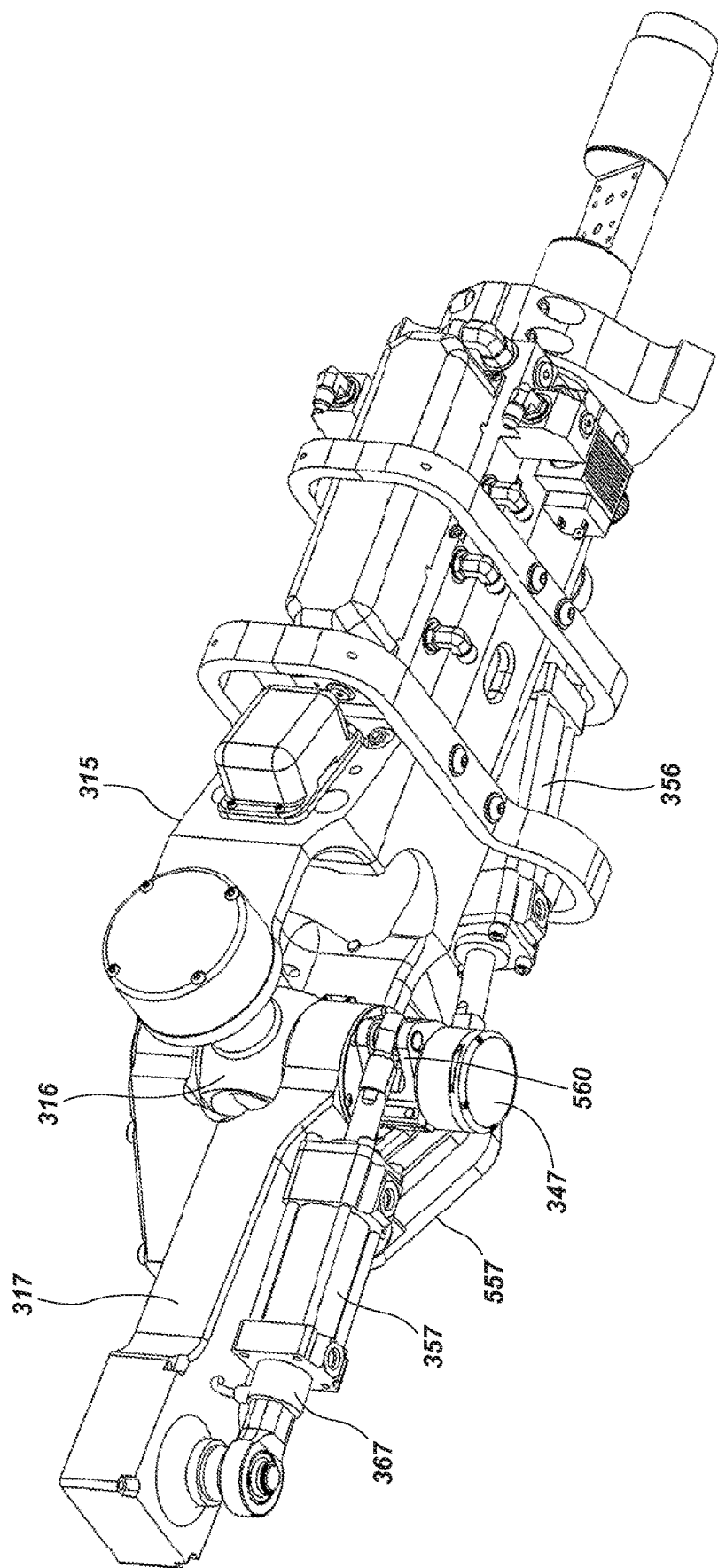
FIG. 9C is a perspective view of the fifth support member, the sixth support member, and the seventh support member of FIG. 9A.

With reference to FIGS. 9A, 9B, and 9C, and further reference to FIGS. 6A and 6B, illustrated are detailed views of the fifth support member 315 coupled to the fourth support member 314 at joint 335, the sixth support member 316 coupled to fifth support member 315 at joint 336, and the seventh support member 317 coupled to the sixth support member 316 at joint 337. Some features of the slave arm have been omitted in FIGS. 9A, 9B, and 9C to show certain aspects of the slave arm that are otherwise obscured from view.

Position sensor 345 is associated with joint 335 to sense a relative change in position between the fourth support member 314 and the fifth support member 315. Actuator 355 can provide a torque acting about the DOF associated with axis 325 formed by joint 335. Load sensor 365 can measure a load acting about the DOF associated with axis 325. Load sensor 365 is associated with actuator 354.

Figure 9D:
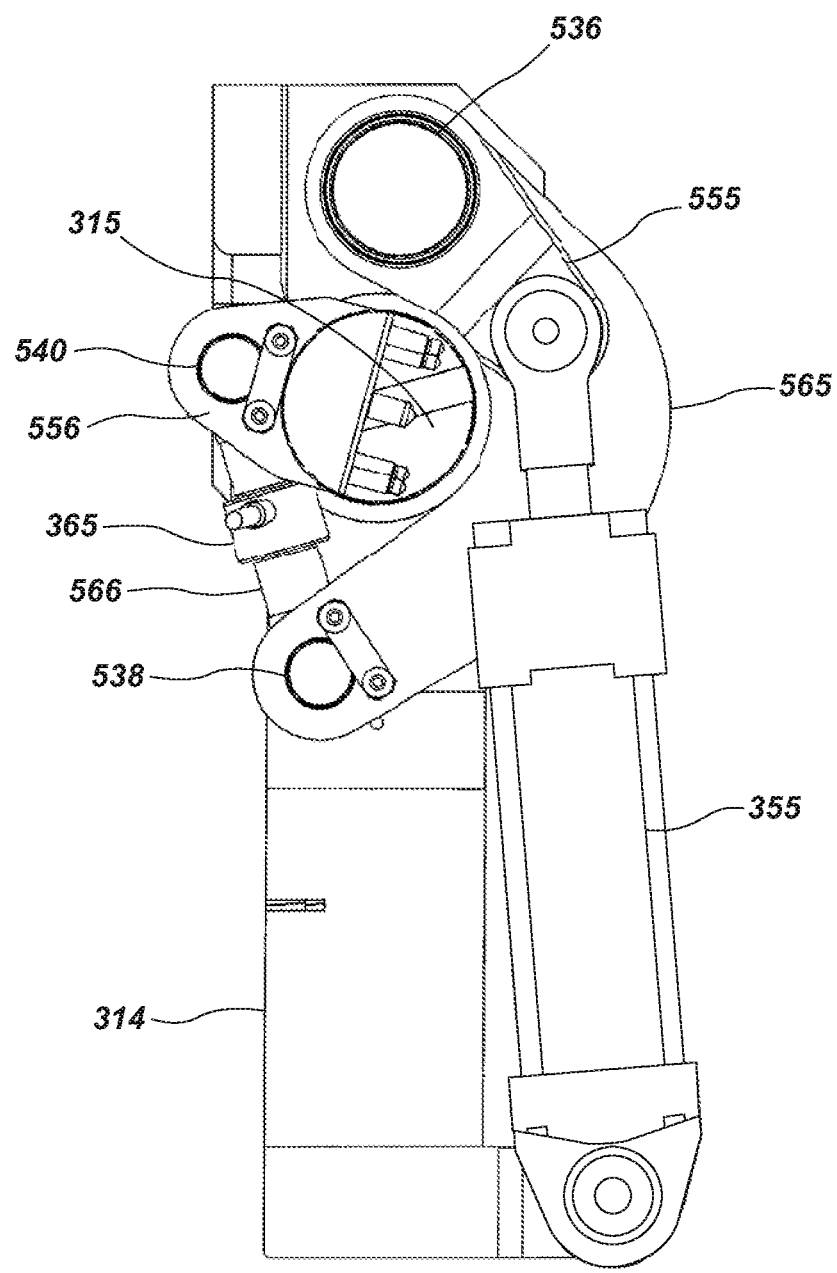
FIG. 9D is a section view of an actuator and linkage associated with a joint between the fourth support member and the fifth support member of FIG. 9A.

With reference to FIG. 9D, actuator 355 is coupled to the fourth support member 314 at one end and coupled to a first torque member 555 at an opposite end of the actuator. The first torque member 555 is coupled to the fourth support member 314 at pivot 536. The first torque member 555 rotates about pivot 536 and extends away from the pivot to provide a lever arm and a coupling interface with the actuator 355. Thus, movement of the actuator 355 causes movement of the first torque member 555. The first torque member 555 is rigidly coupled to a first linkage 565, which also rotates about pivot 536. Thus, movement of the first torque member 555 causes movement of the first linkage 565. First linkage 565 is coupled to a second linkage 566 at pivot 538. Second linkage 566 is coupled to a second torque member 556 at pivot 540. The second torque member 556 is coupled to the fifth support member 315, which rotates about axis 325. The second torque member 556 extends away from axis 325 to provide a lever arm and to couple with the second linkage 566. Thus, movement of the second linkage 566 causes movement of the second torque member 556 about axis 325, which cause movement of the fifth support member 315 about axis 325. In one aspect, the first linkage 565 is configured to couple with the second linkage 566 at an opposite location from pivot 536 relative to axis 325, which can "wrap" the first and second linkages about axis 325. In this case, the actuator 355 can cause the first and second linkages to "unwrap" when moved in one direction and to "wrap-up" when moved in an opposite direction. This ability to "wrap" and "unwrap" can increase the angular range of motion available with a given stroke of a linear actuator.

Actuator 355 is fluidly coupled to servo valve 385, which is electrically coupled to GDC 375 and can receive position and/or load data from sensors, such as position sensor 345 and load sensor 365, to operate the actuator 355. The position sensor 345 is located at one end of joint 335 to measure relative rotation between the fourth support member 314 and the fifth support member 315. The load sensor 365 is coupled to the second linkage 566 and can measure a load acting about the DOF associated with axis 325.

With continued reference to FIGS. 9A, 9B, and 9C, position sensor 346 is associated with joint 336 to sense a relative change in position between the fifth support member 315 and the sixth support member 316. Actuator 356 can provide a torque acting about the DOF associated with axis 326 formed by joint 336. Load sensor 366, which is associated with actuator 356, can measure a load acting about the DOF associated with axis 326.

Actuator 356 is coupled to the fifth support member 315 at one end and to first linkage 557 at an opposite end of the actuator. The first linkage 557 is coupled to the fifth support member 315 at pivot 542. First linkage 557 is coupled to a second linkage 558 at pivot 544. Second linkage 558 is coupled to a torque member 559 at pivot 546. The torque member 559 is coupled to the sixth support member 316, which rotates about axis 326. The torque member 559 extends away from axis 326 to provide a lever arm and to couple with the second linkage 558. Thus, rotation of the first linkage can cause movement of the second linkage 558, which acts on the torque member 559 about axis 326 to cause movement of the sixth support member 316 about axis 326. In one aspect, the first linkage 557 is configured to couple with the second linkage 558 at an opposite location from pivot 536 relative to axis 326, which can allow the first and second linkages to "wrap" and "unwrap" about axis 325, as discussed above.

Actuator 356 is fluidly coupled to servo valve 386, which is electrically coupled to GDC 376 and can receive position and/or load data from sensors, such as position sensor 346 and load sensor 366, to operate the actuator 356. The position sensor 346 is located at one end of joint 336 to measure relative rotation between the fifth support member 315 and the sixth support member 316. The load sensor 366 is coupled to actuator 356 and can measure load in the actuator.

FIGS. 9A, 9B, and 9C further illustrate that position sensor 347 is associated with joint 337 to sense a relative change in position between the sixth support member 316 and the seventh support member 317. Actuator 357 can provide a torque acting about the DOF associated with axis 327 formed by joint 337. Load sensor 367, which is associated with actuator 357, can measure a load acting about the DOF associated with axis 327.

Actuator 357 is coupled to the seventh support member 317 at one end and coupled to torque member 560 at an opposite end. Torque member 560 extends away from axis 327 and provides a lever arm and a coupling for the sixth support member 316. The coupling between the seventh support member 317 and the torque member 560 is off axis 327. Thus, movement of the actuator applies a torque to the torque member 560, which causes movement of the seventh support member 317 relative to the sixth support member 316 about axis 327.

Actuator 357 is fluidly coupled to servo valve 387, which is electrically coupled to GDC 377 and can receive position and/or load data from sensors, such as position sensor 347 and load sensor 367, to operate the actuator 357. The position sensor 347 is located at one end of joint 337 to measure relative rotation between the sixth support member 316 and the seventh support member 317. The load sensor 367 is coupled to actuator 357 and can measure load in the actuator. In the figures, GDC 376 and GDC 377 are at the same location on the fifth support member 315. Additionally, servo valve 285, servo valve 286, and servo valve 287 are at the same location on the fifth support member 215.

An explanation of the control system signal flow of the teleoperated robotic system is provided below with respect to the examples of the robotic system that are illustrated in the previously described figures. With reference to FIGS. 10A-10D, and particularly FIG. 10A, each master control arm actuator 251-257 and slave arm actuator 351-357 can be controlled by the master control arm GDCs 271-277 and the slave arm GDCs 371-377, respectively, for each DOF being controlled. As discussed above, each DOF for both the slave arm 300A and the kinematically equivalent master control arm 200A can have an actuator. A robotic arm with seven DOF can therefore have at least seven actuators on the master control arm and seven actuators on the slave arm. The servo valve of the actuator can operate the actuator in a forward direction and reverse direction. Each actuator can have a corresponding position sensor and load sensor that can determine both the position and force (or torque) acting on the master control arm joints 231-237 and slave arm joints 331-337, each of which can comprise a DOF.

The GDC can use the inputs from a position sensor 241-247 and 341-347 and a load sensor 261-267 and 361-367 which are associated with each joint 231-237 and 331-337, respectively, to calculate a force that can be converted into a signal to actuate the actuator with a specified force to a specified position or, in other words, apply a specified torque at a DOF. For example, a positive signal can move the actuator in a forward direction and a negative signal can move the actuator in a reverse direction, or vice versa. The magnitude of the signal can indicate the strength of the force generated by the actuator. A central control 610 can coordinate signals between the GDC of the master control arm for a DOF and the GDC of the slave arm. The central control can also perform filtering and amplification for signals passing between the master control arm and the slave arm. The coordination, filtering, and amplification at the central control is represented as command filter 611 through 617 in FIG. 10A. A force reflective signal can be returned from the GDC of the slave arm through the command filter to the GDC of the master control arm.

Each GDC is configured to provide a control scheme that is used to control the position and torque of a joint on the master control arm 200A as well as a corresponding joint on the slave arm 300A. The GDC employs a number of different closed loop control schemes. Each scheme is designed to provide a desired level of accuracy, speed, and stability to provide a teleoperated robotic lift system that is agile, fast and accurate. The control scheme for each support member 211-217 of the master control arm 200A and each support member 311-317 of the slave arm 300A, together with the command filters 611-617, are designed to limit or eliminate each segment from operating at a frequency that may induce a natural resonant harmonic on another support member in the respective arms 200A, 300A. Filtering of output signals and feedback signals is performed to remove high frequency signals that may induce resonance in a support member or other types of non-stable performance.

Figure 10A:
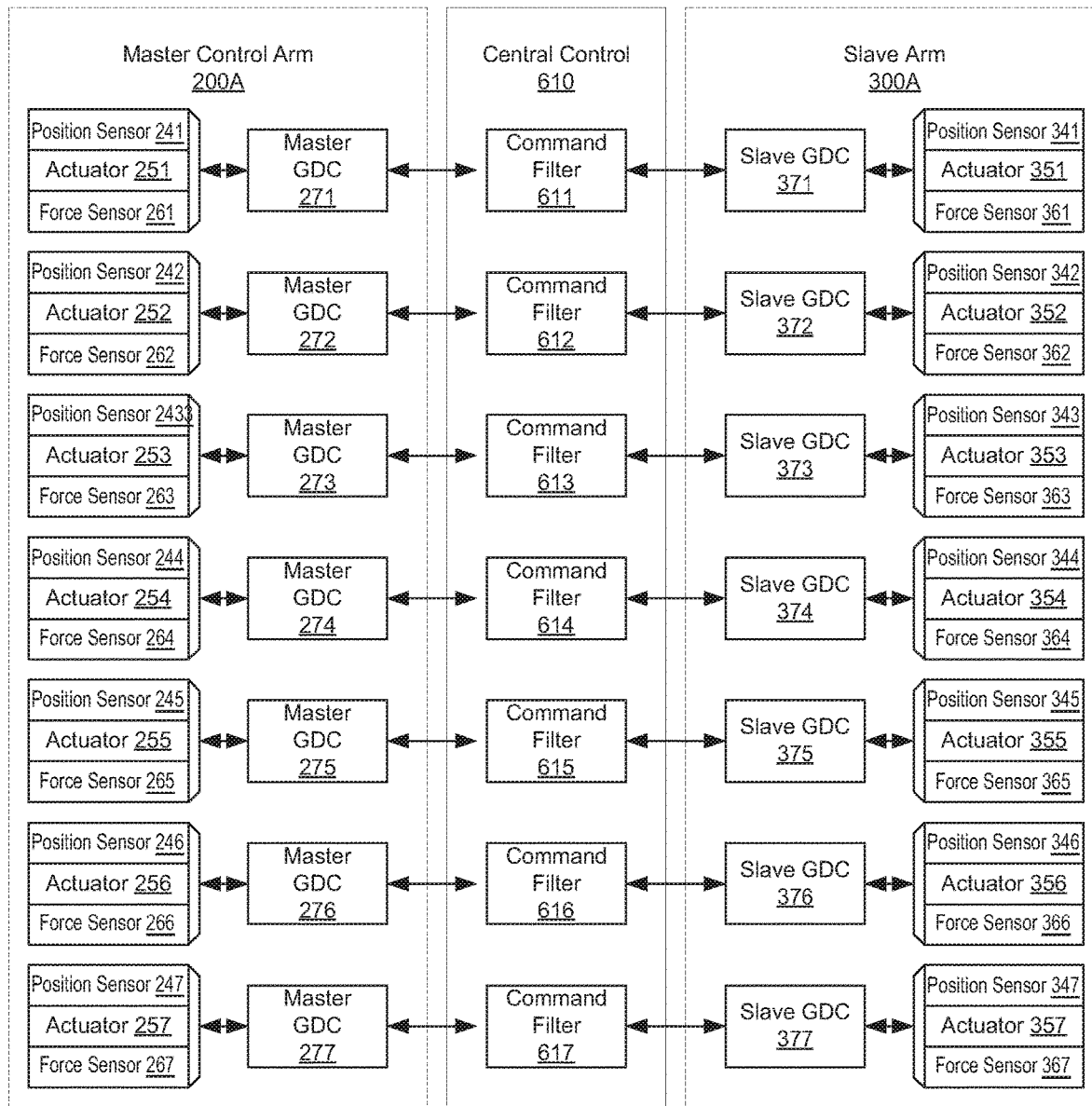
FIG. 10A is a schematic diagram of a control system signal flow of a teleoperated robotic system, in accordance with an example of the present disclosure.
Figure 10B:
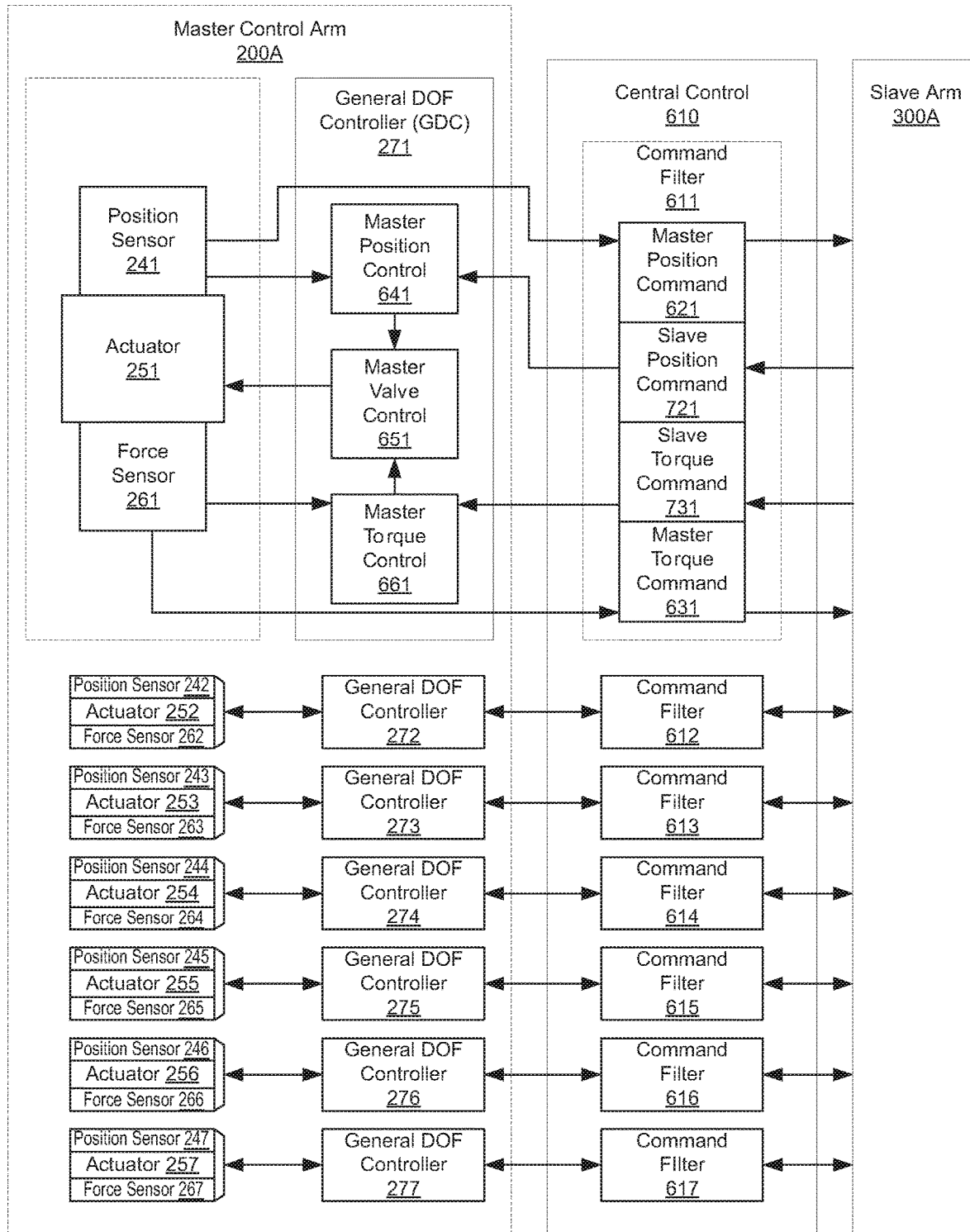
FIG. 10B is a schematic diagram of one aspect of the control signal flow of FIG. 10A.

With reference to FIGS. 10A-10D, and particularly FIG. 10B, each command filter 611-617 can be further subdivided to provide cross gain and filtering for both a position and a torque for both a master control arm DOF and a slave arm DOF. A control signal flow is illustrated for a single master control actuator 251 coupled to joint 231 and a matching slave arm actuator 351 coupled to joint 331 with their accompanying sensors, GDCs, and command circuitry. The other actuators for the other joints can function in a similar manner.

Returning to the example, a user may move the master control arm in a desired direction. A position sensor 241 on the master control arm 200A joint 231 can sense the change in position associated with the DOF. A position sensor signal can be transmitted from the position sensor 241 to the master position control 641 in a master control arm GDC 271 and the master position command 621 for cross gain and filtering input prior to communication to the slave arm GDC. While a position sensor measures a change in position, a load sensor 261 senses a force or torque exerted on the joint 231. The load sensor signal can be transmitted to the master torque control 661 in the master control arm GDC and the master torque command 631 for cross gain and filtering prior to communication to the slave arm GDC. A master valve control 651 in the master control arm GDC combines the inputs from the master position control and master torque control to generate a signal to actuate the actuator 251. The master position control can use a signal from the position sensor and a signal from a slave position command 721 from the GDC of the slave arm. Likewise, the master torque control can use a signal from the load sensor and a signal from a slave torque command 731 from the GDC of the slave arm.

The master position command 621 can provide a desired level of magnification, or scaling, of the user's movements at the master control arm 200A. For instance, for each degree a user moves a joint 231-237 in the master control arm, the master position command 621 can be set to provide a corresponding movement in the slave arm with a desired ratio. A typical ratio may be 1:1, enabling the slave arm to move at the same rate as the master control arm. However, a ratio of 2:1, 3:1, or higher may be selected to enable a user to make relatively small movements at the master arm while commanding the slave arm to move 2 to 3 times further. This may be helpful to the user when performing repeated movements by limiting the amount of movement of the user to reduce user fatigue. Conversely, the ratio may be set to 1:2, 1:3, or lower when the user is performing delicate tasks. By reducing the ratio, and requiring the user to move further than the corresponding movements of the slave arm, it enables the user to have more fine motor control over delicate tasks. The actual ratio can be set by adjusting the master position command 621 based on the needs and uses of the system and the system operator.

The master position command 621 can provide a positional boundary for the slave armies of the workspace, for example to limit the workspace to something smaller than the actual full reach of the slave arms. For example, if the system is operating in an area with a low ceiling, the system can be configured by the user so that the slave arms do not reach higher than the height of the low ceiling to avoid contact with the ceiling. A height limitation or other range of motion limitation that will prohibit the slave arm from extending beyond the imposed limit. Such boundaries or range of motion limitations can be set by adjusting the master position command 621 based on the needs and uses of the system and the system operator.

In another aspect, the master position command 621 can be selected to provide a desired level of offset of the user's movements at the master control arm 200A. For instance, the position of a joint 231-237 in the master control arm can be offset by a predetermined value to position the slave arm at a position that is offset from the master control arm. This can enable the user to operate in a more comfortable position when the slave arms are at a position that would otherwise require the user to be in an awkward or uncomfortable position. For example, the user may be performing tasks that require the slave arm to be elevated for a prolonged period of time. Without an offset level implementation, the user would be required to position the master control arm in an elevated position, as well. However, by utilizing position offset, the user can offset the position of the slave arm relative to the master control arm to allow the user to operate the master control arm with the user's arm in a lowered position while the slave arms remain operational in an elevated position. This can increase comfort and productivity while reducing fatigue and likelihood of operator error. The position offset can be variable and can be controlled by the user (e.g., via a user interface device operable with the control systems of the robotic device) while operating the master control arm.

Figure 10C:
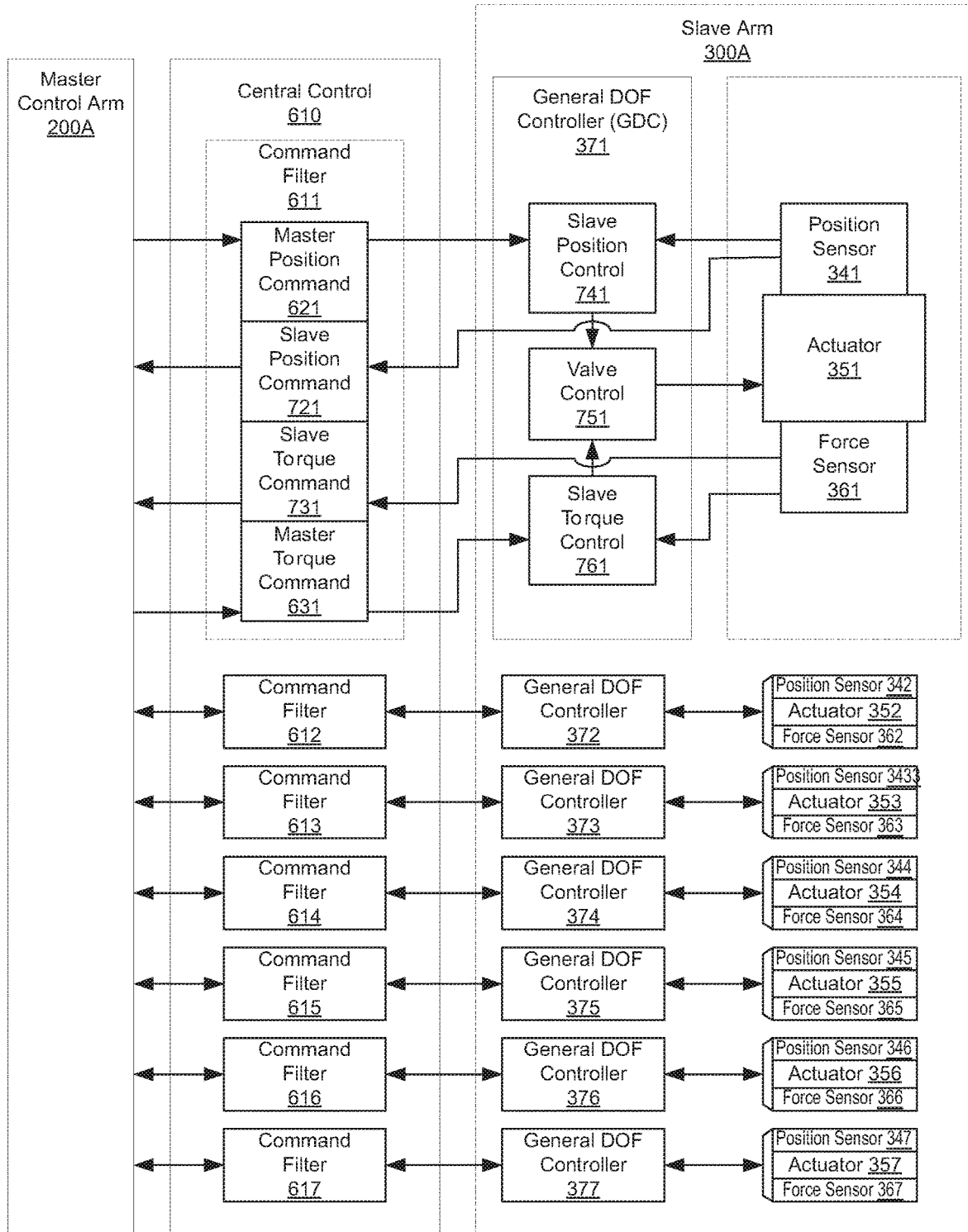
FIG. 10C is a schematic diagram of another aspect of the control signal flow of FIG. 10A.

With reference to FIGS. 10A-10D, and particularly FIG. 10C, the master position command 621 provides an amplified and filtered signal to a slave arm GDG 371 to move the joint 331 in the slave arm 300A to a position corresponding to the joint 321 in the master control arm 200A. A slave position control 741 generates a valve control 751 input using the current position sensed by the slave arm position sensor 341 and the new position of the master control arm provided by the master position command 621. A slave torque control 761 generates another valve control input using the current torque sensed by the slave arm load sensor 361 and the torque on the master control arm provided by the master torque command 631. The slave arm actuator is controlled by the valve control. The position sensor provides feedback to the slave position control and a reflective position feedback to the master control arm via the slave position command 721. The load sensor provides feedback to the slave torque control and a force reflective torque feedback to the master control arm via the slave torque command 731. In this manner the position and torque of the joint 231 at the master control arm are substantially duplicated on the joint 331 at the slave arm by providing the appropriate signal to the valve control 751 to actuate the joint 331.

The master position control 641 and the master torque control 661 can each use a lag lead compensator to determine an output to the master valve control 651. A lag lead compensator is selected to improve an undesirable frequency response in the feedback of the control system. The master position control 641 uses position feedback from the position sensor 241. The master torque control 661 uses torque feedback from the load sensor 261 on the actuator 251.

A phase lag section of the lag lead compensator can be designed to maintain low frequency gain while realizing a part of the gain margin. A phase lead section of the compensator can then realize the remainder of the phase margin, while increasing the system bandwidth to achieve a faster response.

In some cases, a compromise may be necessary. If either the specified phase margin or the compensator gain can be reduced, the high frequency gain of the compensator can also be reduced. If these specifications cannot be reduced, it may be necessary to employ a section of phase lag compensation cascaded with a section of phase lead compensation.

The position gains may be set so that the slave arm faithfully follows the position of the master control arm by implementing high gains. The master control arm may be configured so as to not have high position gains, which may help to minimize user effort. There is somewhat of a balancing act at work. If the master control arm gains are too low, the operator can lose the proprioception of what the slave arm is experiencing. For example, the slave arm gains can be increased up to acceptable stability limits, while the master control arm gains can be set to optimize the need of the user to sense what the slave arm is experiencing through the master control arm, while minimizing user fatigue.

Low torque gains can allow improved stability margins, particularly when the slave arm comes into contact with a rigid body and when two slave arms are coupled through a "two-handed" lift.

Tuning of position and torque gains for each slave arm DOF is dependent on the stiffness, mass, and inertia any particular DOF experiences. The position of robot arm DOF change as joints move, therefore, the inertia a particular DOF experiences may change significantly throughout a movement of the robotic arm. Since the slave arm can be configured to pick up a payload, the extra mass of the payload can also cause the inertia a DOF experiences to change significantly. Therefore, a given DOF can be tuned with static gains so that it is stable over all joint angles and payloads. However, this can result in sluggish performance in some situations and oscillatory performance in other situations. By accounting for the change in inertia at various joint angles and the change in inertia due to various payloads, the gains can be changed dynamically to optimize performance over the entire operating envelope. Thus, a gain schedule can be implemented to dynamically optimize performance. A gain schedule can include discrete predetermined values referenced in a table and/or values can be calculated from a formula. Changes in inertia can be determined from measured weights, estimated values, or other calculations.

In some exemplary embodiments, the teleoperated robotic device of the present invention may further comprise a master/slave relationship filtering function, or relationship filtering function, that addresses the problems relating to unwanted movements (e.g., unintentional induced movements) in the robotic system, and particularly the master control arm, such as those introduced by the mobile platform. For instance, the master/slave relationship filtering function addresses the problem where the master is caused to move differently than the desired input of the operator, which in turn may cause the slave to move in an undesired way.

In the particular situation where the user, the master control arm, and the slave arm are commonly supported about the same mobile platform, the master/slave relationship filtering function is useful to identify and filter frequencies resulting from undesirable movements of the master control arm and slave arm (e.g., those that are induced or caused by something other than the user) to reduce motion feedback. The master/slave relationship filtering function deals with an unwanted feedback loop created in the system. If left unchecked, oscillations in the system can continue and grow in amplitude. By detecting frequencies at which an unwanted feedback loop occurs, the feedback loop can essentially be broken and its impacts on the overall performance of the robotic system can be reduced or eliminated.

There are various ways in which the problem of unwanted movements in the master control arm (i.e., movements different from those resulting from the desired inputs from the user) that cause the slave arm to move in an undesirable way can occur. In one example, the user moves the master control arm and the master control arm oscillates at the master structural mode. In another example, the user moves the master control arm and the user oscillates at the operator support structural mode of the platform the user stands on. In another example, the slave arm moves or oscillates, which causes a sympathetic oscillation in the mobile platform, which in turn results in an oscillation in the user platform and/or the master stand, and therefore the master control arm. In still another example, the slave arm interacts with the environment that causes a sympathetic oscillation in the mobile platform, which in turn results in an oscillation in the user platform and/or the master stand.

In some exemplary embodiments, the structural mode oscillations of the mobile platform, the slave arm and the environment can occur within the desired robot operating envelop.

To reduce motion feedback and reduce or eliminate the effects of the unwanted feedback loop, cross commands can be filtered to minimize the oscillations resulting from coupling between master support modes and slave support and environment modes, as communicated through the mobile platform. The relationship filtering function dampens out oscillations at the identified structural mode frequencies by reducing the gain of the commands at those frequencies and minimizing the overall delay of the system's ability to reject these oscillations by introducing a phase lead at those frequencies, which reduces lag and increases stability margins. In a similar manner within embodiments implementing a torque assistance function, the torque assistance commands can be filtered to minimize the oscillations resulting from coupling between the operator modes and the master modes.

Applying the master/slave relationship filtering function may induce delays at frequencies lower than the structural mode being targeted, resulting in temporary decreased performance over some of the performance envelope in order to maintain stability and achieve higher position accuracy.

Figure 10D:
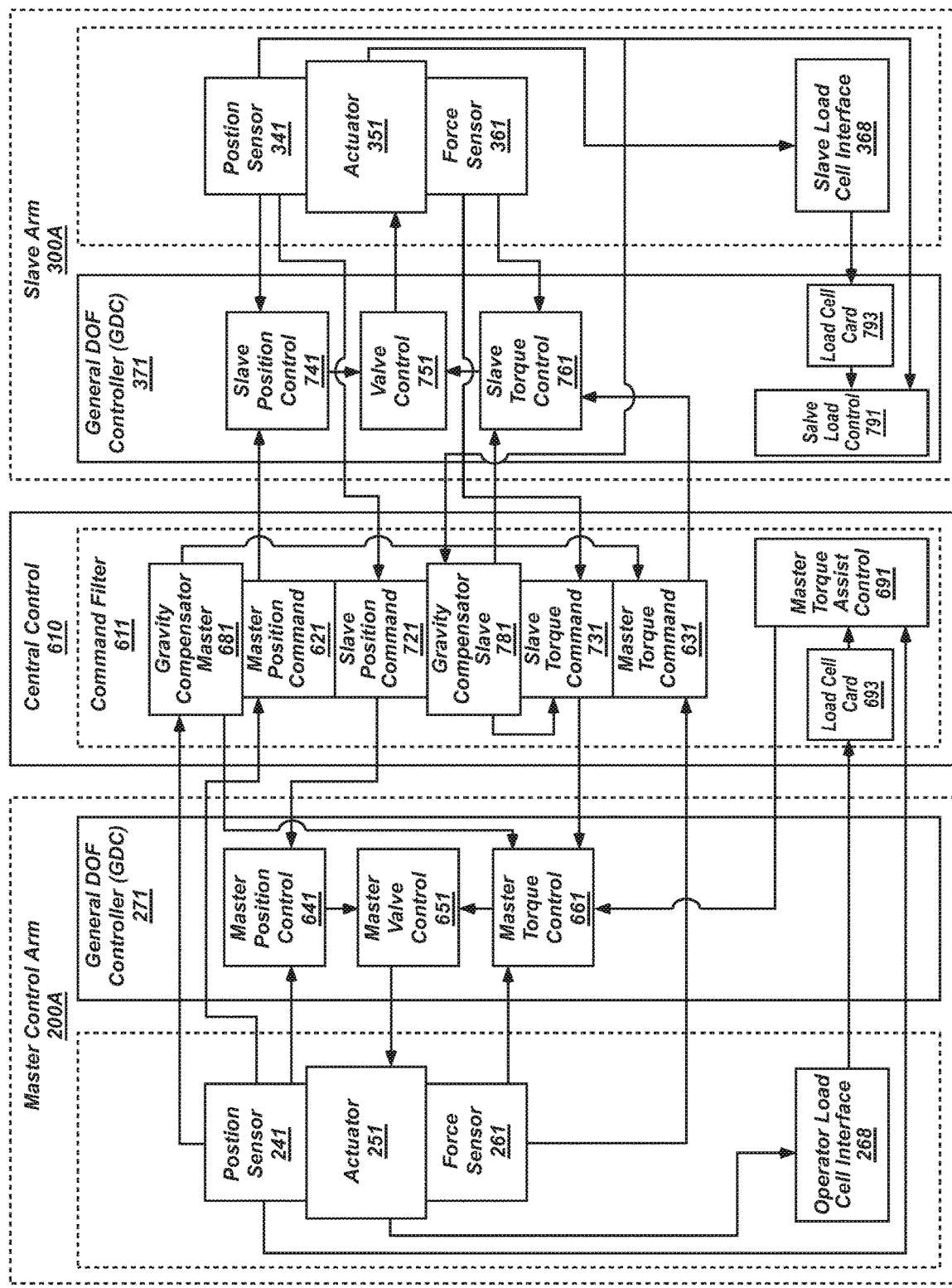
FIG. 10D is a schematic diagram of still another aspect of the control signal flow of FIG. 10A.

With reference to FIGS. 10A-10D, and particularly FIG. 10D, when gravity compensation is used, a gravity compensator 681 for the master control arm and a gravity compensator 781 for the slave arm may be used. The gravity compensator 681 for the master control arm can use an input from the master control arm position sensor 241 and a gravity sensor to calculate a gravity vector and determine each support member's position. The position of the support member can be used to determine the member's center of gravity. The mass of the support member, the center of gravity, and the position of the support member can be used to calculate the torque for the joints of the support member in the master control arm caused by the effect of gravity in the direction of the measured gravity vector and generate a signal at the gravity compensator 681 to send to the master torque command 631 that can be utilized by the master torque control 661 to provide an opposite torque value to the actuator 251 associated with the joint 231 to offset the effect of gravity at the joint. Similarly, the effect of gravity on each of the remaining joints 232-237 can be determined and offset.

The gravity compensator 781 for the slave arm can use an input from the slave arm position sensor 341 and a gravity sensor to calculate a gravity vector and determine the position of support member 311. The position of the support member can be used to determine the member's center of gravity. The mass of the support member, the center of gravity, and the position of the support member can be used to calculate the torque for the joint 331 of the support member in the slave arm caused by the effect of gravity in the direction of the measured gravity vector. The gravity compensator 781 can output a signal to send to the slave torque command 731 that can be utilized by the slave torque control 761 to provide an opposite torque value to the actuator 351 associated with the joint 331 to offset the effect of gravity at the joint. Similarly, the effect of gravity on each of the remaining joints 332-337 can be determined and offset to compensate for the effects of gravity on the slave arm.

In one aspect, a payload supported by the slave arm, such as payload coupled to the end effector 390, can be gravity compensated so that the user does not feel the weight of the payload while operating the master control arm. Payload gravity compensation can utilize load sensor 368 coupled to the end effector and the slave arm to determine the weight of the payload to be compensated.

A master torque assist control 691 can provide an additional input to the master torque control 661. At least one user load cell interface 268 on the master control arm 200A can be in contact with a user's arm. The load cell can be configured to output a signal to a load cell card 693 related to a movement of the user's arm. The load cell card 693 can transmit the signal to the master torque assist control 691. Additional torque can be communicated to the actuators 251-257 for the joints 231-237 in the master control arm to cause the master control arm to move to assist the user in moving the master control arm 200A.

A payload coupled to the end effector 390 can be stabilized by utilizing load sensor 368, which is associated with the end effector at the end of the slave arm. Load sensor 368 can measure forces and moments produced by a payload and acting on load sensor 368. Using slave load control 791, payload stabilization can be applied to several different payload scenarios including a swinging payload, a rigid payload coupled to a pair of magnetic end effectors in a "two-handed" lift, and a fragile payload or operating environment.

In the case of a swinging payload, it is desirable to reduce swinging quickly to minimize negative effects of an unstable payload. Based on the measured information from the load sensor 368, torque is applied at the slave arm DOF to minimize force components exerted by the payload that are perpendicular to gravity. This has the effect of moving the end effector so that the payload center of gravity is below the end effector. The swinging of the payload is taken up and eliminated quickly by the countering movements of the slave arm.

In the case of a rigid payload coupled to a pair of end effectors (e.g., magnetic) in a "two-handed" lift, it is possible for the operator controlled slave arms to fight one another such that one or both of the magnetic end effectors twist away from the rigid payload. This twisting can reduce the magnetic hold on the payload potentially resulting in a drop of the payload. With payload stabilization, load sensor 368 detects the forces and moments threatening to twist the end effector relative to the payload. Upon detection, the slave arms are caused to move to relieve or minimize forces and moments threatening to twist the magnetic end effectors from the payload. In one aspect, the load at the end of the slave arm can be limited to a predetermined value and the slave arms can move to maintain the applied load at or below the predetermined value.

In the case of a fragile payload or operating environment, it may be desirable to limit the amount of force the end effector can apply to a payload or other object, as detected by the load sensor 368. With payload stabilization, the slave arm can reduce or eliminate forces and moments when they exceed a predetermined value to maintain forces and moments at or below the predetermined value.

Similarly, slave load control 791 can provide an additional input to the slave torque control 761. The slave arm 300A can include at least one slave load cell interface 368. For example, a slave load cell interface 368 on the slave arm 300A can comprise components configured and designed be in contact with the user, and a load cell associated or otherwise operable with such components. For instance, the user may grasp a handle on the slave arm having a load cell associated therewith and apply a load in a selected direction. A slave load cell interface 368 can detect the applied load and the direction of the applied load, and transmit a signal to the slave load cell card 793. The load cell card 793 can transmit the signal to the slave load control 791. Additional torque can be communicated to the actuators 351-357 for the joints 331-337 in the slave arm to assist the user in moving the slave arm 300A in the direction of the applied load. In another aspect, the slave load cell interface 368 can comprise a load cell coupled to or otherwise operable with the end effector and the slave arm to measure loads exerted on the slave arm by the end effector and any payload supported by the end effector. In this case, the slave load control 791 can be used to apply payload stabilization, payload gravity compensation, or other system feature that utilizes loads from the load cell interface 368.

The teleoperated robotic device may further comprise a "tap response" function that is configured to provide enhanced force feedback to the operator through the master control arm when the slave arm contacts an object to enable the operator to sense more accurately the point at which the slave arm makes contact with an object. Tap response can vary with the amplitude of the slave load derivative, for example, the rate of change of torque as sensed by a load sensor, thus giving the operator a sense of the magnitude of the impact event at the slave arm with a "tap" to simulate touch. The slave load derivative response may be too short in duration for a person to sense and/or exceed the ability of the system to accurately reproduce for the operator. Therefore, the slave load derivative can be passed through a filter, such as a gained two-pole, two-zero filter to convert the slave load derivative to a slower response that a person can feel and that the system can reproduce. The filter output can be applied as a torque command to the master control arm DOF, where it is sensed by the user. This feature can enhance the accuracy of the "feel" at the master control arm of resistance encountered by the slave arm and can help the operator better recognize that the slave arm has made contact with an object. In one aspect, tap response can be applied to any of the degrees of freedom of the master control arm. In a specific aspect, tap response is applied only to the wrist degrees of freedom of the master control arm.

Figure 11:
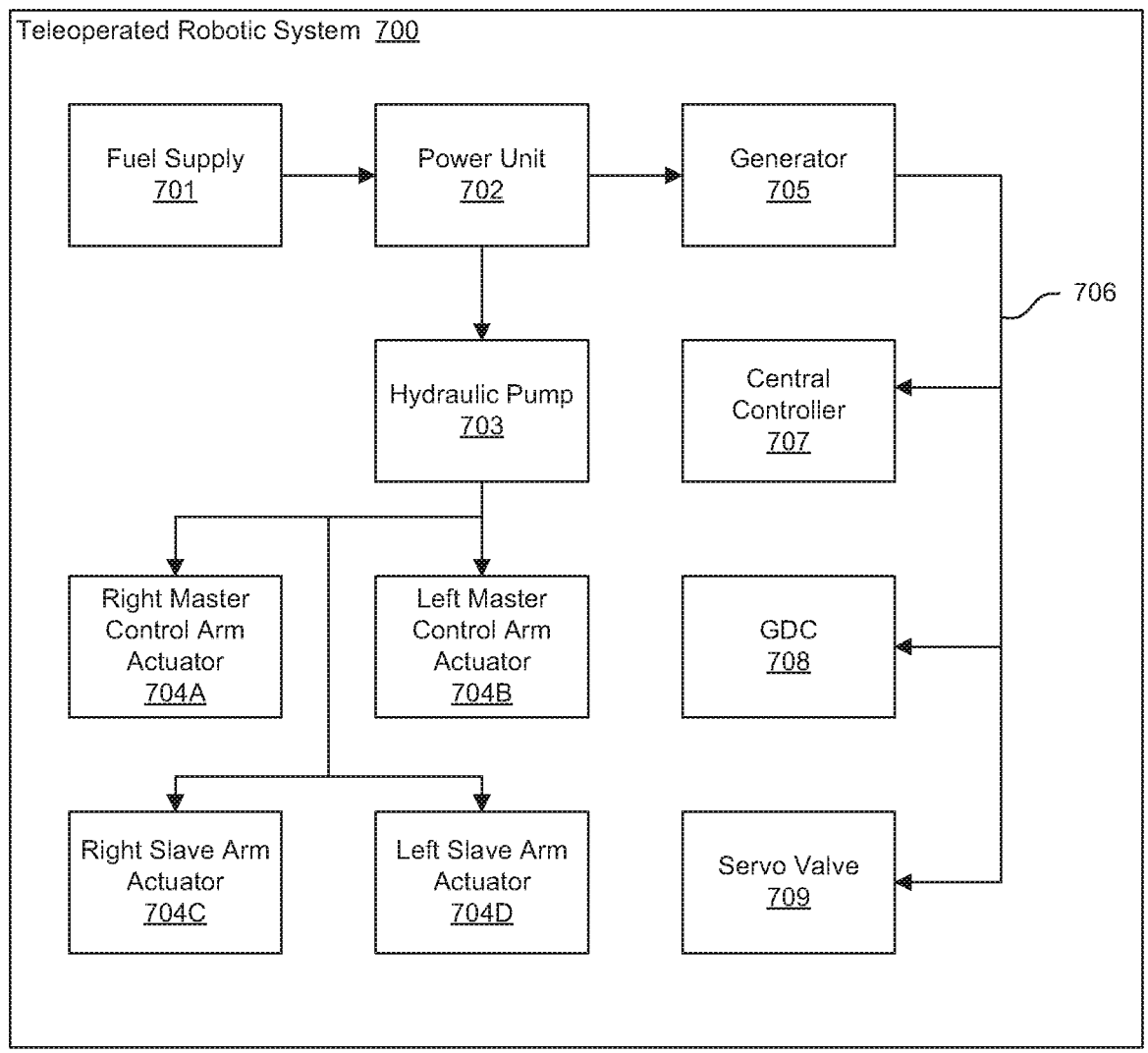
FIG. 11 is a schematic diagram of a power system in accordance with an example of the present disclosure.

The teleoperated robotic system can include a power source to power the master control arms, slave arms, and any subsystems used to operate the arms. For example, as illustrated in the schematic power system diagram of FIG. 11, a teleoperated robotic system 700 can include a power unit 702 and a fuel supply 701 for the power unit. In one aspect, the fuel supply 701 can include fossil fuels and the power unit 702 can be an internal combustion engine. In this case, the power unit 702 can power an electric generator 705, which can provide power, via an electric bus 706, for a central controller 707, the GDCs 708 of the master control arm and the slave arm, and the servo valves 709 of the master control arm and the slave arm.

The power unit 703 can also power a hydraulic pump 703 for the actuators of the right master control arm 704A, the left master control arm 704B, the right slave arm 704C, and the left slave arm 704D. In one aspect, the hydraulic pump can be powered by electricity received from the generator 705. In certain aspects, the power unit 702 can also power subsystems that may be included in a teleoperated robotic system of the present disclosure, such as mobility features for a mobile platform, electrical systems such as lighting, cameras, microphones, etc. The power unit may be commonly supported about the mobile platform along with the master control and slave arms.

Optionally, an energy storage device, such as a battery, can be configured to deliver electrical power to the electric bus 706 and/or the hydraulic pump 703. The energy storage device can serve as a primary power source or as a back-up power source.

In one embodiment, a teleoperated robotic system can be located at a fixed position, such as on a static or fixed platform. The platform can support various components of the teleoperated robotic system, such as a slave arm and a master control arm. In a particular aspect, the platform can support a power source, a pump, a generator, a fuel supply, and a central controller, alone or in any combination.

In another aspect, the platform can be a mobile platform. In a particular aspect, the mobile platform can support, about a base or other foundational structure, a power source, a pump, a generator, a fuel supply, and a central controller in addition to a master control arm and a slave arm. Thus, a teleoperated robotic system in accordance with the present disclosure can be a mobile, self-contained system capable of also supporting a user to operate the system, and providing what may be termed as mobile teleoperation.

Figure 12:
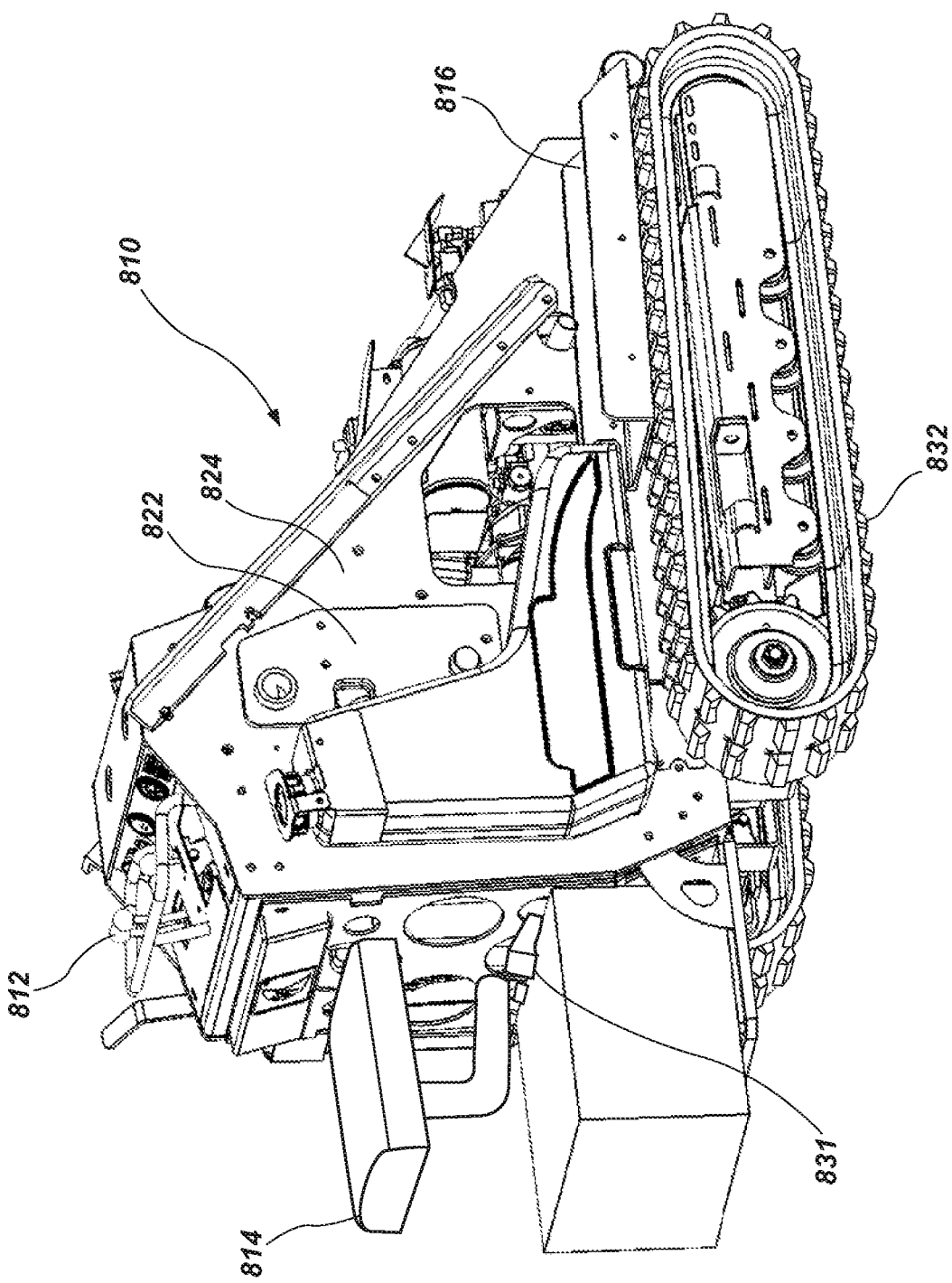
FIG. 12 is a perspective view of a mobile platform in accordance with an example of the present disclosure.
Figure 13:
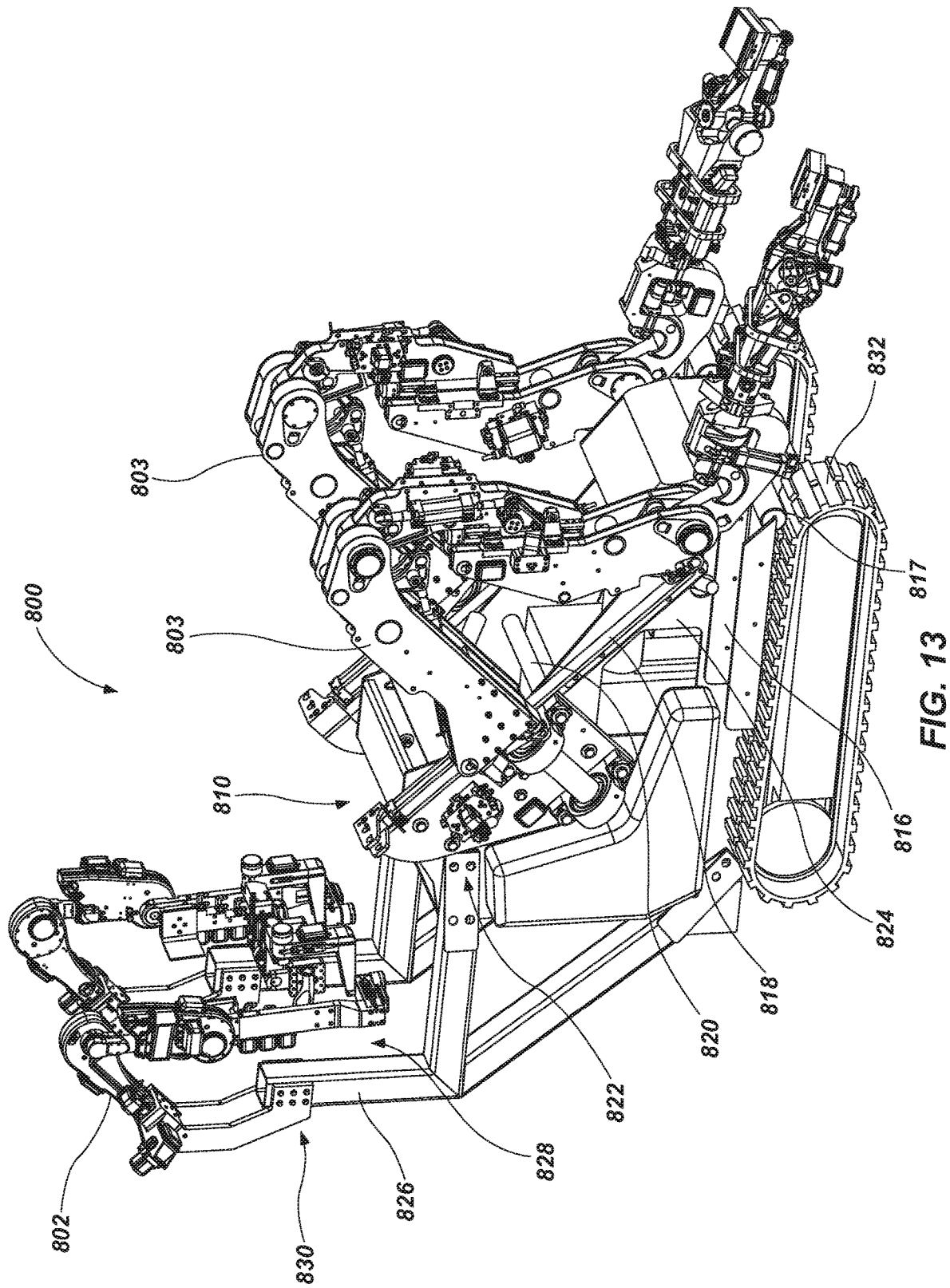
FIG. 13 mobile platform is a perspective view of the mobile platform of FIG. 12 having master control arms and slave arms coupled thereto in accordance with an example of the present disclosure.

Illustrated in FIGS. 12 and 13 is a mobile platform 810 according to one exemplary embodiment of the present disclosure. As shown, the mobile platform 810 provides common support for the master control arms, the slave arms, and all other necessary components for the operation of these (e.g., power source, pumps, controls, control systems, user interface devices, etc.). The platform 810 comprises a base having an area designed to receive and support the various components of the robotic device, various drive systems to provide and facilitate locomotion and steering of the mobile platform, as well as support for a user, wherein the user may control one or more of the various components of the teleoperated robotic system 800 such as the master control arms, slave arms, end effectors, mobility of the platform, and so forth. Shown in FIG. 12, the platform 810 can include a control panel 812 and, optionally, a seat 814. Indeed, the mobile platform 810 may be configured to comprise or support all of the necessary elements, components, systems and/or subsystems to make up a fully or self-contained system that can be operated by the user and moved from location to location as desired.

In one example, the seat 814 can be a foldable seat configuration, thereby enabling a user the choice of standing or sitting down while operating the teleoperated robotic system 800. In one non-limiting example, the seat 814 includes one or more foldable support members that can extend into an upright position and retract together providing space for a standing position. Optionally, the seat can be fixed in place or the seat can swivel and/or be height adjustable to provide the user with various seating positions.

Shown in FIGS. 12 and 13, the platform can include a slave arm receiving channel 816 configured to receive a portion of a slave arm in a nested position or arrangement, such as a portion of slave arm 803. In at least one aspect, the slave arm receiving channel 816 can assist to receive at least a portion of the slave arm 803 when the slave arms are not in operation. When not in use, the slave arms 803 can fold inward toward the platform 810 in a stowed configuration, thereby configuring the teleoperated robotic system 800 into a compact and readily transportable system. The slave arm receiving channel 816 can additionally function to prevent the platform's wheels or tracks from coming into contact with the slave arms 803. Cushion 817 can be included to provide a relatively soft interface, such as rubber, dense foam, or plastic, to protect the slave arm from damaging contact. Cushion 817 can be incorporated with or separate from the receiving channel 816. In short, the teleoperated robotic device of the present invention may comprise an operational mode and a storage mode where the slave arms, and optionally the master control arms, can be positioned for storage by folding or collapsing the various structural members about themselves. In the stowed position, the slave arms may be at least partially folded into the arm receiving channel 816 to place the teleoperated robotic device into a compact configuration.

Shown in FIG. 13, the platform 810 includes one or more slave arm support systems 818, 820 configured to support the weight of the one or more slave arms 803 and any load the slave arms may carry. The support systems 818 and 820 are shown as comprising support members supported about the platform, that couple to the base (e.g., see base 310 of FIGS. 7A and 7B) of the slave arms, respectively, to provide support to the slave arms about the platform 810. A pair of first support members of the support system 818 can extend parallel to each other along a length of the platform 810 substantially adjacent to an attachment point 822 for the arm slaves 803. A second support member of the support system 820 can extend crosswise between the pair of first support members (e.g., substantially orthogonal to the pair of first support members). In at least one aspect, the second support member functions to support the slave arm attachment points 822 and platform 810. It is contemplated that the first and second support members can include any type of material capable of supporting a heavy load, such as steel, carbon fiber, titanium, steel and/or titanium alloys, and so forth.

As previously discussed and shown in FIG. 13, the platform 810 includes one or more slave arm attachment points 822. The one or more slave arm attachment points 822 can be disposed on the platform 810 at opposing sides of the length of the platform 810 and can be coupled to or otherwise located at walls 824. It is contemplated that the slave arms 803 are coupled to the walls 824 with coupling devices or systems that are able to withstand and support heavy tensions and loads, such as but not limited to, industrial grade fasteners of material such as steel, nickel and so forth, or by welding.

Also shown in FIG. 13, the platform 810 also includes one or more master control arm support systems 826. The one or more master control arm support systems 826 comprise a plurality of support members that extend from the base of the platform, and that are configured to couple and support the master control arms 802, as well as to position these in a location suitable for operation by the user. In the embodiment shown, the master control arm support members are configured to position the master control arms above the platform and adjacent the user operating area so as to enable the user to operate the master control arms from the desired position. The support system 826 serves as points of attachment for the master control arms 802 and to further function to support the weight of the master control arms 802. It is contemplated that the master control arm support system 826 can include any type of material capable of supporting a heavy load such as steel, titanium, nickel and/or alloys of such, carbon fiber, and so forth.

FIG. 13 shows an example configuration and attachment of the master control arms 802. As shown and previously discussed, the master control arms 802 are attached at an end of the platform 810 and are configured to be suitably positioned so as to enable operation by a user who is positioned in an operating area on the platform 810. In the exemplary embodiment shown, the master control arm support system 826 is coupled to and extends upward and outward away from the platform 810. The support members of the master control arm support system 826, support the master control arms 802 at the attachment points 830, which master control arms then arc back partially over the platform 810, and then extend downward toward the platform 810. The master control support system 826, the master control arms 802 and the master control attachments points 830 create and define a user operating cavity 828 adjacent and corresponding to the operating area of the platform. It is contemplated that the master control arms 802 are coupled to the master control arm support systems 826 (and the support systems 826 to the platform 810) with coupling fasteners or devices that are able to withstand and support the loads at this location, such as but not limited to industrial grade bolts, rivets, and so forth of a suitable material, such as steel and so forth.

Illustrated in FIG. 13, the one or more master control arm support systems 826 and the master control arms 802 are coupled to a platform end at a distance from the slave arms 803 to allow for a user to be placed out of the way of the slave arms 803, or outside the zone of operation, thereby increasing the safety to the user. Additionally, such positioning of the master control arms (and thus the user) may function to assist in counterbalancing the slave arms and any load being lifted by the slave arms.

Figure 14:
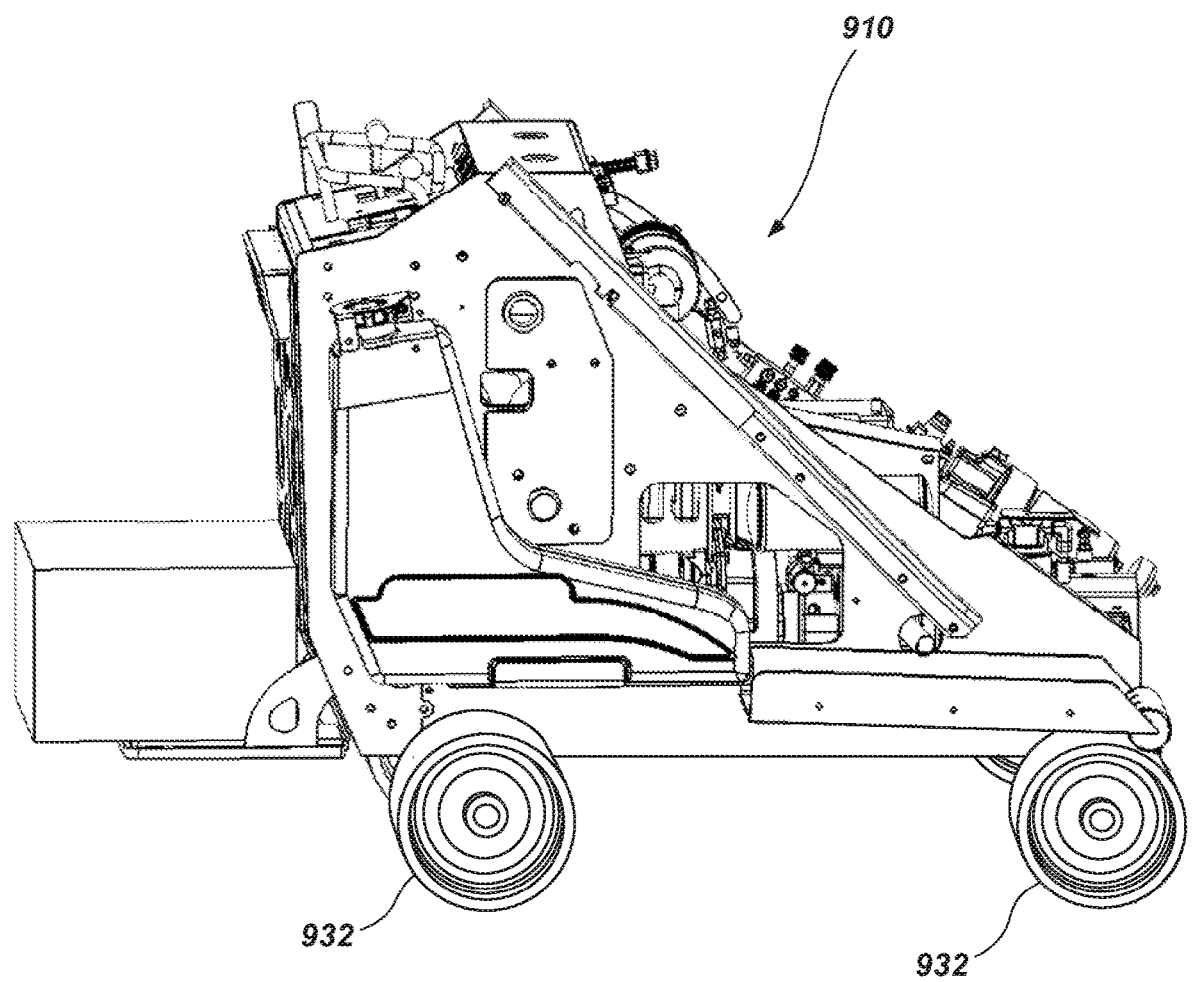
FIG. 14 is a perspective view of a mobile platform, in accordance with another example of the present disclosure.

Shown in FIGS. 12, 13, and 14, the platform 810, as indicated herein, can be a mobile platform. As such, it is contemplated that the platform can include a variety of types of drive systems with corresponding drive elements, such as, but not limited to, wheels, tracks, rails, or other mobility features that facilitate locomotion of the mobile platform and the robotic system from one location to another. The mobility features can also provide a stable interface with a supporting surface when the robotic system is stationary or in transit. Thus, the type of mobility features employed can be selected based on the support surface of the operating environment.

Illustrated in FIG. 12, the mobility features of the platform 810 can be controlled from the platform 810 via a control module or system comprising platform control elements, such as a control panel 812 having hand controls and/or one or more foot pedals 831. In one example, the foot pedals 830 may control any number of or all of the mobility control features of the platform, such as but not limited to, forward motion, backward motion, lateral motion, steering, and so forth of the platform 810. In at least one aspect, being able to control the mobility of the platform 810 from the foot pedals 831 may advantageously obviate the need for the user to remove the user's arms from the master control arm 802 in order to move the platform 810 to a different location. As such, a user may pick up an object and manipulate the object with the slave arms 803 while at the same time moving and/or maneuvering the platform 810 to a desired location. In one exemplary embodiment, illustrated in FIGS. 12 and 13, the platform 810 includes a mobile track system 832 suitable for use in an operating environment with a supporting surface comprising earth, such as soil, sand, rock, etc.

In another exemplary embodiment, shown in FIGS. 14 and 15A through 15D, the platform 910 can include a drive system comprising drive elements in the form of wheels 932 that at least partially enable the platform's mobility, and that facilitate locomotion and steering of the mobile platform. For example, the wheels might be used in an operating environment with a supporting surface comprising a hard, relatively smooth surface, such as asphalt, concrete, wood, steel, etc.

FIG. 15A through 15D is a plan view of the bottom of the platform 910, illustrating an omni-directional system 950 of mobility of the platform 910 that facilitates a high degree of agility in operation of the teleoperated robotic device, and particularly the mobile platform, over more limited wheel and steering systems (e.g., one set of steering wheels and one set of non-steering wheels). The omni-directional system 950 may provide the platform 910 with the ability to move in multiple directions, angles, turns, etc. In other words, the omni-directional system 950 provides a user with multiple DOF to manipulate and move the platform in a workspace environment. In one exemplary embodiment, the omni-directional system 950, and particularly each wheel 932, can be configured to be capable of directional orientation or rotation independent of the directional orientation of each of the other wheels 932. In other words, each of the wheels can be configured to rotate relative to the platform independent of one another, such that each is capable of independent rotation or steering. In the same or an additional embodiment, the wheels 932 may be configured to rotate together in unison to a uniform directional angle or turning point. In one aspect, the omni-directional system 950 can be coordinated manually by the user. In another aspect, it is contemplated that the omni-directional system 950 can be automatically controlled and have one or more user selectable modes of operation, as describe in more detail below.

Figure 15A:
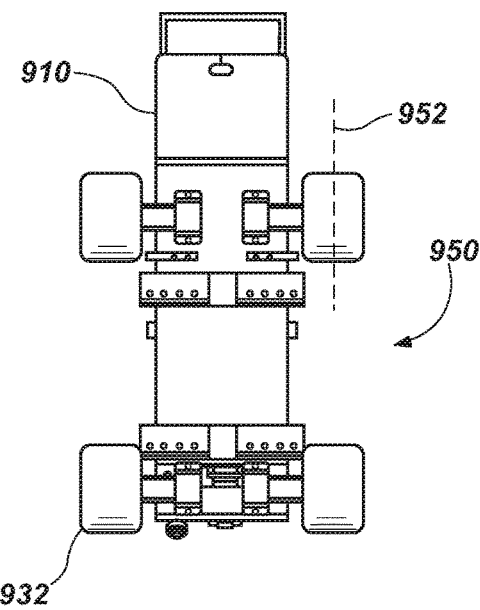
FIG. 15A illustrates omni-directional wheels steering control of the mobile platform of FIG. 14, in accordance with an example of the present disclosure.
Figure 15B:
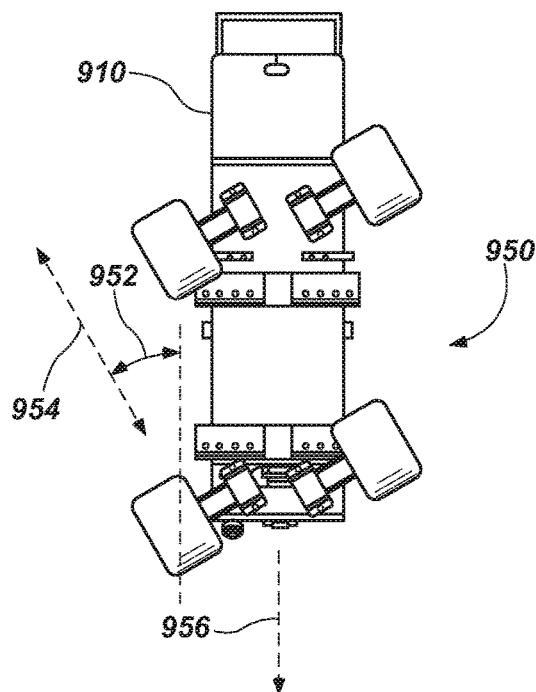
FIG. 15B illustrates omni-directional wheels steering control of the mobile platform of FIG. 14, in accordance with another example of the present disclosure.
Figure 15C:
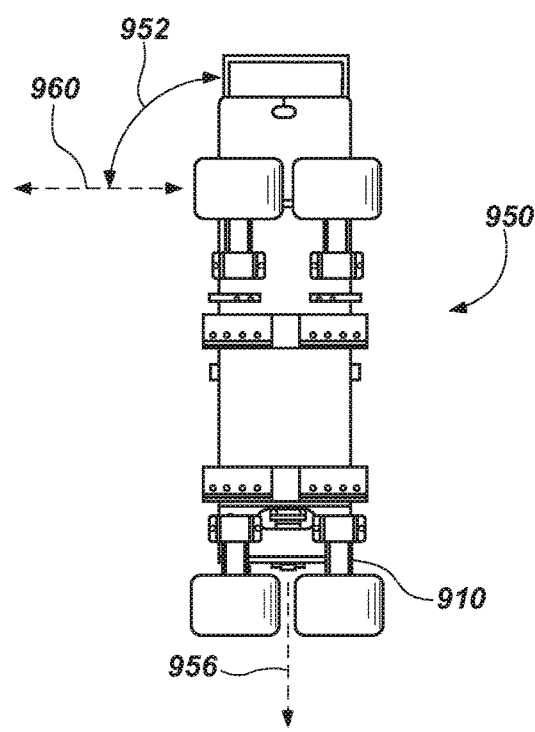
FIG. 15C illustrates omni-directional wheels steering control of the mobile platform of FIG. 14, in accordance with yet another example of the present disclosure.

In one example, illustrated in FIGS. 15A and 15B, the omni-directional system 950 can cause the wheels 932 to rotate to a position where all the wheels 932 have the same directional angle 952. In a non-limiting example shown in FIG. 15B, each of the wheels 932 is directed at the same angle 952, approximately 45 degrees relative to the forward angle shown in FIG. 15A. Similarly, in FIG. 15C, each wheel 932 is directed at the same angle 952, approximately ninety degrees relative to the forward angle 952 shown in FIG. 15A. Having the wheels 932 rotatable to a position where all the wheels 932 have the same directional angle enables all the wheels to move in a uniform direction 954, and therefore the mobile platform. Advantageously, the uniform directional motion of all the wheels enables the view angle/direction 956 of a user to remain constant even while the platform 910 is in motion. For example, in FIG. 15B, upon motion of the wheels 932 in a generally forward or backward direction 954, the view angle 956 of the user remains constant. Similarly, in FIG. 15C, the uniform approximate 90 degree directional angle 952 of the wheels 932 enables the view angle 956 of the user to remain constant while still providing for lateral motion 960 of the mobile platform 910.

Figure 15D:
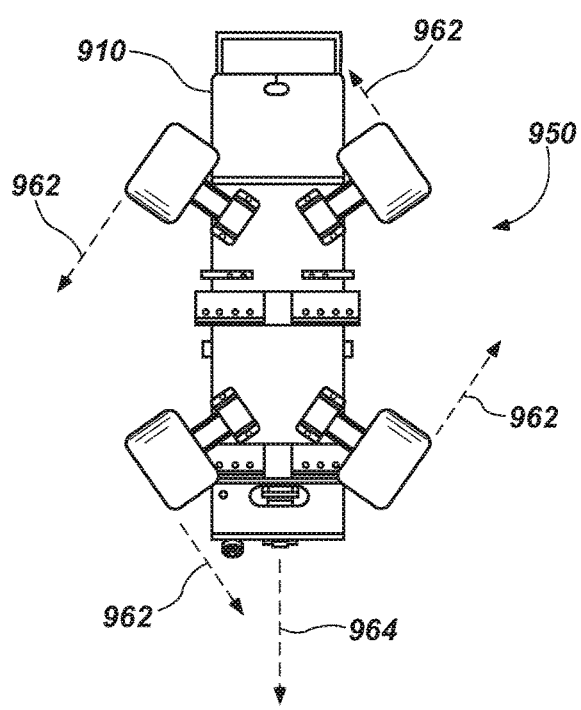
FIG. 15D illustrates omni-directional wheels steering control of the mobile platform of FIG. 14, in accordance with still another example of the present disclosure.

In another example, illustrated in FIG. 15D, the omnidirectional system 950 can enable the wheels 932 to rotate to positions where all the wheels 932 have opposing angles at approximately 90 degrees to one another. Accordingly, as illustrated conceptually in FIG. 15D, when the platform 910 is in motion, the platform stays in same location while the view angle 964 of the user can rotate from zero degrees up to 360 degrees as the platform 910 rotates due to movement or driving of the individual wheels in direction 962. In one aspect, enabling rotation of the platform 910 enables a user to quickly and efficiently rotate the platform 910 from one location to another in a compact workspace. Unlike the operation of typical fixed, rotatable platforms such as cranes and the like, the illustrated platform 910 as described herein, can allow the user to quickly and easily and with agility move the platform to another location in the workspace as desired.

Figure 15E:
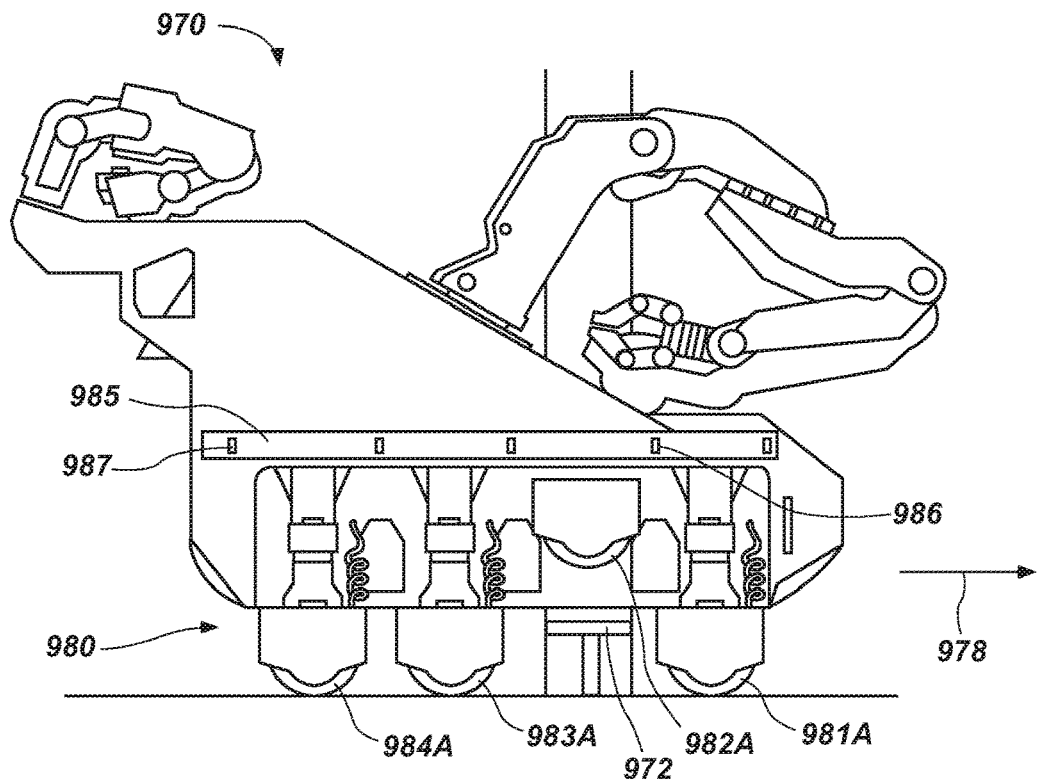
FIG. 15E illustrates a side view of a mobility system to enable a teleoperated robotic system to overcome an obstacle, in accordance with an example of the present disclosure.
Figure 15F:
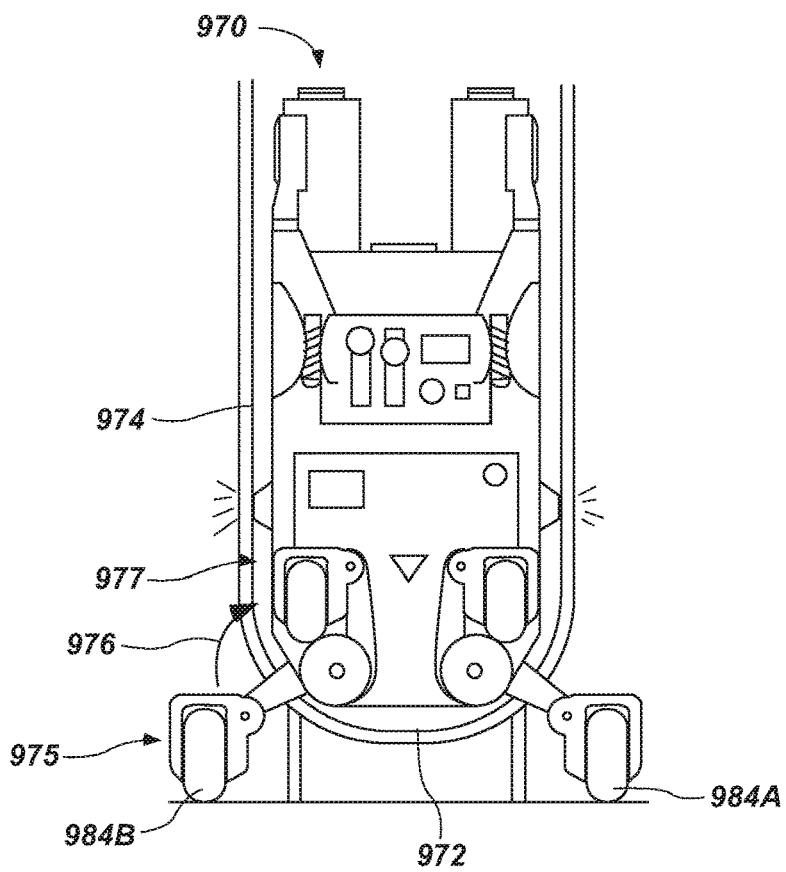
FIG. 15F illustrates a rear view of the mobility system of FIG. 15E.

Referring to FIGS. 15E and 15F, illustrated is a mobile platform having a different configuration and function. In this exemplary embodiment, the mobile platform can comprise a mobility system 980 that can enable a teleoperated robotic system 970 to pass over an obstacle 972 and/or through a narrow passageway 974. Some operating environments, such as on a ship, may include doors or passageways that the robotic system 970 may need to pass through. Some doors or passageways may have a raised portion 972 that would prevent simply "rolling" through the door or passageway. Additionally, some doors or passageways may be narrower than a width of the mobility system, for example with wheels in a normal operating position in contact with the ground, which could prevent passage of the robotic system through the door or passageway.

To overcome such obstacles, the mobility system 980 can include a plurality of wheels disposed substantially in-line with a direction of travel of the robotic system 970. For example, wheels 981A-984A, can be disposed on a bottom of the robotic system 970 from a front to a back of the robotic system. The mobility system 980 can also include a sensor bar 985 having at least one sensor 986, 987. Sensors can include a variety of types as will be recognized by those skilled in the art. A sensor can be configured to sense an obstacle in the vicinity of a wheel. In response, the wheel can be configured to move upward and/or inward to avoid the obstacle. For example, as the robotic system 970 moves in direction 978 to proceed through a passageway having obstacles 972, 974, the sensor 986 can sense the raised obstacle 972 and the narrow passageway 974. In response to this information, wheel 982A can be raised and/or retracted in a timely manner to allow clearance for the wheel to move past the obstacles as the robotic system moves forward. In one aspect, sensors may be associated with each wheel. In another aspect, a sensor can be associated with the leading wheel, and all subsequent trailing wheels can be caused to raise/retract based on the position and speed of the vehicle. As shown in FIG. 15E, the front wheel 981A has already passed the obstacles in this manner and has been lowered/extended back to a normal operating position and wheel 982A is in the process of overcoming the obstacles. Wheel 983A is the next wheel in sequence to raise/retract in order to move past the obstacles.

FIG. 15F is a rear view of the robotic system 970 and illustrates a movement of a wheel 984B to raise/retract in order to provide clearance for the wheel to move past the obstacles 972, 974. For example, the wheel 984B can be in an extended position 975 for normal operation. When the sensor 987 senses an obstacle, the wheel 984B can move in direction 976 to a retracted position 977. Once past the obstacle, the wheel 984B can move back to the extended position 975. The mechanism for raising/retracting the wheel is shown as comprising a powered linkage arm coupled to the wheel that pivots upon being actuated. In an alternative embodiment, the linkage arm could be configured to linearly retract rather than pivot. It should be recognized that any number of wheels in any combination can be in the retracted position at any given time as long as the wheels in the extended position are sufficient to maintain stability of the robotic system. Additionally, when multiple sensors are employed, data from two or more sensors can be used to determine whether a given wheel should be in the extended or retracted positions and/or to coordinate the positions of multiple wheels.

Figure 16:
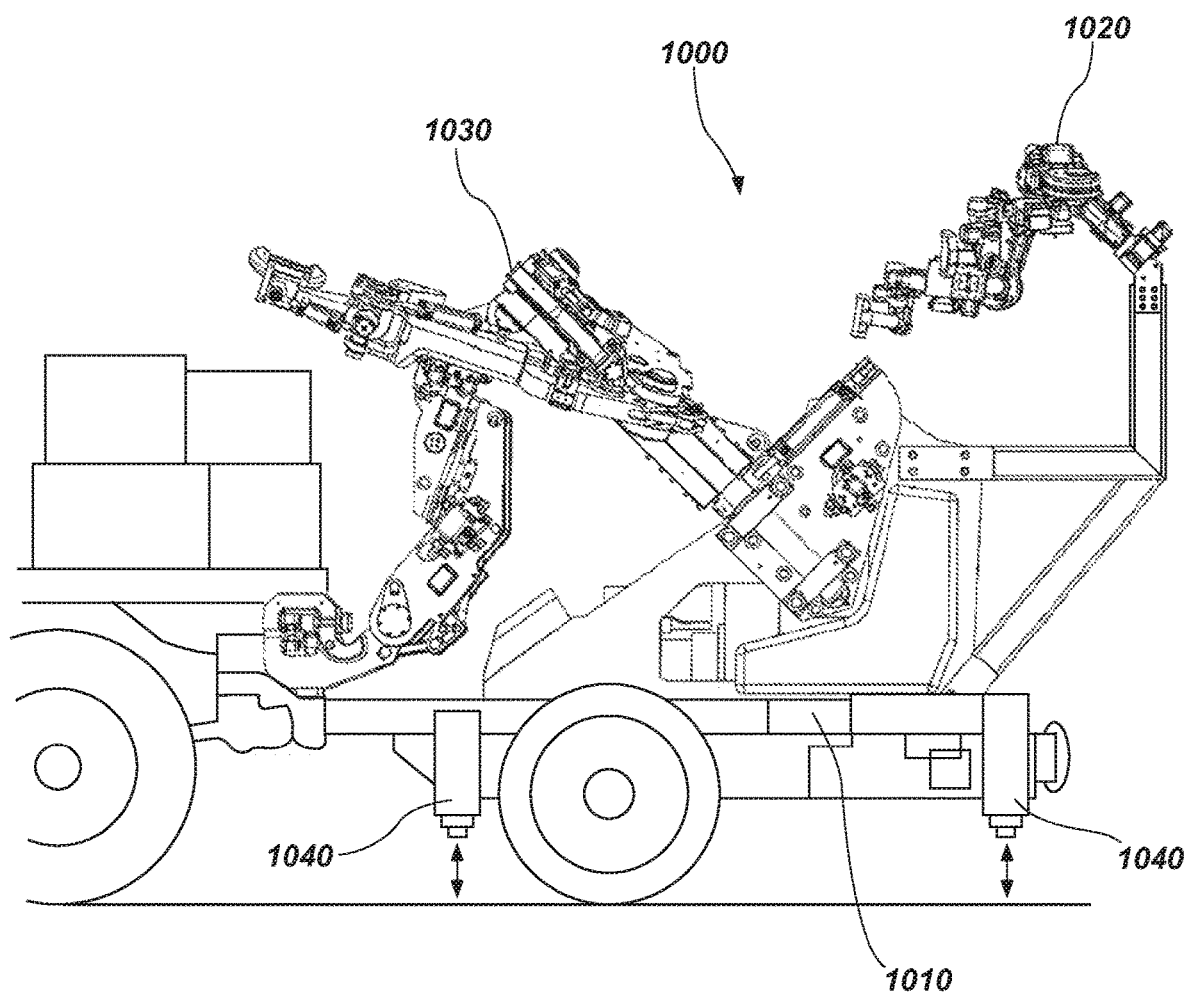
FIG. 16 is a side view of a mobile platform, in accordance with an additional example of the present disclosure.

In yet another example, shown in FIG. 16, a teleoperated robotic system 1000 as described herein may include a trailer platform 1010 having one or more master control arms 1020 communicatively linked to one or more slave arms 1030, as described herein. At least in one aspect, the trailer platform teleoperated robotic system 1000 is advantageous as the system 1000 can be pulled behind a trailering vehicles, such as those carrying large and/or heavy loads. Once arriving at a destination, the large and/or heavy loads can be unloaded more quickly and easily using the robotic system that is supported about the trailer platform 1010. The trailer platform 1010 can include stabilizers 1040 to provide stabilizing support for the trailer platform when detached from the vehicle. The stabilizers can be lowered into contact with a ground surface and can extend different lengths, if necessary, in order to level the trailer platform. The stabilizers 1040 can telescope to extend to the ground surface and can be extended under machine or human power and can utilize gears or hydraulics.

Figure 17A:
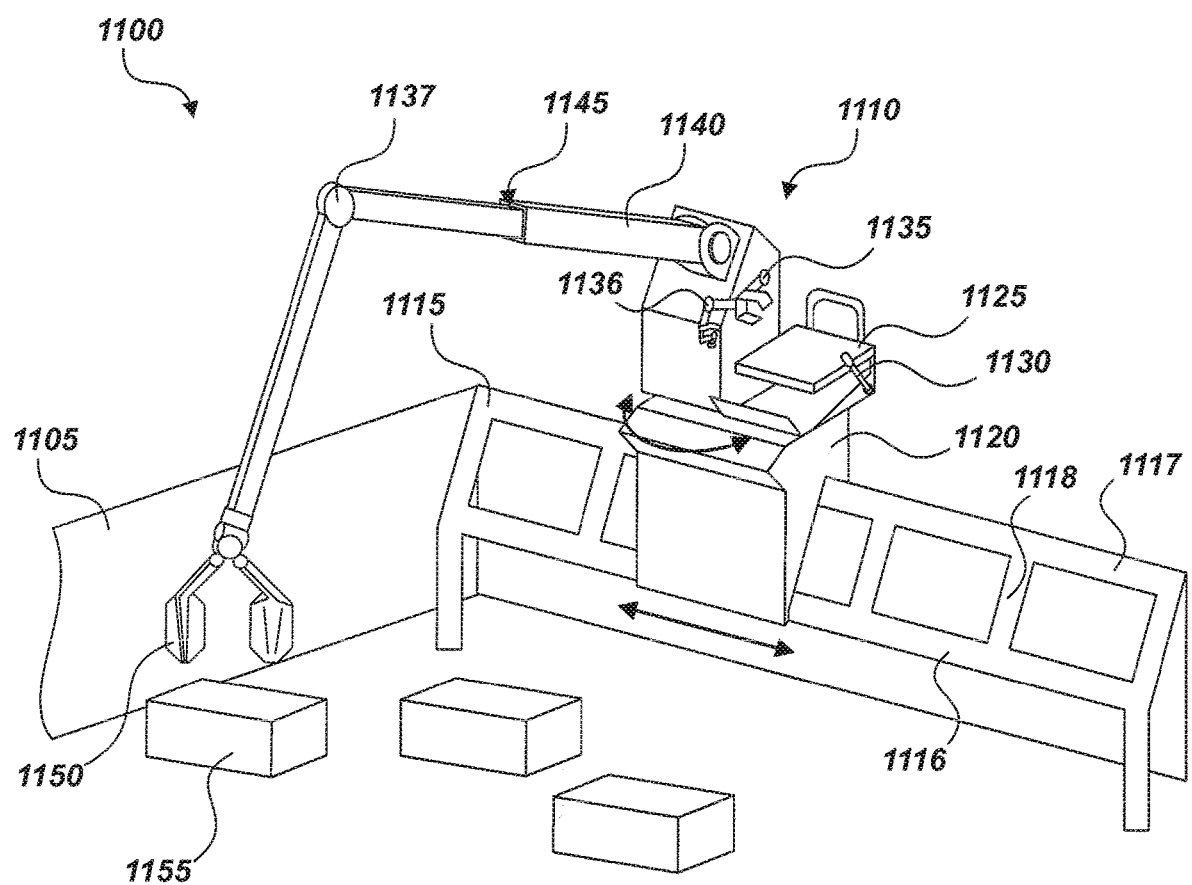
FIG. 17A is a perspective view of a teleoperated robotic system having a primary platform and a secondary platform, in accordance with an example of the present disclosure.
Figure 17B:
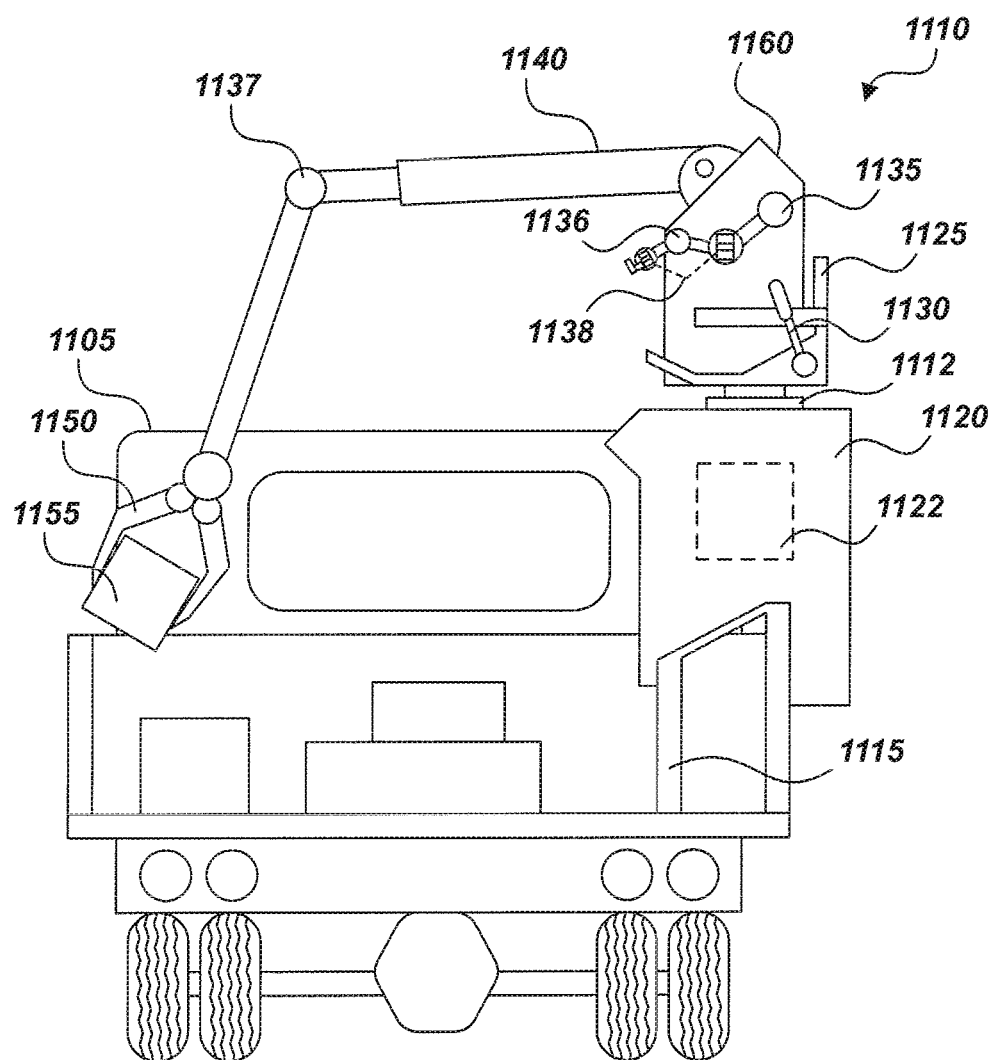
FIG. 17B is a side view of the teleoperated robotic system of FIG. 17A.

Referring to FIGS. 17A-17B, another exemplary teleoperated robotic system 1100 is shown, which includes a master control arm 1135 and a slave arm 1140 coupled to a primary platform 1105. FIG. 17A illustrates a perspective view of the system and FIG. 17B illustrates a side view of the system. In this example, the primary platform comprises a vehicle type mobile platform, such as a truck. Other types of vehicles or mobile platforms may also be used in accordance with aspects of this example. The system in this example also includes a secondary platform 1110. The secondary platform is moveable with respect to the primary platform and the primary platform is moveable with respect to a surface supporting the primary platform, such as the ground.

The primary platform 1105 can include a or rail or rail system 1115 along which the secondary platform 1110 can move. The example shown in the figures includes a rail mounted within and along a side of a truck bed. The rail may comprise a straight rail, or it may also be curved and extend along any suitable length or in any desired direction along the primary platform. Alternatively, a plurality of rails 1116, 1117 can be used. The plurality of rails can be interconnected by a rail support member 1118 for providing additional strength and support between the plurality of rails. The rails can be made from any suitably strong material. Steel, iron, metal alloys, and the like are just a couple of example materials from which the rails may be formed.

The secondary platform 1110 can include a base 1120 which is slidable or otherwise movable along the rail(s) 1115. The base can include running wheels, gears, or other suitable devices for enabling movement of the base along the rail. The base can further include a power source 1122. The power source can supply power to a drive train for causing movement of the base along the rail. The power source can also supply power to the master control arm 1135, the slave arm 1140, and other controls available to a user. The power source may be a battery, a combustion engine, and so forth. In one aspect, the power source may be a shared power source shared with the primary platform 1105.

The base 1120 can support a seat 1125 for a user and an arm support member 1160. The seat and the arm support member can be coupled together and/or supported by a common support member. A fulcrum 1112 can rotatably support the seat and the arm support member. The fulcrum can provide a pivot point for side-to-side rotations. A user sitting on the seat can use a control lever 1130 or any suitable control mechanism to pivot the seat and arm support member upon the base. The user can further use the control lever to move the secondary platform along the rail to a desired position. For example, the control lever can be manipulated by pushing, pulling, twisting, etc., to separately and independently control rotation upon the fulcrum and movement along the rail. In one aspect, the rotation upon the fulcrum and the movement along the rail can provide at least two DOF of motion for the slave arm 1140. The slave arm can include any desired number of DOF. For example, the slave arm can include seven DOF within the slave arm itself, and the fulcrum and rail components can enable additional mobility or DOF to the slave arm. As another example, the slave arm can include five DOF within the slave arm itself and an additional two DOF can be provided by the fulcrum rotation and rail movement.

The arm support member 1160 can support the master control arm 1135 and the slave arm 1140. In one aspect, the master control arm can alternately be supported by the seat 1125. In one aspect, the master control arm and/or the slave arm can be kinematically equivalent to a human arm, as has been described above. In another aspect, the master control arm and/or slave arm can include fewer than seven DOF since the fulcrum 1112 and rail 1115 enable at least two degrees of freedom independent of master control or slave arm movements. The master control arm 1135 can include joints, sensors, actuators, and the like to manipulate the slave arm 1140, including joints, actuators, end effectors 1150, and so forth to perform various tasks, such as lifting a load 1155.

In one aspect, the master control arm can include at least one joint 1136 which bends in a direction different or opposite from a corresponding human joint. As shown in the figures, an elbow joint 1136 of the master control arm and an elbow joint 1137 of the slave arm can move/bend in a similar or corresponding position, which may be kinematically inconvenient to a user. However, due to the location of the secondary platform 1110 above the primary platform 1105, moving objects or loads may be difficult or uncomfortable to the user if kinematic equivalence is implemented. Thus, the master control arm elbow joint can be allowed to move in a substantially opposite direction of the user's elbow joint 1138 to enable convenient and comfortable operation of a downwardly rotated slave arm.

In one example, the slave arm 1140 can include a linear DOF, such as a telescoping arm, as indicated generally at 1145. Telescoping of the slave arm can be accomplished using controls on the master control arm 1135 or using the control lever 1130.

Figure 17C:
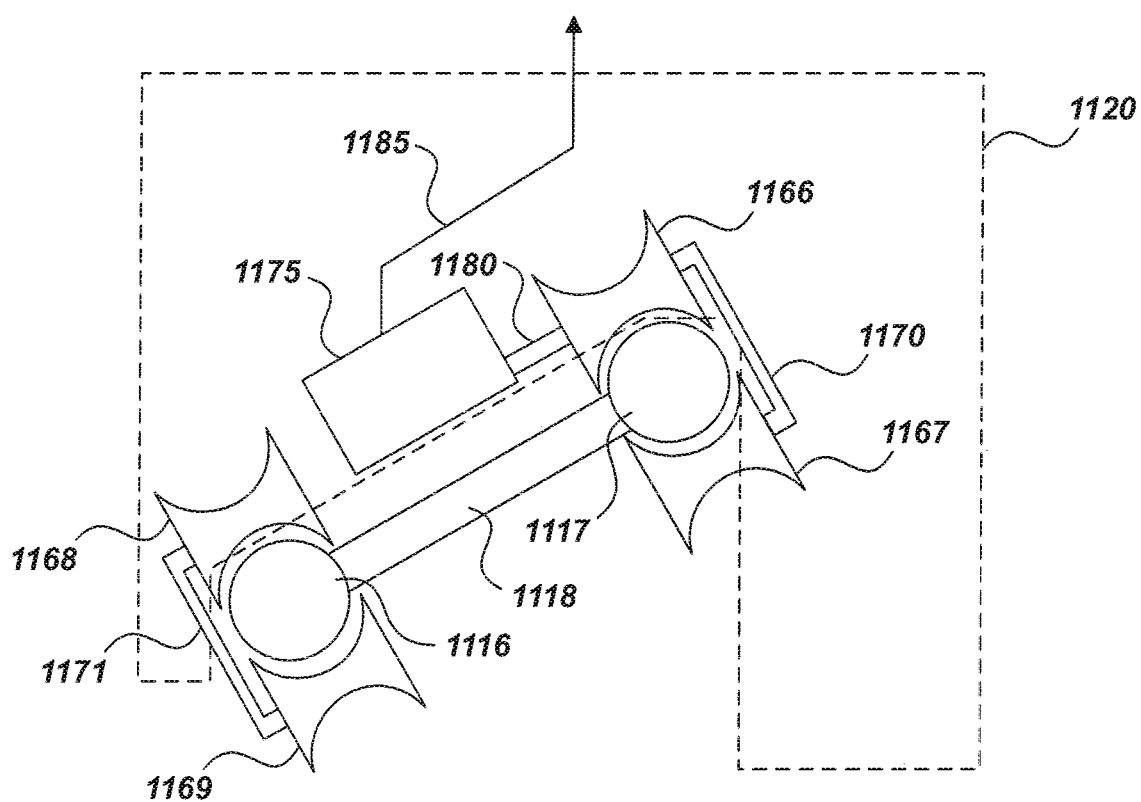
FIG. 17C is a cross-sectional side view of a portion of the teleoperated robotic system of FIG. 17A.

Referring now to FIG. 17C, a detail cross-sectional side view of a portion of the system 1100 is shown in accordance with an example. The base 1120 is shown slidably supported by rails 1116, 1117. A rail support member 1118 extends between the rails. The base is slidable along the rails using running wheels 1166, 1167, 1168, 1169. Running wheels 1166, 1167 can be coupled together by linkage 1170 and running wheels 1168 and 1169 can be coupled together by linkage 1171. The linkages can be attached to the base 1120. Providing upper 1166, 1168 and lower 1167, 1169 running wheels can enable rolling of the base along the rails and prevent the base from falling off of or otherwise becoming displaced from the rails. One or more of the running wheels can be coupled to a motor 1175 by a drive shaft 1180. Rotating the drive shaft in different directions can move the base along the rails from side to side in the direction of the drive shaft rotation. A control line 1185 can electrically connect the control lever to the motor to enable the user to control the motor.

In one aspect, the primary platform 1110 can be disposed at a fixed location. In another aspect, a base of the secondary platform can be fixedly disposed on the primary platform, such as on a truck, as opposed to being moveable relative to the primary platform.

In general, the master control arm and the slave arm can be in any location relative to one another. For example, referring again to FIG. 1, the master control arms are illustrated as being in a close proximity relationship with the slave arms. In this case, the master control arms are mounted behind the slave arms in a position that is out of the zone of operation of the slave arms. In one aspect, the master control arms can be located within the zone of operation of the slave arms. With the user located outside the zone of operation of the slave arms, however, the user is protected from unwanted contact with the slave arms. In a specific aspect, the master control arms can be detached from the platform and the user can position the master control arms in front of the slave arms within a range of motion, or in the zone of operation, of the slave arms. In another specific aspect, the user can position the master control arms toward the front of the slave arms but outside of the range of motion, or outside the zone of operation, of the slave arms. The user may find such a position provides a better vantage point for observing the operation of the slave arm than being located elsewhere, such as behind the slave arms.

In certain aspects, the master control arms can be remotely located relative to the slave arms. For example, in a hazardous operating environment, such as in a radiological disaster area, the master control arms, along with the operator, can be located in a safe location and any distance away from the slave arms. The slave arms, via a mobile platform, can be remotely operated within the hazardous area.

The platform and/or slave arm can include equipment or features that provide information that can assist the user in operating the platform and/or slave arm in a remote environment. For example, the mobile platform and/or slave arm can include sensing equipment that can assist the user in detecting obstacles around the mobile platform and/or slave arm, and in gathering information about such obstacles and the operational environment. Such equipment can include a laser rangefinder, a radar, a positional sensor, a sonar array, a camera, a light, a microphone, and a combination of these. Of course, these are not intended to be limiting in any way as other types of sensors and equipment may be utilized as known in the art. Such instruments can provide the user with information about the remote workspace to enable the user to effectively operate the mobile platform and/or slave arms without being physically present or in close proximity to the slave arms.

In one aspect, two or more cameras can be directed to capture images from different vantage points to convey image information to the user for operating in a remote environment. For example, with a front camera and a rear camera, when the user switches to the rear (or front) camera view, mobile platform drive commands can be automatically remapped and appropriate information for the view can be displayed accordingly. Thus, the user can drive the mobile platform into narrow confines without having to back out. The user can simply select a different camera view and drive out normally. This can provide a safer, more efficient way to navigate the mobile platform out of tight spaces than having to back out or physically turn the mobile platform around.

To enhance the user's ability to control the mobile platform and/or slave arms, two cameras can be utilized to provide stereoscopic vision to the user. The two cameras can be spaced apart proportional to the spacing of the user's eyes relative to the spacing of the user's shoulders, the spacing of the user's shoulders corresponding to the spacing of the two slave arms. In another aspect, gas or odor detection equipment can also be employed to detect and analyze gas composition in the vicinity of the mobile platform and/or slave arm.

Data or information can be conveyed between the remote mobile platform and the user's location by any suitable means. For example, any wired or wireless communication format or network can be used, such as radio, satellite, optical transmissions, internet, cell phone networks, land lines, cable, etc.

Information received from the remote mobile platform and/or slave arm can be conveyed to the user via any suitable means. For example, visual information can be presented to the user with visual displays such as user wearable goggles, televisions, computer screens, monitors, cell phones, smart phones, personal digital assistants (PDA), etc. Audio information can be presented to the user with speakers, headphones, etc. Additionally, the user can receive tactile information from the mobile platform and/or slave arm. For example, the user can receive force reflection from the slave arm to the master control arm. As described herein, the master control arm can produce a load on the user proportional to a load acting on the slave arm. This tactile sensory information alone can greatly enhance the user's ability to operate the slave arm in a remote location. When force reflection is combined with other sensory input, such as video and/or audio, the user can take advantage of the three most important senses for moving about in a space. In a remote operation scenario, the master control arms can include position sensors, load sensors, actuators, and any other element or auxiliary component to be fully functional and provide force reflection to the user, as described herein. Thus, the user's location can be equipped with sufficient power, data transmission capabilities, etc. to support a master control arm and data presentation tools necessary to remotely operate a mobile platform, slave arm, and/or end effector.

The user can control the mobile platform, slave arm, and/or end effector with any suitable means. For example, the user can use a hand control such as a dial, lever, switch, keyboard, mouse, joystick, video game controller, etc., a foot control, or any other device that can be manipulated by an extremity of the user to operate and control functions of the mobile platform, slave arm, and/or end effector. Remote control or operation of the mobile platform and/or slave arm can be via a touch screen mounted near the user or elsewhere in a visible location, or can be via an application on the user's smart phone or other PDA device that wirelessly communicates with the system. In another example, the teleoperated mobile platform, slave arm, and/or end effector can respond to the user's voice commands. The user can control a variety of mobile platform functions or data gathering equipment at the remote site using voice commands, including controlling the lighting, the position of the camera, microphone, sensors, etc. The user can also control various end effector functions using voice commands, such as power on/off, or any other controllable feature of an end effector.

Figure 18:
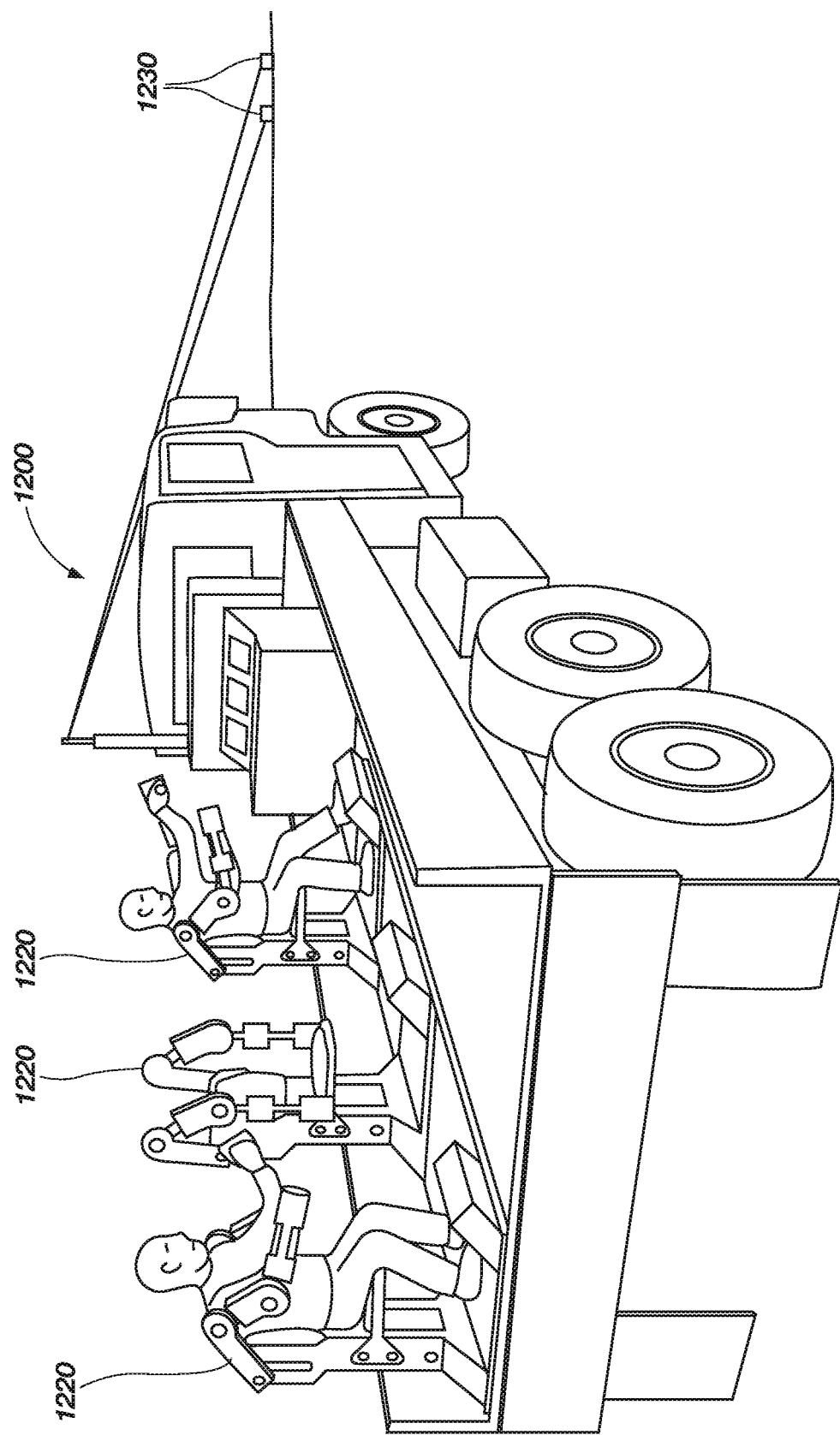
FIG. 18 illustrates master control arms located on a truck, remotely located relative to slave arms, in accordance with an example of the present disclosure.

In another aspect of the present invention, a plurality of master control arms can each remotely control a plurality of respective slave arms. For example, as illustrated in FIG. 18, a plurality of master control arms 1220 can be located on a truck 1200, each master control arm 1220 configured to control a remote slave arm 1230. The truck can be equipped with the master control arms, and/or the master control arms can be portable, with the master control arms being temporarily located on the truck. In this example, a plurality of users can use the plurality of master control arms to remotely control a plurality of slave arms. Additionally, the truck can be equipped with a display and/or a speaker to assist the users in controlling the slave arms. In one aspect, the display and/or speaker can be mobile and transportable with a master control arm. For example, a headgear or shoulder harness can support the display and/or speaker for a user. In a particular aspect, the display and/or speaker can be attachable or attached to the master control arm. For example, the master control arm can include a harness or other user wearable apparatus and the display and/or speaker can be coupled to the harness or wearable apparatus.

Whether in close proximity or remotely located relative to one another, the master control arm and the slave arm can be linked by signals communicated via wired or wireless data transfer systems. Wireless transmissions can be via radio, satellite, cell phone network, or any other type of wireless communication.

In one aspect, a master control arm can be part of a master control system comprising the master control arm and a frame member configured to support the master control arm. The master control system can be removably attachable to a platform to allow the user to relocate the master control arm relative to the platform and/or a slave arm, as illustrated in FIGS. 19A-19E, and to facilitate selective on-board off-board user control of the slave arm relative to the platform.

The master control arms 200A and 200B can be coupled to a master control arm frame member 1318 and 1310 at arm coupling pads 1320A and 1320B. For example, the master control arms can be bolted to the frame member at the arm coupling pads. The arm coupling pads can be reinforced members to support the master control arms. The frame member can be secured and removably attached to a platform, such as platform 400 in FIG. 1, with a frame coupling point 1312A and 1312B engaging a mating coupling point 1332A and 1332B of a coupling mount on the platform. For example, the frame coupling point can be a female coupler or socket and the coupling point of the coupling mount can be a mating male coupler or socket. The coupling mount can also include coupling posts 1330A and 1330B. The coupling point of the coupling mount can be disposed on or connected to coupling posts 1330A and 1330B. The couplers can provide a physical restraint of the frame when frame is coupled to the platform. The couplers can provide a power connection, a data connection, a fluid connection (e.g., a hydraulic coupling), a gas connection (e.g., a pneumatic coupling), or any combination of these connections. The removable attachable element of the frame coupling point and platform coupling point can include a hook, snap, detent, clip, insert, slot, or other suitable detachable coupling for the master control arm to the platform. The detachable coupling can be configured to securely support and maintain a coupling arrangement during use of the master control arm when coupled to the platform.

Figure 19A:
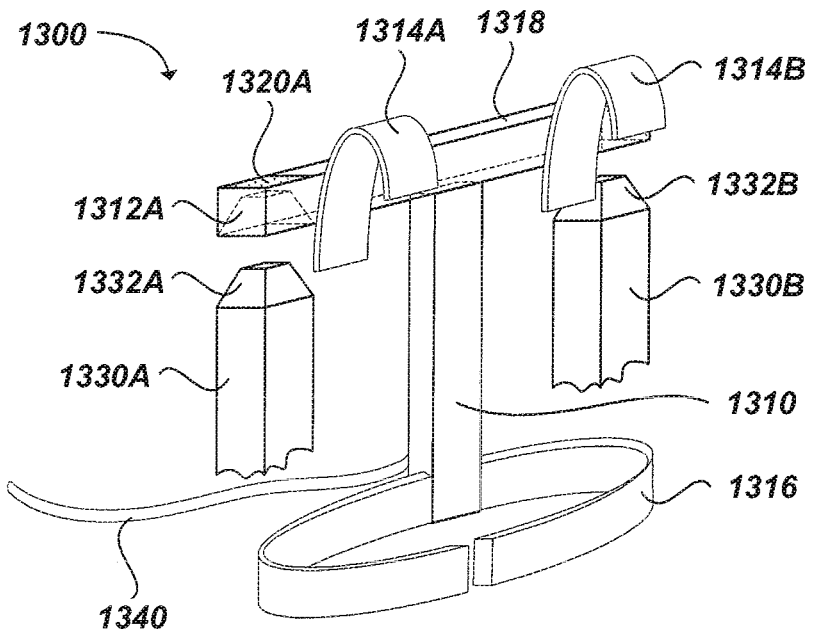
FIG. 19A illustrates a detachable master control arm with shoulder straps undocked from a platform, in accordance with an example of the present disclosure.
Figure 19B:
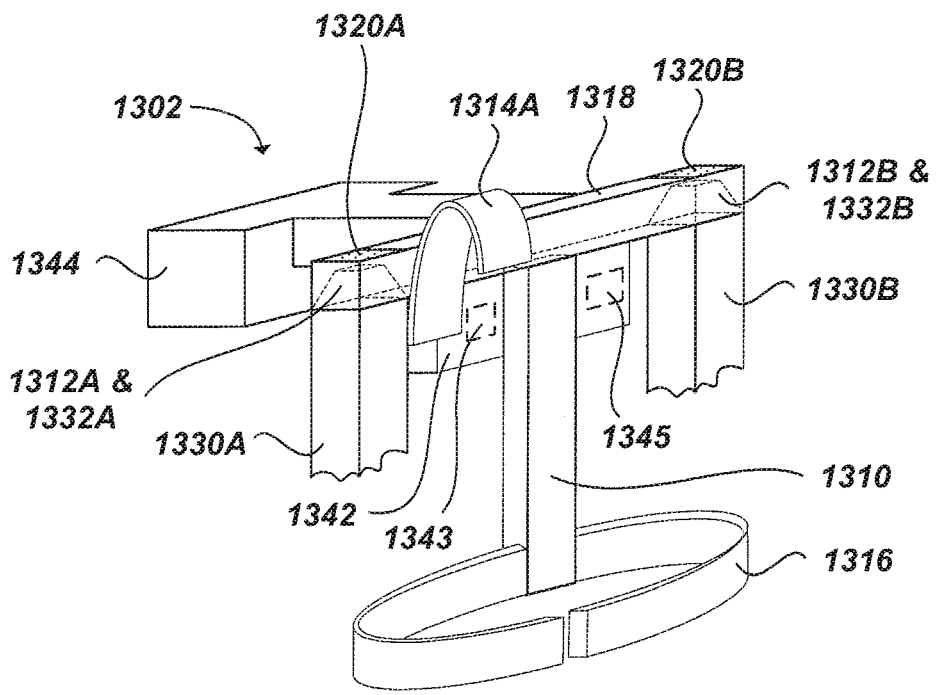
FIG. 19B illustrates a detachable master control arm with shoulder straps docked to a platform, in accordance with an example of the present disclosure.

In a specific aspect illustrated by the detachable master control arm frame 1300 and 1302 in FIGS. 19A-B, the frame member can include a harness or other user wearable apparatus, such as a shoulder strap 1314A and 1314B and/or a waist belt (or strap) 1316. The user can thus "put on" and "wear" the master control arm and detach the master control arm from the platform. The wearable nature of the master control arm can enhance the user's ability to use the master control arm when away from the platform.

Referring to FIG. 19A, an example detachable master control arm frame 1300 illustrates a flexible tether 1340 of the master control arms to the platform. The tether can be a hose, cord, and/or bus for providing gases, fluids, power, and/or data.

In another aspect illustrated by an example detachable master control arm frame 1302 in FIG. 19B, the master control arm frame can include a module 1342 with an electrical storage device 1343, storage compartment (not shown), and/or a wireless communication module 1345. The electrical storage device, such as a battery pack, can provide power to the master control arm when the frame is detached from the platform. The electrical storage device may automatically be charged when the frame is coupled to the platform. A wireless communication module can allow the master control arm to wirelessly communicate with the slave arm and/or the platform when the frame is detached from the platform. The frame can include a handle (not shown) to enhance portability of the master control arm. The frame can be mounted on a separate fixture or rack (not shown) with platform coupling points separate from the platform. The separate fixture can allow the frame to be supported and, optionally, the battery recharged, when the frame is not coupled to the platform. A hand controller (not shown) may also be physically coupled or wirelessly linked to the frame. The hand controller may provide controls to operate the platform and the equipment attached to the platform. For example, with the hand controller, the user can remotely control a mobile platform associated with the teleoperated robotic system and drive the mobile platform to a desirable location when the user is not on the mobile platform.

In another exemplary embodiment, the master control arm frame can include a counter balancing weight 1344 to balance the weight of the control arms on the shoulder or waist of the user. A balanced load can reduce the fatigue on the user and allow for extended use by the user. In another embodiment, the arm coupling pads 1320A and 1320B of the frame can be positioned behind the user to achieve a more balanced weight distribution of the master control arms on the user, so that a counter balancing weight can be reduced or eliminated.

Figure 19C:
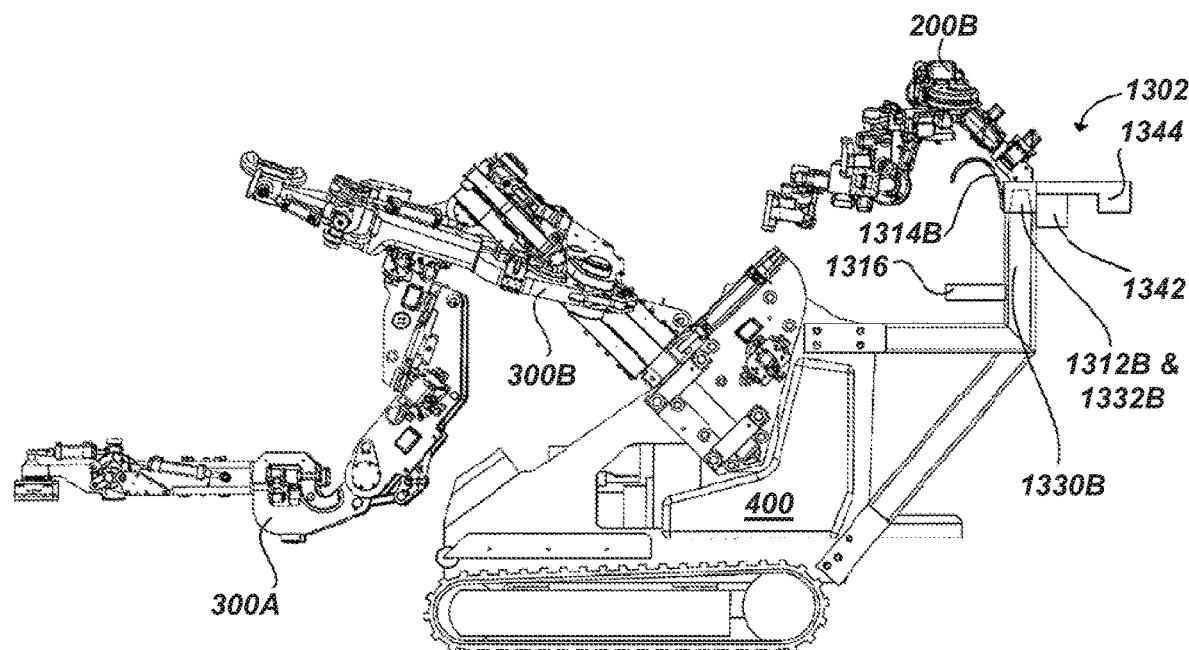
FIG. 19C illustrates a side view of a platform with a detachable master control arm, in accordance with an example of the present disclosure.
Figure 19D:
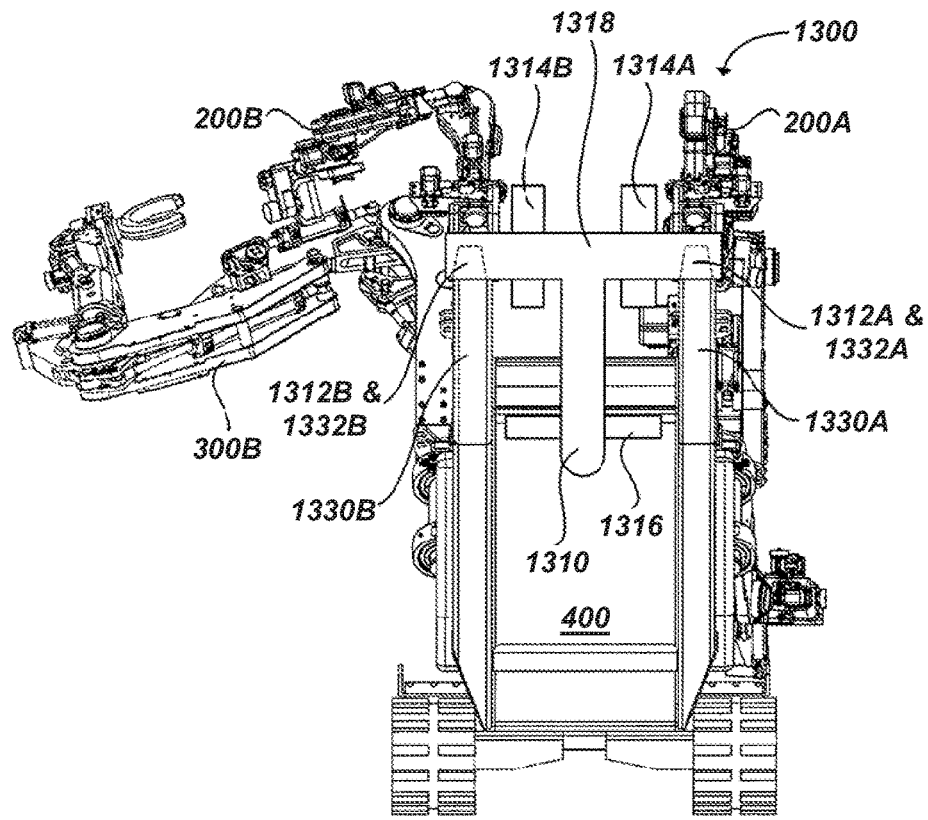
FIG. 19D illustrates a rear facing view of a platform with a detachable master control arm, in accordance with an example of the present disclosure.

FIGS. 19C-D illustrate master control arms 200A and 200B coupled to the detachable master control arm frame 1300, which is coupled to a platform 400. In one aspect, the frame and master control arm can be constructed of lightweight materials that can be carried by a user. Lightweight materials that can support a load of the master control arm can include materials such as aluminum, titanium, plastic, carbon fiber, or a combination of these and other strong lightweight materials. Steel may also be used in the frame and/or the master control arms. The frame can be constructed to conform to a user's back for comfort and supported by shoulder straps and a waist belt.

Figure 19E:
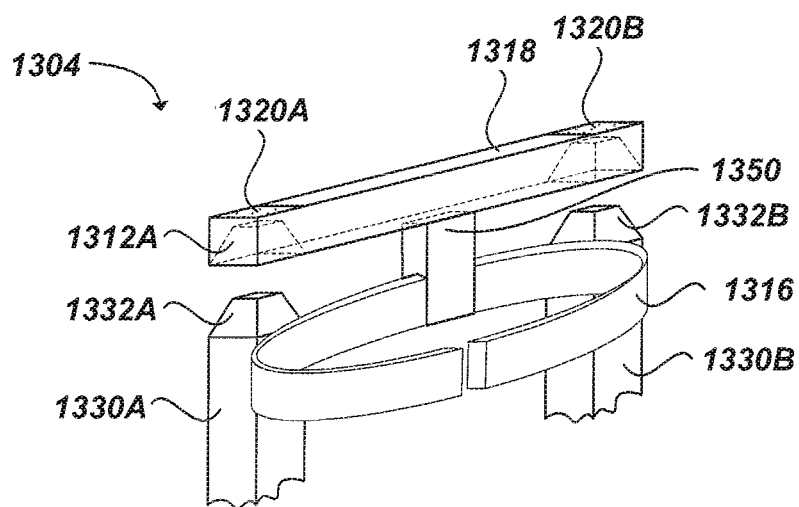
FIG. 19E illustrates a detachable master control arm with a waist belt undocked from a platform, in accordance with an example of the present disclosure.

In another aspect illustrated by an example detachable master control arm frame 1304 in FIG. 19E, the master control arm frame can allow for a coupling of the master control arms to the frame around waist level or below the shoulders. The vertical member 1350 coupled to the horizontal member 1318 can be shorter or eliminated to provide for a desired coupling location with the master control arms. For example, the horizontal member can be coupled directly to the waist belt. In one aspect, the waist belt or horizontal member can be braced to the legs of the user to provide rotational stability of the detachable frame on the user. In another aspect, the detachable master control arm frame 1304 can include the shoulder straps 1314A, 1314B to provide stability when worn by a user.

In certain aspects, a single master control arm can control multiple slave arms. For example, a single master control arm can be operatively coupled to a plurality of slave arms and can control the slave arms in sequence, such as by switching active control to a given slave arm. In another example, a single master control arm can control a plurality of slave arms simultaneously, where each of the slave arms carries out the commands of the master control arm.

In certain other aspects, a single slave arm can be controlled by a plurality of master control arms. In other words, a plurality of master control arms can be capable of communicating commands to a single slave arm. At any given time, one of the master control arms can be operatively coupled to and actively controlling the slave arm. For example, a plurality of master control arms and a plurality of slave arms can be part of a fleet of teleoperated robotic devices. A user can select a master control arm, which can be paired with an available slave arm. The pairing can be accomplished by communication over a wireless network that communicates with master control arms and slave arms to update and manage current pairings. In another aspect, a master control arm can sync and pair with one of a plurality of slave arms directly, such as when in close proximity to one another.

In accordance with the present disclosure, a teleoperated robotic system can include master control arms and slave arms in any combination. In one aspect, a teleoperated robotic system can include a single master control arm and a single slave arm. In another aspect, a teleoperated robotic system can include a plurality of master control arms and a plurality of slave arms. In the event of an unequal number of master control arms and slave arms, the robotic system can further comprise a control module that facilitates alternate and selective control and operation of the various master control and slave arms within the robotic system such as user interface elements, processing elements, signal receiving and commanding elements, filtering elements, etc. The control module can be configured to facilitate user determination of which master control arms control which slave arms.

Figure 19F:
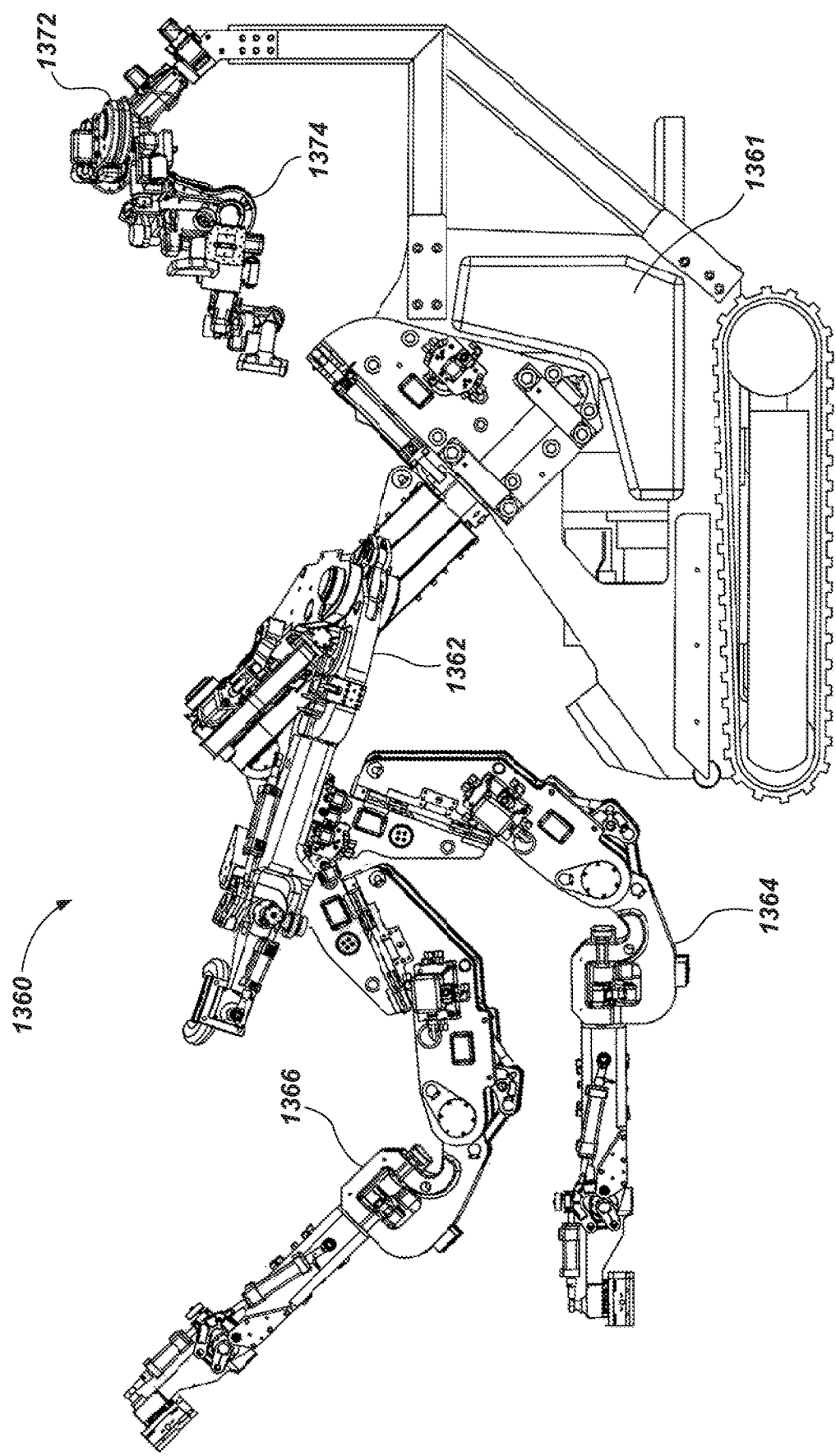
FIG. 19F illustrates a teleoperated robotic system having three slave arms and two master control arms, in accordance with an example of the present disclosure.

In a particular example, illustrated in FIG. 19F, a teleoperated robotic system 1360 can include three slave arms 1362, 1364, 1366 and two master control arms 1372, 1374. The three slave arms can be on the same platform 1361. Each of the two master control arms can actively configured to control one, two or all three of the slave arms to perform a task, such as lifting a steel beam into position for welding. Using a control module or system, the user can switch control of one of the master control arms to selectively control any one of and different slave arms. For example, in a system with two master control arms and three slave arms, a first master control arm may be configured to selectively control one of the three slave arms, with the second master control arm also being configured to selectively control one of the three slave arms. This type of system may be beneficial in applications where one or more slave arms can remain stable while one more other slave arms perform an intended function. For instance, a user can utilize the two master control arms to control two of the three slave arms at any given time, and cause them to hold an object in place in a particular location. Once in place, the user may utilize the control module to switch control of one of the master control arms to the third slave arm, wherein the master control arm manipulates the third slave arm to perform secondary function with respect to the object (e.g., weld the object in place).

In another particular example, a teleoperated robotic system can include three slave arms and three master control arms. As in the previous example the three slave arms can be on the same platform. In this example, however, each slave arm is controllable by one of the three master control arms. Thus, two of the master control arms can actively control two slave arms, such as to lift a steel beam into position for welding. The user can then operate the third master control arm to control the third slave arm to weld the steel beam in place while the first two slave arms hold the beam in position.

Figure 20:
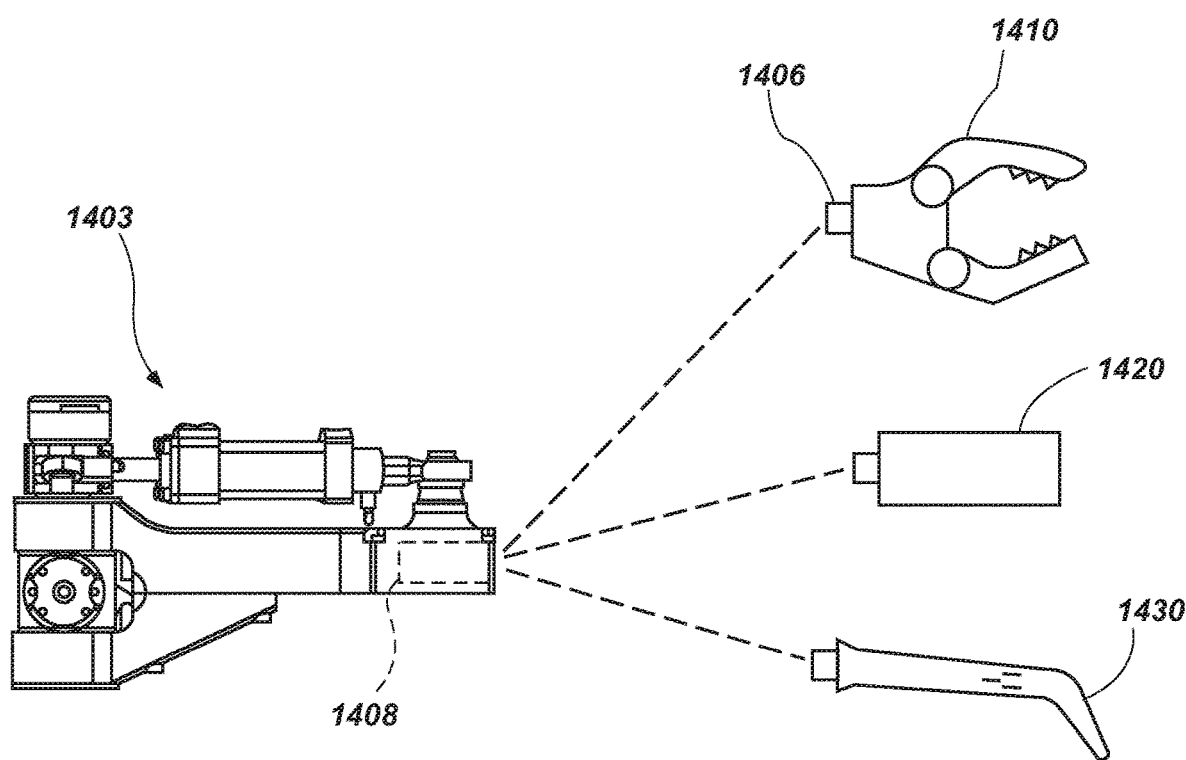
FIG. 20 illustrates detachable and interchangeable end effectors coupleable to a slave arm, in accordance with an example of the present disclosure.
Figure 21:
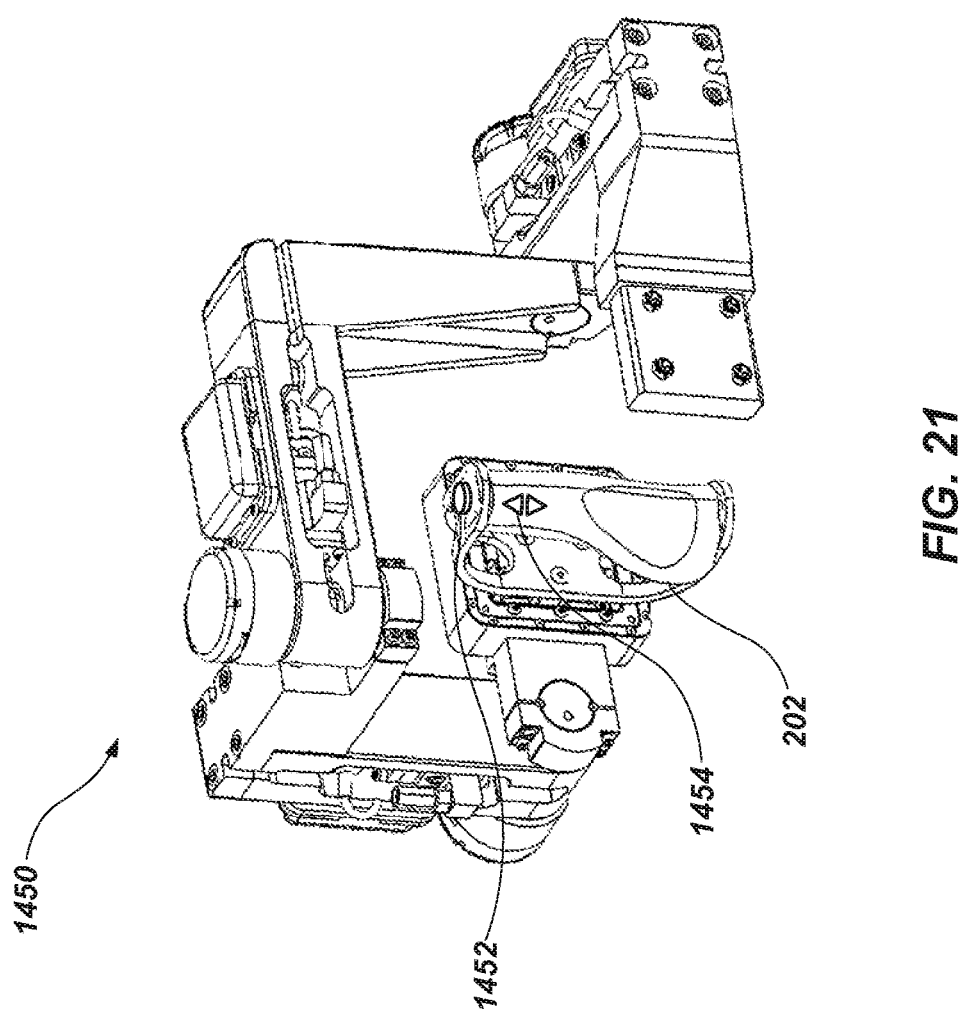
FIG. 21 illustrates an end effector control unit, in accordance with an example of the present disclosure.

Illustrated in FIGS. 20 and 21, a teleoperated robotic system can include one or more end effectors 1410, 1420, 1430 that can be coupled to an end of a slave arm 1403 to interface with an object in the workspace. When coupled, the end effectors can be in communication with and controllable by a master control arm. In a more specific example, a coupled end effector can be in communication with an end effector control unit 1450 that is coupled to the master control arm. Optionally, the end effector control unit is separate from the master control arm, such as on a console or control panel accessible to the user.

As shown in FIG. 21, the end effector control unit 1450 is disposed on the master control grip 1440, thereby enabling a user's hand that is already grasping the master control grip 1440 to more quickly access the end effector control unit 1450 and adjust the end effector as desired. In one aspect, the end effector control unit 1450 includes a control switch, such as button 1452 and button 1454, which can function to adjust and manage an end effector as desired. For example, one or more adjustment buttons may be used to control the strength of a magnetic force of a magnetic end effector, the flame of an end effector welding torch, the rpm of an end effector saw, or other such controls of an end effector coupled to the slave arm. The end effector control unit 1450 can include one or more sensors, circuits, and switches that enables a user to switch the power on or off and/or adjust the settings dependent upon the type of end effector tool that is coupled to the teleoperated robotic system.

As shown in FIG. 20, an end effector can incorporate a variety of tools and other useful devices such as, but not limited to, an adjustable clamp, a claw having one or more finger-like extensions, variable and non-variable electromagnets, and so forth. An end effector can additionally include inspection devices or tools such as bar code scanners, infrared scanners, coordinate measuring tools, as well as other types of tools such as welding torches and implements, saws, hammers, and so forth. It is further contemplated that an end effector can include detectors and analyzers for harmful matter such as radiation, chemicals, and so forth, thereby enabling detection and analysis of harmful substances. In a particular aspect, the end effector can be configured to grasp human hand tools. In this case, the end effector control unit can enable the user to not only control the end effector for grasping the hand tool, but also provide the user with the ability to operate the hand tool. Such control may be accomplished with a "hand-like" or "finger-like" multi DOF master control, or simply with buttons, dials, levers, or the like that can manipulate the end effector to operate the hand tool.

In another example, also shown in FIG. 20, end effectors 1410, 1420, 1430 can be removably coupled to the slave arm 1403 (e.g., through a quick release system), such that one end effector can be quickly uncoupled from the slave arm and interchanged with another end effector. It is contemplated that an end effector can be removably coupled to the slave arm in a variety of ways. In the illustrated example, the end effectors 1410, 1420, 1430 include an attachment end 1406 configured and sized to couple to the receiving end 1408 of the slave arm 1403. Conversely, the receiving end 1408 of the slave arm 1403 is sized to receive the attachment end. Once coupled to the slave arm 1403, a retaining member can be used to securely retain the attachment end 1406 to the receiving end 1408 of the slave arm 1403. The detachable coupling can be configured to securely support and maintain an end effector during use of the slave arm and end effector. The coupling between the slave arm and end effector can include mating couplers or sockets. The coupling can provide a physical restraint for the end effector when coupled to the slave arm, such that the coupling can withstand the loads placed on the end effector. Additionally, the coupling can provide a power connection, a data connection, a fluid connection (e.g., a hydraulic coupling), a gas connection (e.g., a pneumatic coupling), or combination of these connections. The coupling can include a hook, snap, detent, clip, insert, slot, or other suitable detachable coupling for the end effector to the slave arm.

Figure 22:
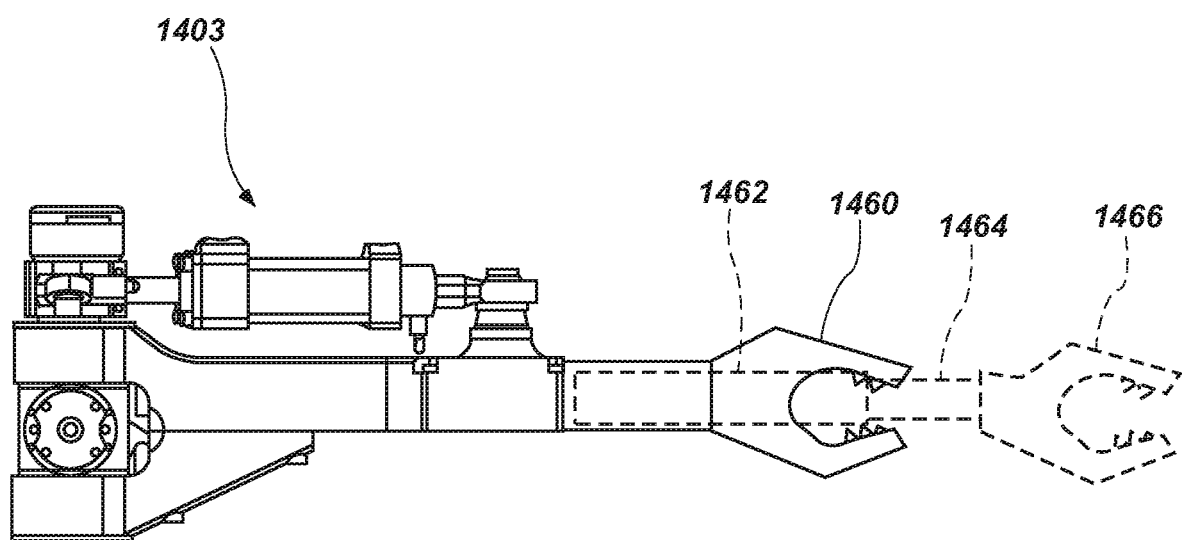
FIG. 22 illustrates a linear degree of freedom end effector, in accordance with an example of the present disclosure.

Shown in FIG. 22, the end effector 1460 can include one or more extendable lengths 1462, 1464 to extend a device or tool, disposed at an end of the end effector 1460 and coupled to the extendable length 1464 most distant to the slave arm 1403. The one or more extendable lengths 1462, 1464 are configured to provide the end effector 1460 with a linear DOF for greater reach, as shown at extended position 1466. As shown, the one or more extendable lengths are configured in a telescopic formation, having a first extendable length 1462 coupled and sized to retract into an interior of the end effector 1460, and the second extendable length 1464 coupled to the first extendable length 1462 and sized to retract into the first extendable length 1462. The one or more extendable lengths 1462, 1464 can be in communication with the master control arm 1403 and/or master control grip 1450 such that a user can extend the one or more extendable lengths outward, thereby increasing reach of the end effector 1460. It is contemplated that the one or more extendable lengths 1462, 1464 can be powered in a variety of ways, such as through a hydraulic, electric, or pneumatic system.

Figure 23:
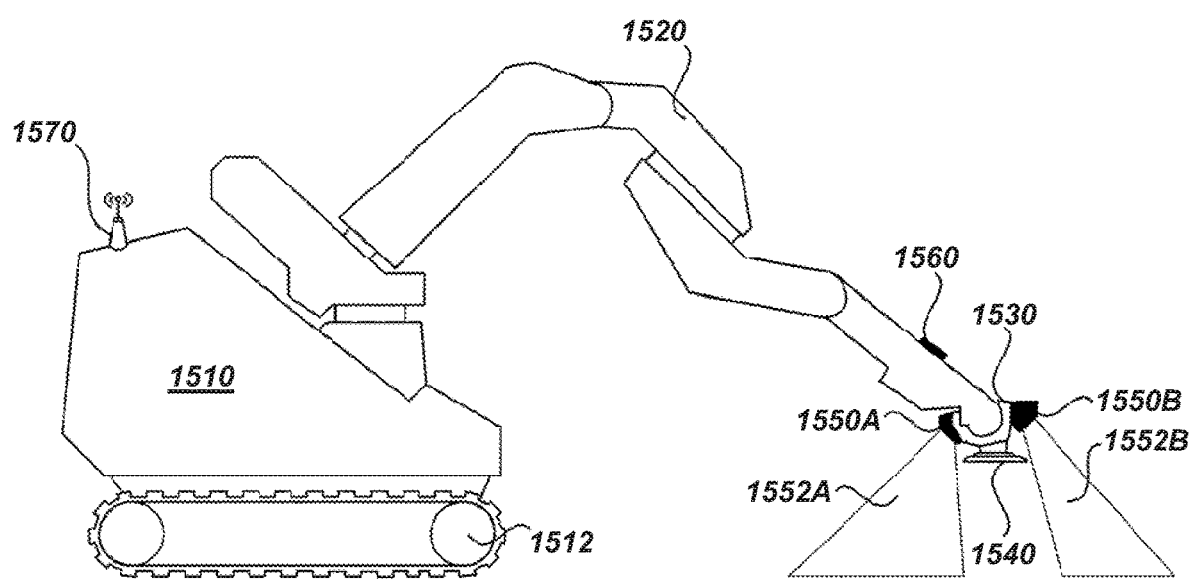
FIG. 23 is an illustrative diagram showing a platform with a scanning device on a robotic arm, in accordance with an example of the present disclosure.

A robotic slave arm 1520 coupled to a platform 1510 can be used in an inventory system, as illustrated in FIG. 23. The platform can be mobile and can comprise tracks 1512 or wheels (not shown) to facilitate locomotion. An end effector 1530 can be coupled to an end of the robotic slave arm. The end effector can include a mechanism for lifting or acquiring an item. The item can refer to a generic inventory item, for example, such as a steel plate, a crate, or a munition. The end effector can include an electromagnet 1540 for lifting ferromagnetic items or a gripping mechanism (not shown). The end effector can include a scanning device 1550A or 1550B coupled to the end effector, the robotic arm, or the platform. The scanning device can include a barcode reader, matrix code scanner, a radio frequency identification (RFID) scanner, a device for reading or sensing identification tags, or combination of these scanning devices. The scanning device may be on any face of the end effector, the robotic slave arm, or the platform. The scanning device may be integrated with the end effector, the robotic slave arm, or the platform.

FIG. 23 illustrates a front scanning device 1550B on a front face of the end effector and a rear scanning device 1550A on a rear face of the end effector. The front scanning device may have a scanning range 1552B in front of the end effector. The rear scanning device may have a scanning range 1552A behind the end effector. In another example, the end effector may only use a single scanning device. In other examples (not shown), the scanning device can be coupled to the robotic slave arm or the platform with a scanning radius near the scanning device. In one aspect, the scanning device can be coupled directly to the electromagnet 1540 or gripping mechanism.

The item or object can have an object tag attached or affixed thereto. The scanning device 1550A and 1550B can scan the object tag when the object is acquired by the end effector 1530. The scanning device may continually scan object tags of various items in the vicinity. The scanning device may scan the object tag before, during, or after the object is acquired by the end effector. The object tag can be a barcode, matrix code, or a RFID tag. The scanning device may record or register the object tag when the object is acquired or released by the end effector. The scanning device can register an object reference when the object tag is read. The scanning device may record or transmit the last object tag read before acquiring or releasing an object, which may be the object tag associated with the object manipulated by the robotic arm.

The platform may include a logging device coupled to the platform for recording an object record associated with the object and object tag. The scanning device can transmit the object reference to the logging device. In one example, the logging device may include data storage coupled to the platform for storing the object record. In another example, the platform may include a platform transceiver 1570 for transmitting the object reference via wireless communication from the scanning device to a central repository.

The central repository may be within a computerized storage device or operate from multiple computer systems operating in a network. The central repository can include a database. The computerized storage device can include a computer readable storage medium that includes volatile and non-volatile (transitory and non-transitory), removable and non-removable media implemented with any technology for the storage of information such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information.

In still another example, the platform transceiver 1570 can transmit the object reference via wired or wireless communication from the scanning device to a user interface. The user interface can also be used to control the platform and the robotic arm.

In an example, a locating device 1560 can be coupled to the robotic slave arm or the platform. The locating device can include a global satellite positioning (GPS) device or receiver. The locating device can be used to determine a position of the robotic slave arm when the end effector acquires an object, transports the object, or releases the object. An object location may be associated with the object when the object is acquired, transported, or released. The object location may be provided in global position coordinates, a subdivided partition or space, or sector. The object location may be associated with the object reference and stored with the object record in a central repository.

Figure 24:
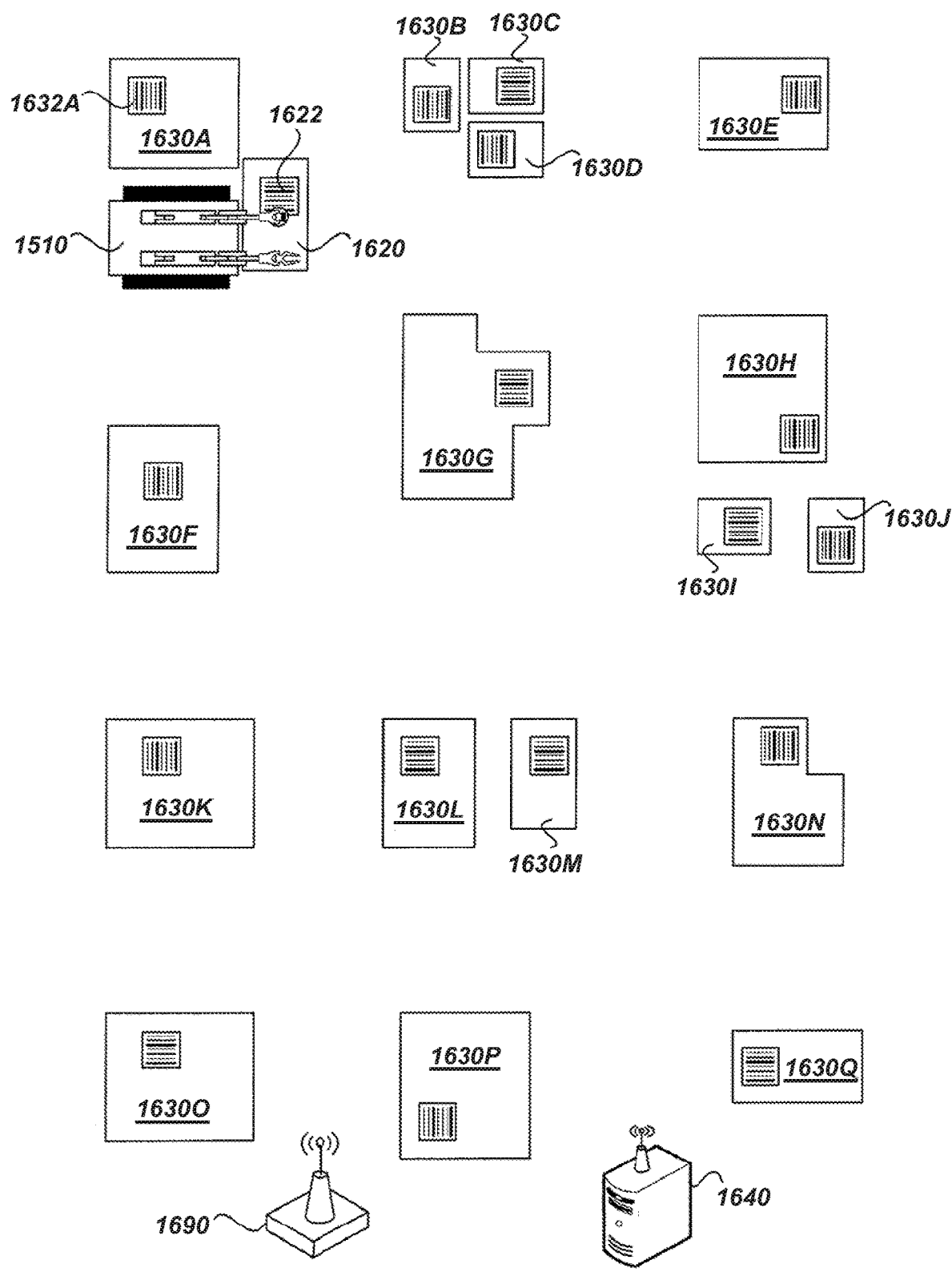
FIG. 24 is an illustrative top view diagram showing a platform with a robotic arm holding an item, in accordance with an example of the present disclosure.

FIG. 24 illustrates a platform 1510 in support of at least one robotic slave arm and transporting an object 1620. An object tag 1622 can be attached or integrated with the object. In the illustration of FIG. 24, the platform is in an inventory area with multiple items 1630A-1630Q. An object tag 1632A may be affixed to each of the items. The platform 1510 may be controlled by a user riding on the platform (e.g., as taught herein) or by a user walking near the platform (not shown). In another example, the user may control the platform and robotic slave arm using a user interface 1690. The user interface may communicate with the platform via wireless communication. The scanning device on the robotic slave arm may scan the object tags of objects at anytime the platform transports objects from a starting location to an end location. The robotic slave arm may be used to inventory an object. The robotic slave arm may be used to audit inventory.

In the inventory process, the robotic slave arm may acquire an object at a starting location. When an electromagnet is coupled to an end effector or robotic slave arm, the object can be acquired when the electromagnet is magnetized. The object can be released when the electromagnet is demagnetized. When a gripping mechanism is used, the object can be acquired when the gripping mechanism grips the object. The scanning device may scan the object when the object is acquired. The platform may move the object to an end location. The end effector may release the object at an end location. A logging device may log an object reference representing the object with the end location. The logging device may automatically track the location of the object when the end effector has possession of the object. The logging device may transmit the object reference from the logging device to a central repository 1640.

Figure 25:
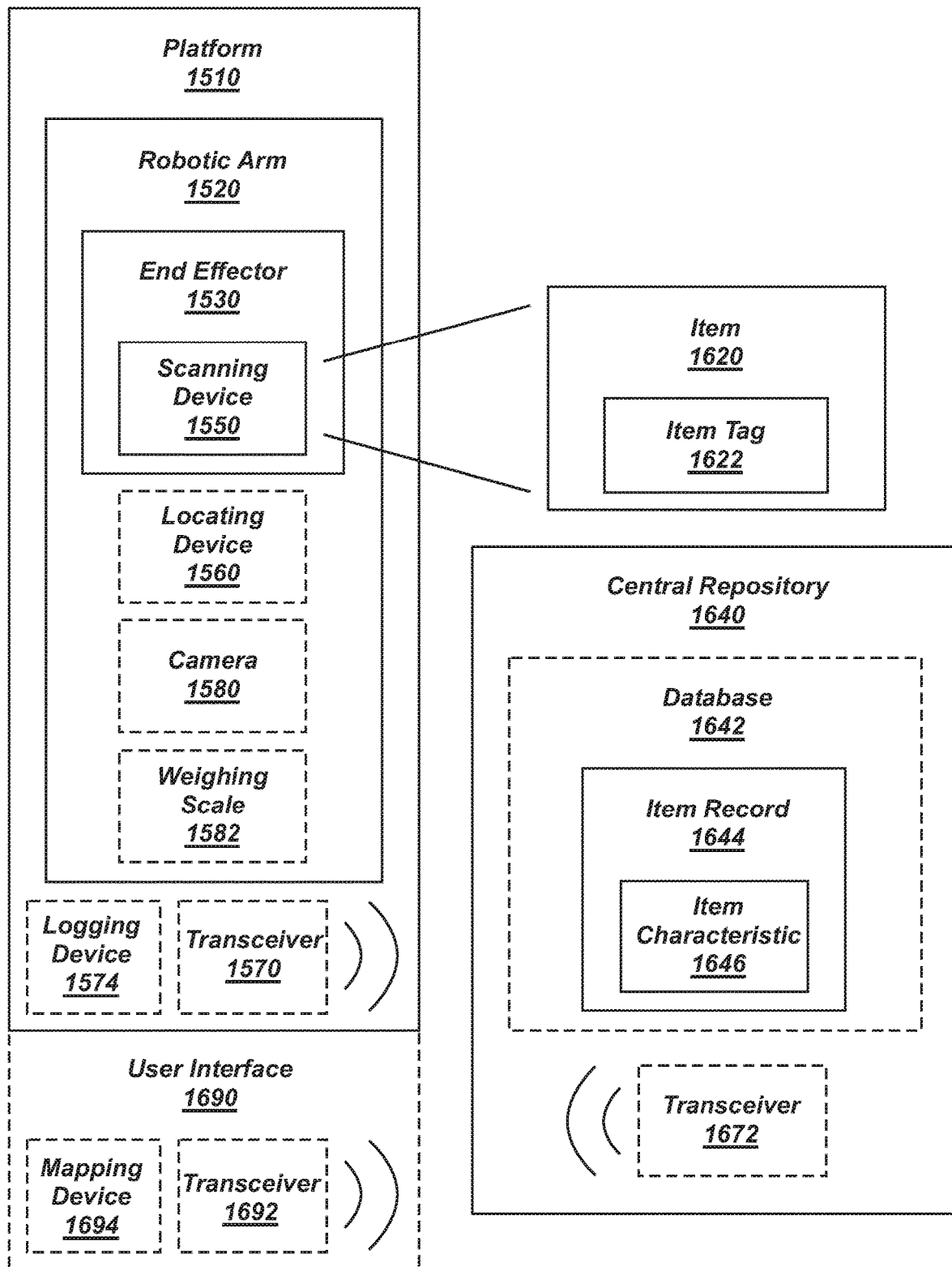
FIG. 25 is an illustrative block diagram of a robotic arm inventory system, in accordance with an example of the present disclosure.

The platform 1510 may wirelessly transmit data, which can include the object reference and the object location, via the platform transceiver to the central repository 1640. The central repository can include a database 1642, as illustrated in FIG. 25. The central repository may be connected to a network or the internet. In one aspect, the central repository may operate from a cloud. The database may include a plurality of object records. The object reference may be recorded in an object record 1644 or transmitted when the object is released by the end effector. The registered location of the robotic slave arm when the end effector releases the object can provide the object location or end location. The end location may replace a previous location stored for the object in the database. The central repository can include a central repository transceiver 1672, which can communicate with a platform transceiver 1570 and/or a user interface transceiver 1692 coupled to a user interface 1690. The platform transceiver can transmit an object reference and an object location to the central repository.

The platform may include data storage logging device 1574 for logging the scanned object reference and the object location. The data storage logging device may periodically transmit scanned object references and the object locations for a plurality of objects. The data storage logging device may be memory stored on the platform and physically removed periodically from the platform and exported to the central repository via repository port or interface or a wireless connection.

In another example, a camera 1580 can be coupled to the platform 1510 or the robotic arm 1520. The camera can be used to guide the platform when the platform is operated remotely by a user using a user interface. The camera can be used to view the object and/or the surroundings. The camera may be a still camera or a motion video camera. The camera may capture an object image. The object image may be digitally processed to determine the object dimensions. The object dimensions may be height, width, length, or diameter. The object image may be processed by a processor coupled to the platform or at a processor used by the central repository. The object image may be stored in the object record or with the object reference. The object image may be retrieved from the central repository and displayed to a user.

In one example, a weighing scale 1582 may be coupled to the robotic arm 1520 or integrated in the robotic slave arm. The weighing scale may be used to weigh the object. An object weight may be transmitted with the object reference and may be stored in the object record 1644.

An object record 1644 in a database can include an object characteristic 1646. The object characteristic may include an object location, an object weight, an object size, or other information associated with the object. The object characteristic may be determined by the information gathering devices coupled to the platform 1510, such as the locating device 1560, camera 1580, scanning device 1550, and/or weighing scale 1582. The item characteristic may be information associated with the object tag or object reference previously acquired or entered.

In another example, an object may be located and acquired using the inventory system and a platform with a robotic device. An object reference or object description may be provided via a user interface. The object description may provide characteristics or qualities of the object that can be searched in a database. The user interface may be coupled to the platform and directly wired to the platform or the user interface may communicate via wireless communication with a central repository and a platform. The user interface may transmit the object reference to a central repository. The central repository may be queried with the object reference. The database in a central repository may retrieve or return an object record with an object location or an object location, where the object record is associated with the object reference. The object location may be transmitted from the central repository to the user interface or the platform. The user may move the platform via the user interface to the object location. The platform may acquire the object at the location with the robotic arm coupled to the platform. In another example, the platform may automatically navigate through an area with other objects to arrive at the location of the queried item. The platform may use proximity sensors to avoid running into other items.

The platform or user interface 1690 may use a mapping device 1694 to map the queried object and other objects in a specified area. The mapping device can be coupled or integrated into a user interface. The mapping device may be a mapping application operating on a user computer system with a processor and display. The platform may avoid other objects using the map generated by the mapping device. In another example, the map may be displayed to a user. The mapping device may locate the current position of the platform or the robotic slave arm and the queried object location. The mapping device may update the location as the platform approaches or moves away from the queried object. The mapping device may have various levels of detail based on the distance between the platform and queried object or input of the user. The mapping device may provide a route from the platform position to the queried object position. The route may use the size and position of other objects stored in the central repository to generate the map and provide an efficient route around the other objects to the queried object.

In another example, the object references or object characteristics may be displayed on a map on the mapping device for a user to view. The user may select an object reference from the map to retrieve or acquire. The selected object may be highlighted on the display. The user may use the map to drive the platform to the object location.

In another example, the platform may scan objects without lifting or acquiring the object. When an object is scanned without lifting or moving the object, the location of the robotic arm when the object is scanned can provide the object location, which can be stored in the central repository. Scanning objects not being moved can allow an area previously not inventoried to be inventoried as the platform moves through an area, as long as the scanning device can read the objects tags of the object the platform passes.

Figure 26:
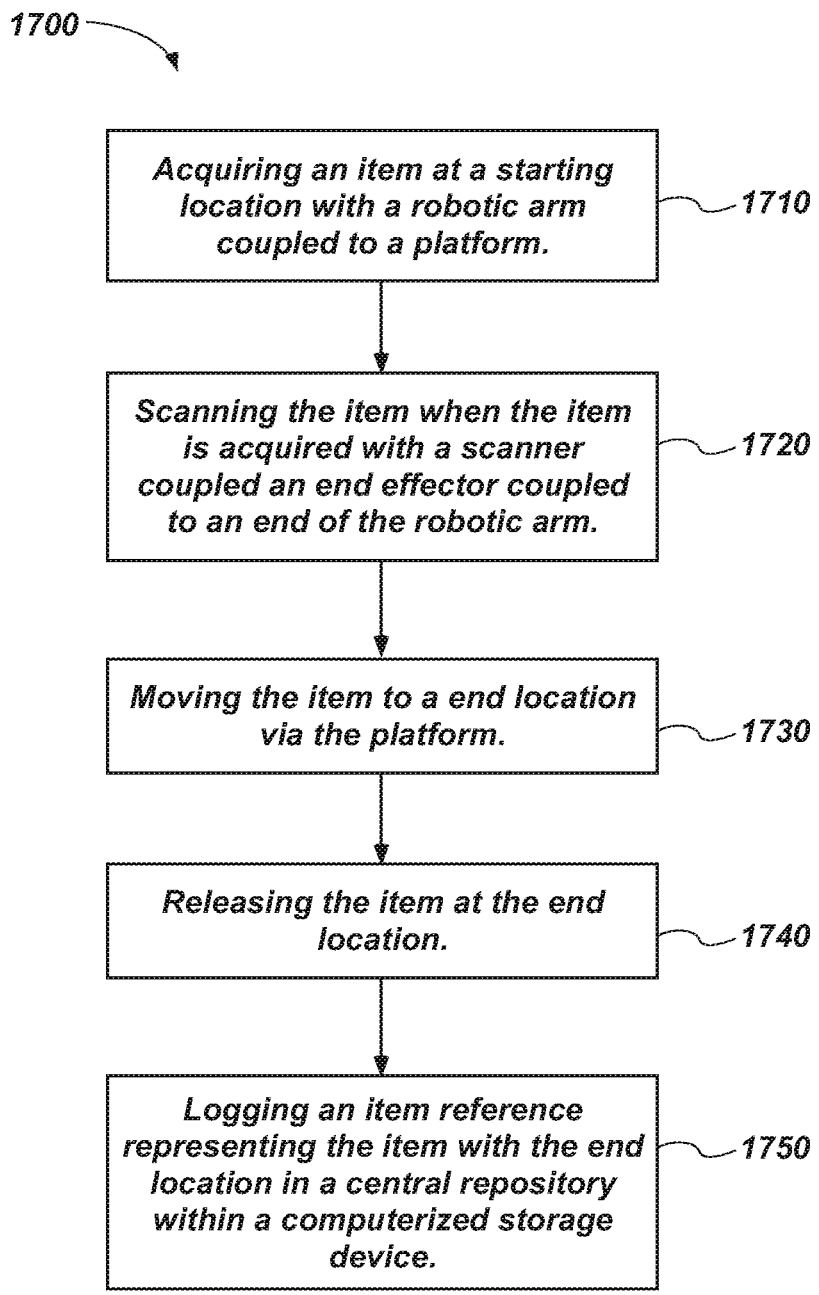
FIG. 26 is a flowchart illustrating a method for inventorying an item using a robotic arm, in accordance with an example of the present disclosure.

Another example provides a method 1700 for inventorying an object using a robotic arm, as shown in the flow chart in FIG. 26. The method includes the operation of acquiring an object at a starting location with a robotic arm coupled to a platform, as in block 1710. The operation of scanning the object when the object is acquired with a scanner coupled an end effector coupled to an end of the robotic arm follows, as in block 1720. The next operation of the method may be moving the object to an end location via the platform, as in block 1730. The method further includes releasing the object at the end location, as in block 1740. The next operation of the method may be logging an object reference representing the object with the end location in a logging device, as in block 1750.

The system and method disclosed can provide an automatic recordation of inventory objects that do not necessarily have a fixed location or compartment along with a record of the object's location. For example, the inventory system can be used in a ship yard where materials, steel plates and other objects can cover many acres. The same device used to move heavy objects can scan and log the data associated with the object through the process of transporting the object.

Figure 27A:
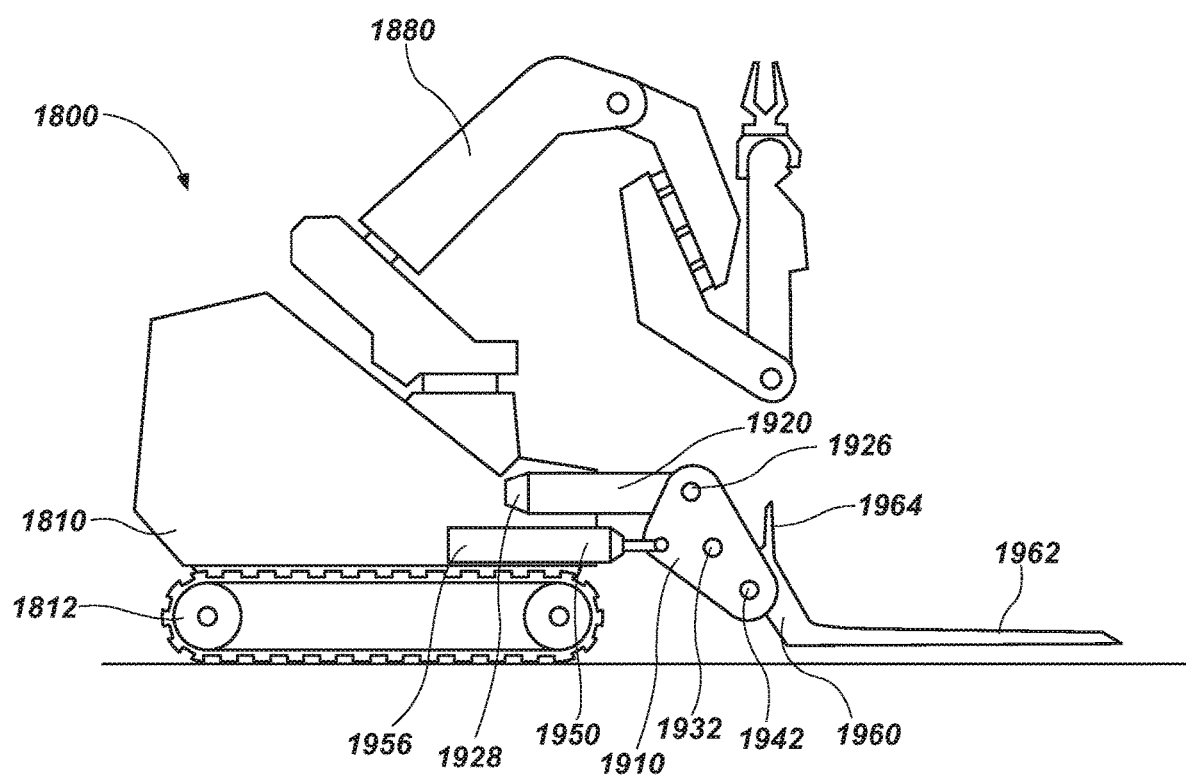
FIG. 27A is an illustrative diagram showing a platform with a lifting device in a lowered position, in accordance with an example of the present disclosure.

The teleoperated robotic device can further comprise various lifting devices associated with the platform. In one exemplary embodiment, a lifting device 1800 can be coupled to a platform 1810, as illustrated in FIG. 27A. The lifting device can be configured in a manner similar to a forklift. The platform can be mobile and be transported using tracks 1812 or wheels. Other devices and equipment may be coupled or supported by the platform. For example, a robotic arm 1880 may be coupled to the platform, as discussed herein. The lifting device can be configured to work in conjunction with the robotic arm to perform additional lifting functions beyond or more efficiently than what either of these may perform alone. The lifting device may be constructed with or without a lifting mast, discussed below. The lifting device may have a low profile and positioned in the front or rear (not shown) of the platform.

A lifting device may include a bracket 1910, an arm 1920 (e.g., a fixed arm) with a pivot point 1926 facilitating the rotation of the bracket, an actuator 1950 for rotating the bracket around the pivot point, and a lift carriage (shown as reference number 1944 in FIGS. 28A and 28B) coupled to the bracket. In certain aspects, the arm 1920 need not be fixed and can be movable relative to the platform. For example, the arm 1920 can extend/retract from the platform. In another example, the arm 1920 can be raised/lowered relative to the platform. An end 1928 of the arm may be coupled to the platform 1810. Rigid support on, or coupling of the arm to, the platform may be provided by a weld, bolt, pin, rivet, etc. An end 1956 of the actuator 1950 may be coupled to the platform 1810. In one aspect, the coupling point of the actuator to the platform may be a pin connection that allows the actuator to rotate when the actuator piston moves from one position to another.

Figure 27B:
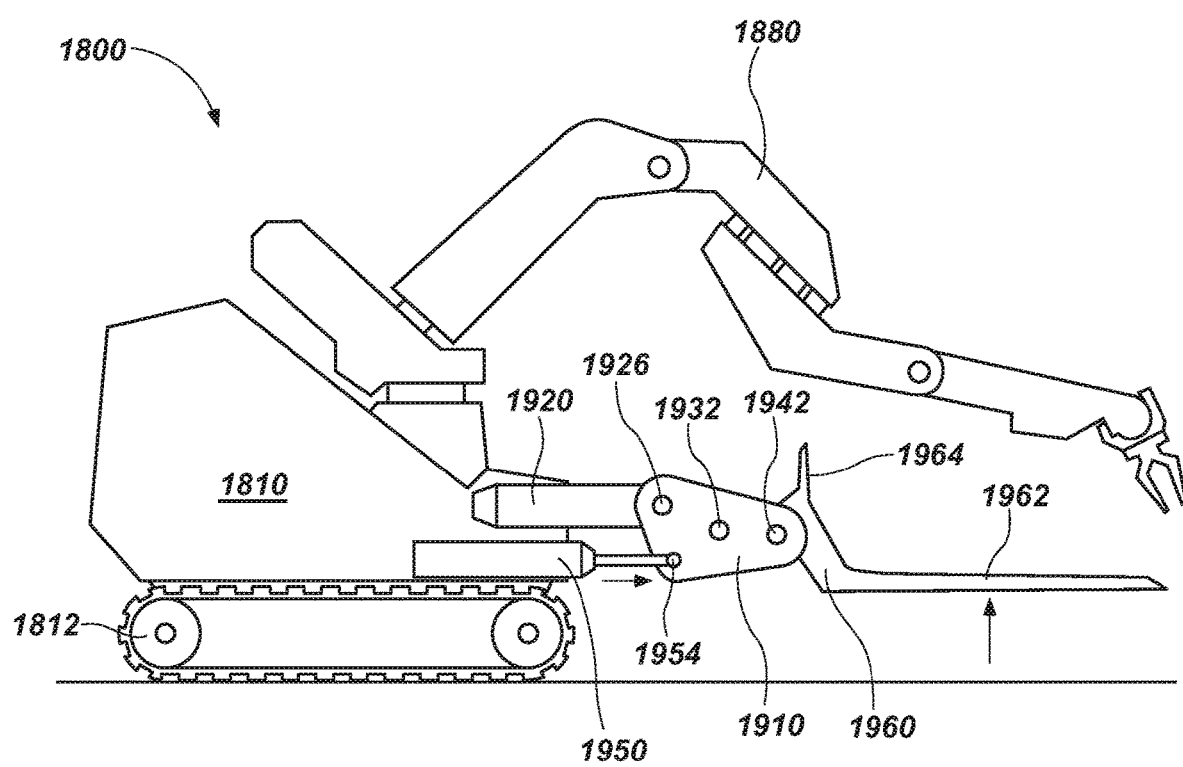
FIG. 27B is an illustrative diagram showing a lifting device in a raised position for use by a platform, in accordance with an example of the present disclosure.

The actuator 1950 may include a housing and a piston, where the piston moves within the housing. The actuator may operate with electricity, hydraulic fluid pressure, or pneumatic pressure. The actuator may convert electrical energy into motion. A control signal may be used to actuate the actuator. The actuator may rotate the bracket from a lowered position, as illustrated in FIG. 27A, to a raised position, as illustrated in FIG. 27B.

Figure 28A:
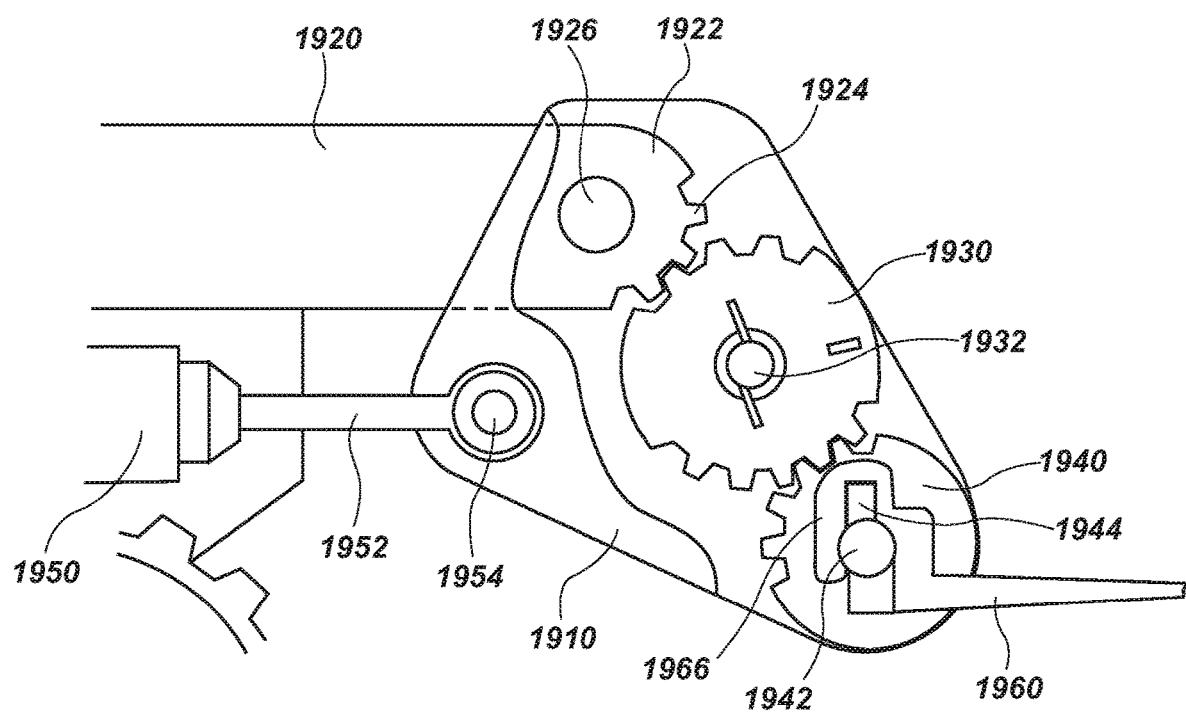
FIG. 28A is an illustrative partially cutout side view diagram showing a lifting device in a lowered position, in accordance with an example of the present disclosure.

The arm or brace 1920 can include stationary cogs or teeth 1924 on an end 1922, where the stationary cogs can rotate a gear 1930, as illustrated by FIG. 28A. The end 1928 of the arm can be coupled to the platform 1810. A bracket 1910 may be rotatably coupled to the end 1922 of the arm 1920 by a pivot 1926. The pivot point 1926 may be a fixed arm pin, bolt, axle, etc. The pivot point 1926 may include a bearing to reduce friction in the pivot point. Bearings may be used in other rotational joints. The bolt may be restrained by a nut and/or a washer. The fixed arm pin and other pins used for coupling gears to the bracket or other member may include lateral restraints so the pin does not slide out of a rotating point. For example, a lateral restraint can be a cotter pin.

The bracket 1910 can be formed of metal or another rigid material. The gears and components can be constructed of steel and other similar metals. The bracket can have the shape of a polygon. In one aspect, the bracket can have a generally triangular shape. The arm 1920 can be coupled to a first point 1926 of the bracket with a fixed arm pin, a lift gear 1940 can be coupled to a second point 1942 of the bracket with a lift gear pin, and the actuator 1950 can be coupled to a third point 1954 of the bracket. The actuator piston 1952 can be coupled to the bracket by a pin, bolt, or axle 1954. A lift gear 1940 may be coupled to the bracket 1910 and a lift carriage 1944. The lift carriage may be raised and lowered in elevation as the bracket rotates around the pivot point 1926. A center gear 1930 can be coupled to the bracket with a center gear pin 1932. Thus, the center gear 1930 can couple the cogs 1924 on the arm 1920 to the lift gear 1940.

In one aspect, the gear ratio between the cogs 1924 of the arm 1920, center gear 1930, and the lift gear 1940 may be calculated so a lift carriage coupled to the lift gear may rotate to maintain an orientation relative to the ground. The gear ratio can be the relationship between the number of teeth on two gears that are meshed or two sprockets connected with a common roller chain. In another example, a chain may be used instead of a center gear.

Figure 28B:
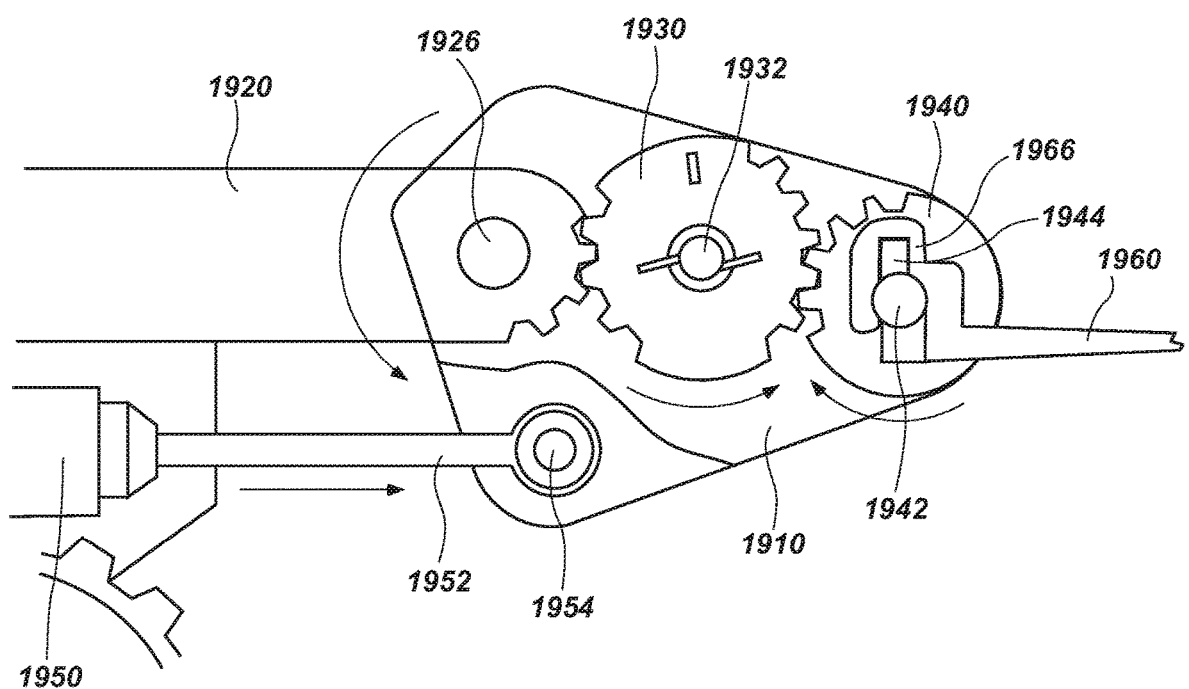
FIG. 28B is an illustrative partially cutout side view diagram of a lifting device in a raised position, in accordance with an example of the present disclosure.

In use, the actuator piston causes the bracket 1910 to rotate about the pivot 1926 when the actuator is actuated. When the actuator 1950 is actuated to raise the lift, the rotation of the bracket 1910 about the pivot 1926 causes the lift carriage to rotate away from a ground surface. Also, as the bracket 1910 rotates, the center gear 1930 engages with the cogs 1924 on the arm 1920, causing the center gear 1930 to rotate counterclockwise, as illustrated in FIG. 28B. The center gear 1930 also engages the lift gear 1940, which causes a clockwise rotation in the lift gear 1940 due to the counterclockwise rotation of the center gear 1930. Because the gears are rigidly coupled to one another via the bracket 1910, this action of the gears causes the lift carriage 1944 to maintain an orientation relative to the ground surface as the bracket is rotated about the pivot 1926. The lifting device operates similarly in a reverse direction to lower the lift.

In one aspect, a lifting arm 1960 may be coupled to the lift carriage 1944. The lifting arm many include a load back rest 1964 (FIG. 27A) and a horizontal arm 1962 (FIG. 27A). The horizontal arm (or horizontal member) can be used for lifting a load, and the vertical member can provide a load stop. The horizontal arm may be integrated with the load back rest and transition from a horizontal member (horizontal arm) to a vertical member (the load back rest). The transition or joint between the horizontal arm and the vertical member may be angled or reinforced to keep the transition or joint rigid.

The lifting arm 1960 may have a keyed groove 1966 that can mate with a keyed notch 1944 in the lift carriage. The keyed groove or keyed hook can be coupled to the vertical member or the load back rest 1964 and used for mounting the lifting arm to the lift carriage. The keyed notch and corresponding keyed groove may allow for some lateral movement of the lifting arm on the lift carriage and restrict movement on an anterior-posterior axis of the lift carriage. The keyed lift carriage and/or the keyed arms may maintain a level position relative to a surface upon which a platform is on when the lift gear is rotated. The keyed arm can be easily removable and may slide across the lift carriage which can provide a lateral alignment with a load, such as a pallet or crate. The keyed arm may utilize a gravity or friction fit. The lift carriage and/or the keyed arm may include grooves 2044 on some portion of the mating surfaces for reducing lateral movement of the keyed arms once the arms are adjusted in a lateral position, illustrated in FIG. 29. The arms may be partially lifted on an extended end of the arm to slide the arms laterally on the lift carriage to adjust the position. The arm may be lowered to engage the grooves of the keyed lift carriage with the grooves of the keyed arm.

In another example, the lift gear, the lift carriage, or the coupling between the lift gear and the lift carriage can include a rotary actuator for leveling the lift carriage. The rotary lift gear can rotate the lift carriage with respect to the lift gear. The rotary actuator may provide a minor adjustment to the lift carriage angle when the platform is on uneven terrain, an incline, or a decline, where a level geared position in the lift carriage may create a decline or incline in the lift arms.

Figure 29:
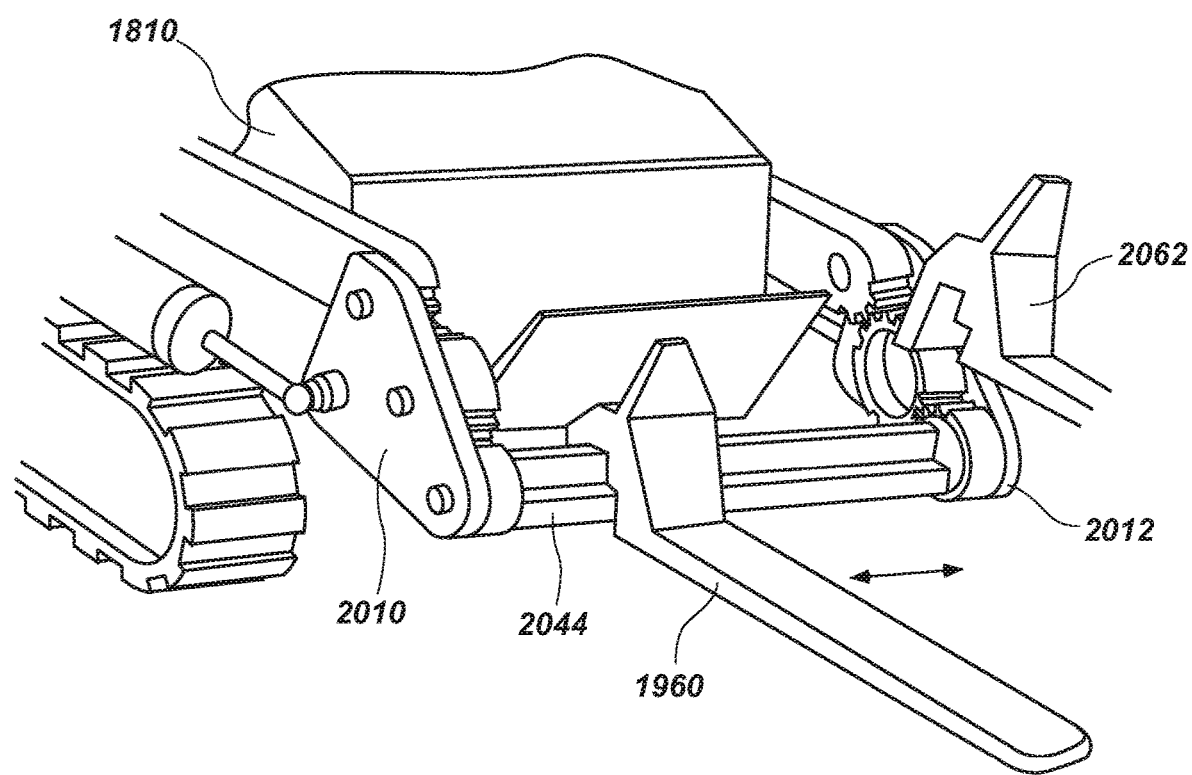
FIG. 29 is an illustrative prospective view diagram showing a lifting device keyed carriage, in accordance with an example of the present disclosure.

An actuator, a fixed arm, a pivot point, a lift gear, and a center gear may be provided for a right bracket 2010 and a left bracket 2012, illustrated in FIG. 29. A lift carriage 2044 may be coupled between a right lift gear and a left lift gear. Multiple keyed arms 1960 and 2062 may be mounted on the keyed lift carriage.

Figure 30A:
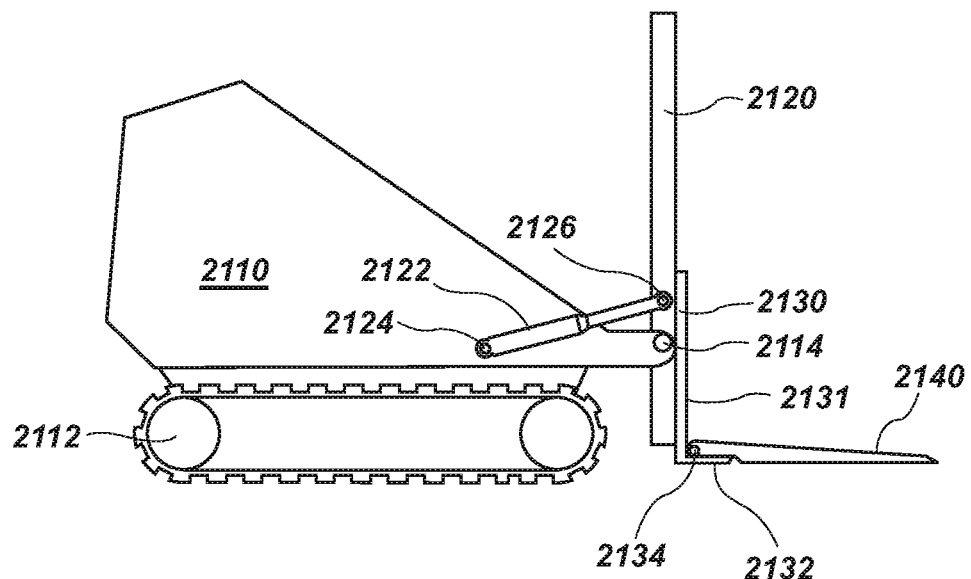
FIG. 30A is an illustrative side view diagram showing a folding lifting device with a mast in a vertical position and a lowered carriage, in accordance with an example of the present disclosure.

In another example, a folding lifting device can be coupled to a platform 2110, as illustrated in FIG. 30A, which is similar to the platform of FIGS. 27-29, and which may also support one or more robotic arms, as discussed herein. The folding lifting device may allow the carriage to reach high platforms, for example a platform of a truck, train and/or warehouse shelf. Allowing the mast and carriage to fold can allow the lifting device to be stowed away when the lifting device is not in use. A folding lifting device can be folded to allow full mobility of equipment and devices mounted on the platform, such as robotic arms and cranes.

Figure 30B:
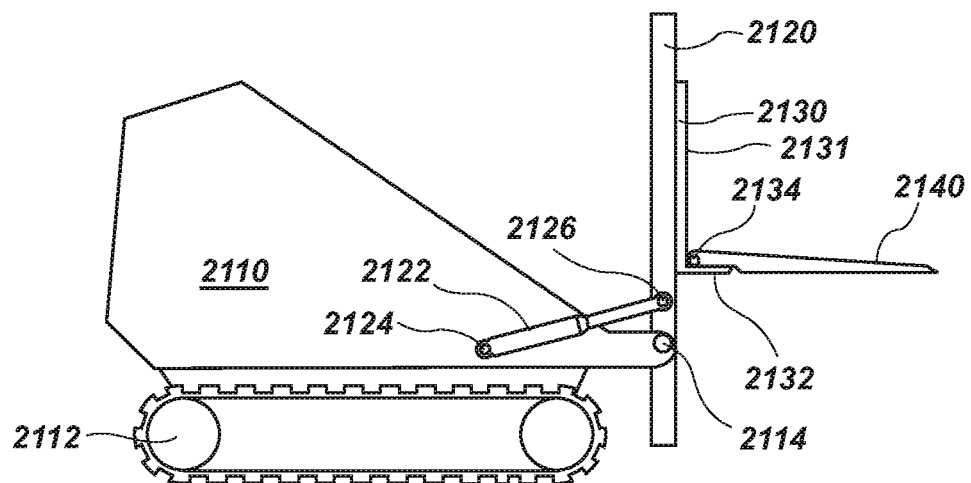
FIG. 30B is an illustrative side view diagram showing a folding lifting device with a mast in a vertical position and a raised carriage, in accordance with an example of the present disclosure.

The folding lifting device can have an arm 2140 extending from the platform 2110 and a mast 2120 rotatably connected to the platform. The platform and the mast can be coupled about a mast pivot point 2114. The mast can rotate about the mast pivot from a near vertical position to a folding position on the platform. A carriage 2130 can be slidably connected to the mast, where the carriage can slide up and down the mast. An actuator 2122 can be coupled to the platform and the mast and used to rotate the mast between a vertical position and folded position. The actuator can be coupled to the platform with a platform pin 2124 and to the mast with a mast pin 2126 that allows the members of the actuator to move or rotate when the mast rotates. The carriage may be raised, as illustrated in FIG. 30B, or lowered, as illustrated in FIG. 30A, with the mast in a vertical or near vertical position.

The carriage can include the arm 2140 and a load back rest 2131. The arm can extend horizontally when the mast is in a vertical position, as illustrated in FIGS. 30A-30B. The arm can be used to lift a load. For example, a load may be a crate, pallet, or piece of equipment. The load back rest may provide a coupling between the mast and the carriage and provide a stop for a load when the platform acquires a load and pushes against a load. The arm may be rotatably connected to the load back rest with a carriage pivot pin 2134. The arm may rotate 90 degrees between a perpendicular position with the load back rest (an open position), as illustrated in FIG. 30C, and a parallel position with the load back rest (a folded position), as illustrated in FIG. 30D.

An arm stop 2132 can be integrated with the load back rest 2131 or coupled to the load back rest 2131. The arm stop can provide a stop for the arm 2140 when the arm is in an open fixed position (perpendicular with the load back rest). The arm stop can provide support for the arm and the load carried by the arm. In another example, the carriage pivot point can be a rotary actuator for extending the arm from the load back rest (perpendicular with the load back rest) and/or for folding the arm on the load back rest (parallel with the load back rest).

Figure 30C:
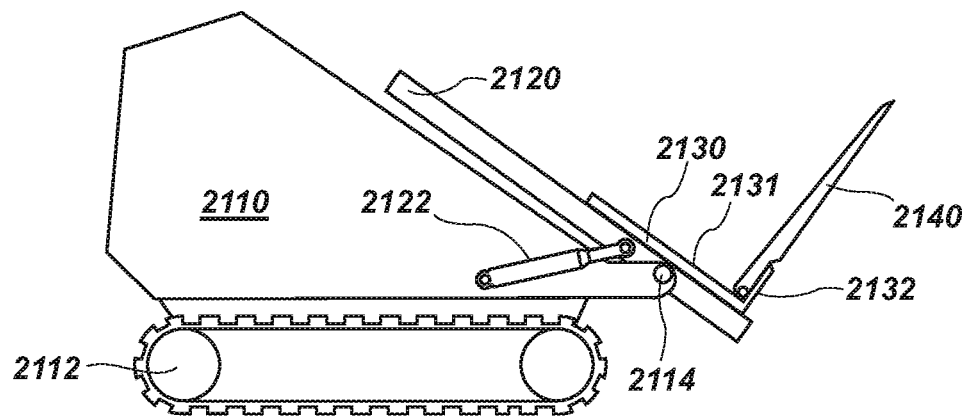
FIG. 30C is an illustrative side view diagram showing a folding lifting device with a mast in a folded position and a carriage arm extended, in accordance with an example of the present disclosure.
Figure 30D:
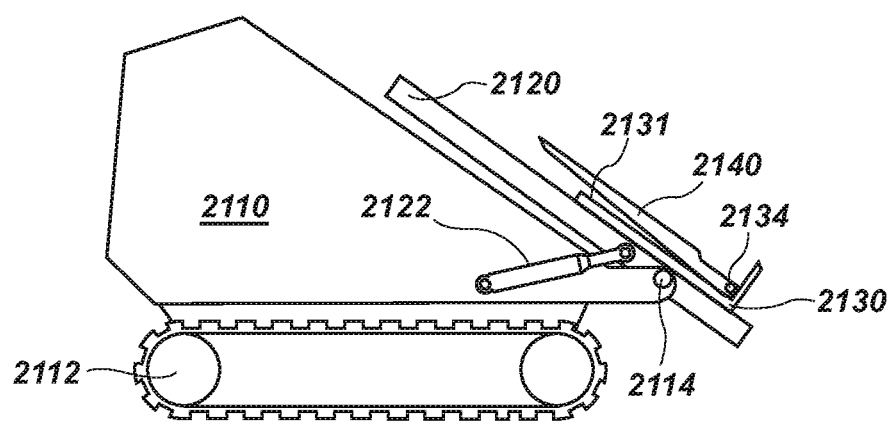
FIG. 30D is an illustrative side view diagram showing a folding lifting device with a mast in a folded position and a carriage arm folded, in accordance with an example of the present disclosure.

The mast 2120 and carriage 2130 can fold toward and in some cases onto the platform 2110, as illustrated in FIGS. 30C-30D. The mast can rotate at least 20 degrees from a vertical position toward the platform. When the mast is folded on to the platform the mast may be supported on mast rests (not shown) integrated with or coupled to the platform. When the mast is opened to a vertical position, mast stops may be used to stop the mast from rotating beyond a specified position, such as at a 5 degree angle from a vertical position. The mast stop may be integrated with the platform or mast or coupled to the platform or mast. A lift chain and other components may be coupled to the mast and carriage to move and lift the carriage. Controls may be used to actuate the actuator coupled to the mast and the rotary actuator coupled to the carriage.

Figure 31A:
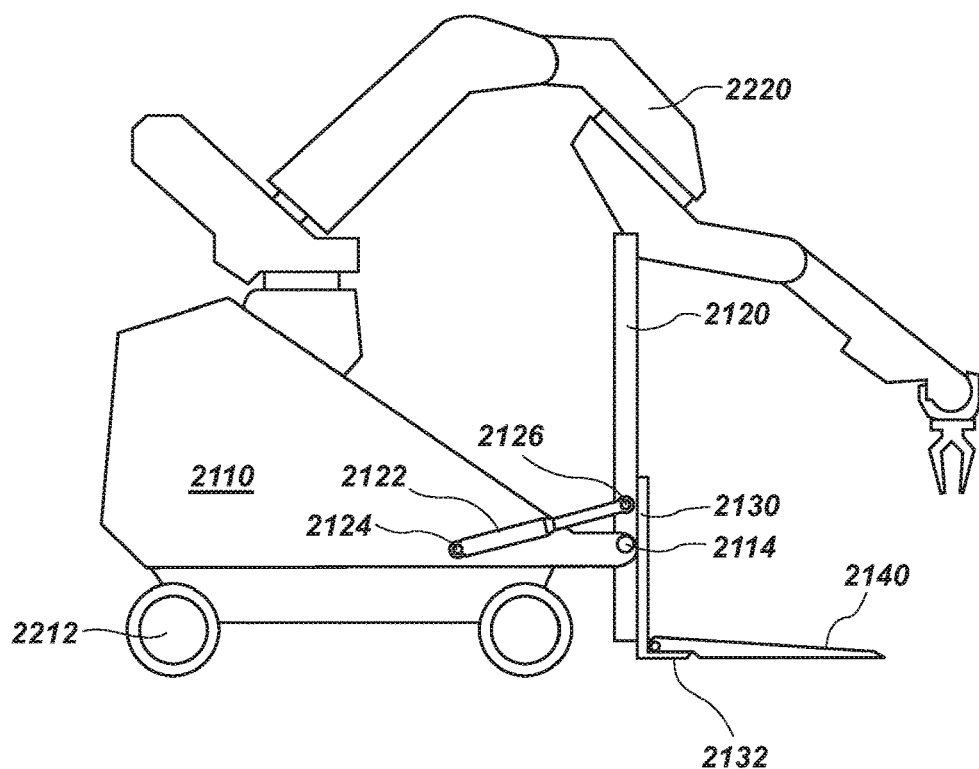
FIG. 31A is an illustrative side view diagram showing a robotic arm on a folding lifting device with a mast in a folded position, in accordance with an example of the present disclosure.
Figure 31B:
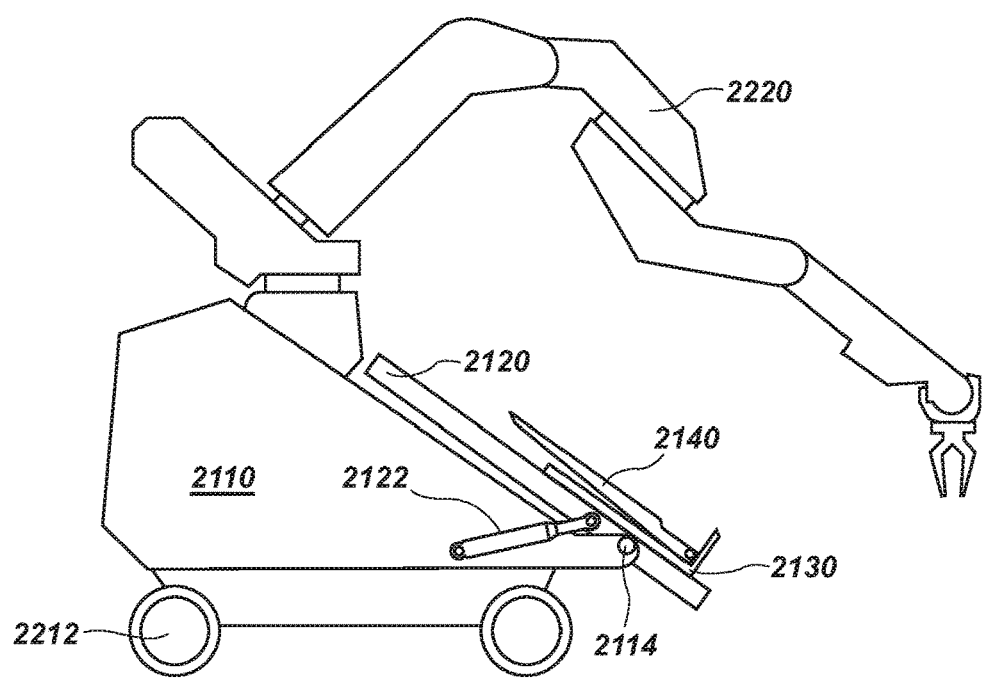
FIG. 31B is an illustrative side view diagram showing a robotic arm on a folding lifting device with a mast in a vertical position, in accordance with an example of the present disclosure.

The lifting device may be coupled to a platform having a robotic arm 2220 mounted on the platform, as illustrated in an example shown in FIGS. 31A-31B. Wheels 2212 may be coupled to the platform. In one aspect, the mast may be forked to provide clearance for the robotic arm so that the potential for interference with the movement of the robotic arms by the vertical members of the mast is minimized. In another aspect, the mast members may have a wide separation so the interference with the movement of the robotic arms by the vertical members of the mast is minimized. In still another aspect, the mast may be telescoping so the mast has a low vertical height (low profile) when the carriage is in a lower position. The platform, lifting device, and/or the robotic arm can be controlled remotely by a remote control. The folding lifting device can be folded onto the platform when the lifting device is not in use. Other lifting device configurations can also be used as will be apparent to those skilled in the art.

While the foregoing examples are illustrative of the principles and concepts discussed herein, it will be apparent to those of ordinary skill in the art that numerous modifications in form, usage and details of implementation can be made without the exercise of inventive faculty, and without departing from those principles and concepts. Accordingly, it is not intended that the principles and concepts be limited, except as by the claims set forth below.

What is claimed is:

1. A teleoperated robotic system, comprising:
a platform;
a master control arm having a plurality of support members coupled together about one or more joints to form a plurality of degrees of freedom corresponding to degrees of freedom of a human arm, and at least one actuator operable to actuate one or more of the plurality of support members arm in one or more of the plurality of degrees of freedom;
a user interface associated with the master control arm to facilitate operation of the master control arm by a user;
a slave arm mounted to the platform, and having a plurality of support members coupled together about one or more joints to form a plurality of degrees of freedom corresponding to the degrees of freedom of the master control arm, the slave arm comprising a load sensor operable to facilitate a force feedback to the user via the master control arm indicating contact of the slave arm with an obstacle, wherein the load sensor facilitates generation of load information based on a measured load resulting from contact of the slave arm with the obstacle, the at least one actuator being configured to actuate the master control arm to apply the force feedback to the user based on the load information.

2. The teleoperated robotic system of claim 1, wherein the force feedback comprises a tap response.

3. The teleoperated robotic system of claim 1, wherein the at least one actuator is configured to apply the force feedback to the user at an amplitude that is proportional to an amplitude of the load sensed by the load sensor.

4. The teleoperated robotic system of claim 1, wherein the at least one actuator is configured to vary the amplitude of the force feedback applied to the user based on a load derivative of the load information sensed by the load sensor.

5. The teleoperated robotic system of claim 4, wherein the load derivative is passed through a filter to convert the load derivative to a filter output corresponding to the force feedback that the user can feel and the at least one actuator can produce.

6. The teleoperated robotic system of claim 5, wherein the filter output is applied as a torque command to the at least one actuator of the master control arm.

7. The teleoperated robotic system of claim 1, wherein the force feedback is applied by the at least one actuator in a wrist degree of freedom of the master control arm.

8. The teleoperated robotic system of claim 1, further comprising a continuous force reflection function, wherein the load sensor of the slave arm is operable to facilitate force reflection in the master control arm in accordance with a proportional force reflective setting, wherein the force feedback comprises a transient spike in a resistive force disproportionate to the resistive force applied in accordance with the continuous force reflection function.

9. The teleoperated robotic system of claim 8, wherein the at least one actuator is configured to apply the resistive force of the continuous force reflection function to the user at a magnitude that is proportional to a magnitude of the load at the slave arm.

10. The teleoperated robotic system of claim 8, wherein the resistive force of the force feedback is applied at magnitude that arrests motion of the master control arm during operation.

11. The teleoperated robotic system of claim 1, wherein the master control arm and the slave arm are commonly supported about the platform.

12. The teleoperated robotic system of claim 1, wherein the platform comprises a mobile platform operable to provide a mobile teleoperation function.

13. The teleoperated robotic system of claim 1, wherein at least one of a load or a position of the master control arm is proportional to at least one of a respective load or positon of the slave arm.

14. The teleoperated robotic system of claim 1, further comprising a power source supported about the platform to power at least one of the master control arm, the platform, or the slave arm.

15. The teleoperated robotic system of claim 1, wherein the platform further comprises a seat to support the user in a sitting position.

16. The teleoperated robotic system of claim 1, wherein the platform further comprises a slave arm receiving channel, wherein at least a portion of the slave arm is received in the receiving channel when not in operation.

17. The teleoperated robotic system of claim 12, wherein the mobile platform further comprises an omni-directional system to provide the user with multiple degrees of freedom to manipulate and move the platform about the ground surface, the omni-directional system comprising at least three wheels that provide directional orientation independent of one another.

18. The teleoperated robotic system of claim 12, wherein the mobile platform comprises a trailer platform attachable to a trailering vehicle.

19. The teleoperated robotic system of claim 1, wherein a plurality of actuators are configured to actuate the master control arm to apply the force feedback to the user based on the load information.

20. The teleoperated robotic system of claim 19, wherein one of the plurality of actuators actuate the master control arm to apply the force feedback to the user based on the load information.

21. The teleoperated robotic system of claim 19, wherein two or more of the plurality of actuators actuate the master control arm to apply the force feedback to the user based on the load information.

22. The teleoperated robotic system of claim 19, wherein the force reflection and the force feedback are applied at a same degree of freedom of the plurality of degrees of freedom.

23. The teleoperated robotic system of claim 22, wherein a same actuator is configured to actuate the master control arm to apply the force feedback and the force reflection to the user based on the load information.

24. The teleoperated robotic system of claim 22, wherein different actuators are configured to actuate the master control arm at the same degree of freedom to separately apply the force feedback and the force reflection to the user based on the load information.

25. The teleoperated robotic system of claim 19, wherein the force reflection and the force feedback are applied at different degrees of freedom of the plurality of degrees of freedom.

26. The teleoperated robotic system of claim 25, wherein different actuators are configured to actuate the master control arm at the different degrees of freedom to separately apply the force feedback and the force reflection to the user based on the load information.

27. A method of controlling a teleoperated robotic system comprising a master control arm operated by a user and having a plurality of support members coupled together about one or more joints to form a plurality of degrees of freedom, and a slave arm having a plurality of support members coupled together about one or more joints to form a plurality of degrees of freedom corresponding to the degrees of freedom of the master control arm, and a load sensor operable to facilitate a force feedback to the user via the master control arm indicating contact of the slave arm with an obstacle, the method comprising:
  measuring a load on the slave arm with a load sensor operable to facilitate a force feedback to the user via the master control arm by generating load information based on a measured load resulting from contact of the slave arm with the obstacle, and
  actuating the master control arm to apply the force feedback to the user based on the load information.

28. The method of claim 27, wherein the force feedback comprises a tap response.

29. The method of claim 27, wherein the force feedback is applied to the user at an amplitude that is proportional to an amplitude of the load sensed by the load sensor.

30. The method of claim 27, further comprising:
  varying the force feedback applied to the user based on a load derivative of the load information sensed by the load sensor.

31. The method of claim 30, further comprising:
  passing the load derivative through a filter to convert the load derivative to a filter output corresponding to the force feedback that the user can feel and the at least one actuator can produce.

32. The method of claim 31, further comprising:
  applying the filter output as a torque command to the at least one actuator of the master control arm.

33. The method of claim 27, further comprising:
applying the force feedback by the at least one actuator at a wrist degree of freedom of the master control arm.

34. The method of claim 27, wherein the load sensor of the slave arm is operable to facilitate force reflection in the master control arm in accordance with a proportional force reflective setting of a continuous force reflection function, the method further comprising:
applying the force feedback as a transient spike in a resistive force disproportionate to the resistive force applied in accordance with the continuous force reflection function.

35. The method of claim 34, wherein the at least one actuator is configured to apply the resistive force of the continuous force reflection function to the user at a magnitude that is proportional to a magnitude of the load at the slave arm.

36. The method of claim 34, wherein the resistive force of the force feedback is applied at magnitude that arrests motion of the master control arm during operation.

37. The method of claim 27, wherein at least one of a load or a position of the master control arm is proportional to at least one of a respective load or positon of the slave arm.

\* \* \* \* \*